(12) United States Patent
Bose et al.

(10) Patent No.: US 12,067,498 B2
(45) Date of Patent: Aug. 20, 2024

(54) SWARM CONTROL APPARATUS AND METHOD USING DYNAMIC RULE-BASED BLOCKCHAIN

(71) Applicant: SAMSUNG ELECTRONICS CO., LTD., Suwon-si (KR)

(72) Inventors: Ranjan Bose, New Delhi (IN); Anoop Jain, Noida (IN); Gokul Narasimha, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 939 days.

(21) Appl. No.: 17/059,010

(22) PCT Filed: May 15, 2019

(86) PCT No.: PCT/KR2019/005842
§ 371 (c)(1),
(2) Date: Nov. 25, 2020

(87) PCT Pub. No.: WO2019/245167
PCT Pub. Date: Dec. 26, 2019

(65) Prior Publication Data
US 2021/0209483 A1 Jul. 8, 2021

(30) Foreign Application Priority Data

Jun. 14, 2018 (IN) .............................. 201811022338
May 13, 2019 (KR) ......................... 10-2019-0055831

(51) Int. Cl.
*G06N 5/02* (2023.01)
*G06F 21/55* (2013.01)
(Continued)

(52) U.S. Cl.
CPC ............. *G06N 5/025* (2013.01); *G06F 21/55* (2013.01); *H04L 12/18* (2013.01); *H04L 9/3239* (2013.01); *H04L 9/50* (2022.05)

(58) Field of Classification Search
CPC ......... G06N 5/025; G06F 21/55; H04L 12/18; H04L 9/3239; H04L 9/50
See application file for complete search history.

(56) References Cited

U.S. PATENT DOCUMENTS 7,305,371 B2  12/2007  Brueckner et al.
8,392,045 B2  3/2013   Vian et al.
(Continued)

FOREIGN PATENT DOCUMENTS

CN  107045650 A    8/2017
KR  10-1753237 B1  6/2017

OTHER PUBLICATIONS

NPL History Search (Year: 2013).*
(Continued)

*Primary Examiner* — Samson B Lemma
*Assistant Examiner* — Richard W Cruz-Franqui
(74) *Attorney, Agent, or Firm* — Sughrue Mion, PLLC

(57) ABSTRACT

Provided are a swarm control apparatus and an operating method thereof. In particular, a swarm control method, performed by the swarm control apparatus, includes: generating a first rule related to the swarm, based on an attribute of at least one node from among a plurality of nodes; sharing the generated first rule with the at least one node; forming the swarm including the at least one node, based on the shared first rule; detecting a change in the at least one node in the swarm; and changing the first rule to a second rule, based on the detected change.

13 Claims, 33 Drawing Sheets

(51) Int. Cl.
*G06N 5/025* (2023.01)
*H04L 12/18* (2006.01)
*H04L 9/00* (2022.01)
*H04L 9/32* (2006.01)

(56) References Cited

U.S. PATENT DOCUMENTS

| | | | |
|---|---|---|---|
| 8,437,558 | B1 | 5/2013 | Medasani et al. |
| 8,438,184 | B1* | 5/2013 | Wang ............... H04L 67/02 |
| | | | 707/780 |
| 9,386,089 | B2 | 7/2016 | Doganaksoy et al. |
| 9,565,059 | B1* | 2/2017 | Manmohan ......... H04L 41/0816 |
| 10,528,725 | B2* | 1/2020 | Samuel ............... H04L 63/20 |
| 11,128,438 | B1* | 9/2021 | Konda ............... H04L 63/0263 |
| 2004/0068415 | A1* | 4/2004 | Solomon ............. G05D 1/0295 |
| | | | 701/1 |
| 2009/0313310 | A1* | 12/2009 | Thome ............... H04W 84/18 |
| | | | 707/999.203 |
| 2014/0241354 | A1* | 8/2014 | Shuman .............. H04L 67/51 |
| | | | 370/390 |
| 2016/0028552 | A1 | 1/2016 | Spanos et al. |
| 2016/0224949 | A1 | 8/2016 | Thomas et al. |
| 2016/0330034 | A1 | 11/2016 | Back et al. |
| 2017/0024290 | A1* | 1/2017 | Kaulgud ............. G06F 8/60 |
| 2017/0031676 | A1* | 2/2017 | Cecchetti ........... G06F 8/65 |
| 2017/0033984 | A1* | 2/2017 | Lear ................. H04L 67/34 |
| 2017/0048476 | A1* | 2/2017 | Freiin von Kapri ........................ |
| | | | H04N 21/43615 |
| 2017/0103468 | A1 | 4/2017 | Orsini et al. |
| 2017/0279829 | A1* | 9/2017 | Vasseur ............. H04L 63/1458 |
| 2017/0302663 | A1* | 10/2017 | Nainar .............. H04L 63/123 |
| 2017/0346833 | A1* | 11/2017 | Zhang ............... G06F 16/951 |
| 2018/0103036 | A1* | 4/2018 | Fox ................. H04W 4/40 |
| 2018/0123882 | A1* | 5/2018 | Anderson ........... H04L 43/16 |
| 2018/0302424 | A1* | 10/2018 | Bender ............. H04L 63/1425 |
| 2018/0343275 | A1* | 11/2018 | Moon ............... G06F 21/554 |
| 2018/0351793 | A1* | 12/2018 | Hunter ............. H04L 41/0836 |
| 2018/0375887 | A1* | 12/2018 | Dezent ............. H04L 43/08 |
| 2019/0052659 | A1* | 2/2019 | Weingarten ......... H04L 63/102 |
| 2019/0324444 | A1* | 10/2019 | Cella ............... G05B 23/0291 |
| 2019/0379699 | A1* | 12/2019 | Katragadda ......... H04L 63/1425 |
| 2019/0380037 | A1* | 12/2019 | Lifshitz ............ H04L 41/0893 |
| 2021/0209483 | A1* | 7/2021 | Bose ............... G06N 5/025 |

OTHER PUBLICATIONS

NPL Search History (Year: 2024).*
Communication dated Jul. 30, 2021 issued by the European Patent Office in application No. 19822990.8.
Bibic, S., et al., "A bioinspired mathematical model for a robotic swarm to discriminate between self and nonself robots", 19th International Conference on System Theory, Control and Computing (icstcc), ieee, Oct. 14, 2015, pp. 279-284.
Kolias, C., et al., "TermID: a distributed swarm intelligence-based approach for wireless intrusion detection", International Journal of Information Security (IJIS), vol. 16, Jun. 18, 2016, pp. 401-416.
International Search Report (PCT/ISA/210) and Written Opinion (PCT/ISA/237) issued Aug. 28, 2019 by the International Searching Authority in counterpart International Patent Application No. PCT/KR2020/005842.
Communication issued Oct. 19, 2020 by the Intellectual property Office of India in counterpart Indian Patent Application No. 201811022338.
Ferrer, Eduardo Catello, "The blockchain: a new framework for robotic swarm systems", arXiv:1608.00695v3 [cs.RO], Aug. 25, 2016. (12 pages total).
Panda, Santwana et al., "Traffic Management Using Swarm Intelligence and Route Selection Using Android Application", International Journal of Engineering and Innovative Technology (IJEIT), vol. 5, Issue 6, Dec. 2015, pp. 59-63. (5 pages total).
Nivetha Thiruverahan, Priyanka Ravi et al., "Adaptive Traffic Management and Dynamic Optimal Redirection Using Particle Swarm Optimization", 2015 International Conference on Applied and Theoretical Computing and Communication Technology (iCATccT), 2015, pp. 477-480. (4 pages total).
Garcia-Nieto, J. et al., "Swarm intelligence for traffic light scheduling: Application to real urban areas", Engineering Applications of Artificial Intelligence, 2012, vol. 25, pp. 274-283. 910 pages total).
Office Action dated Oct. 23, 2023, issued by European Patent Office in European Patent Application No. 19822990.8.

* cited by examiner

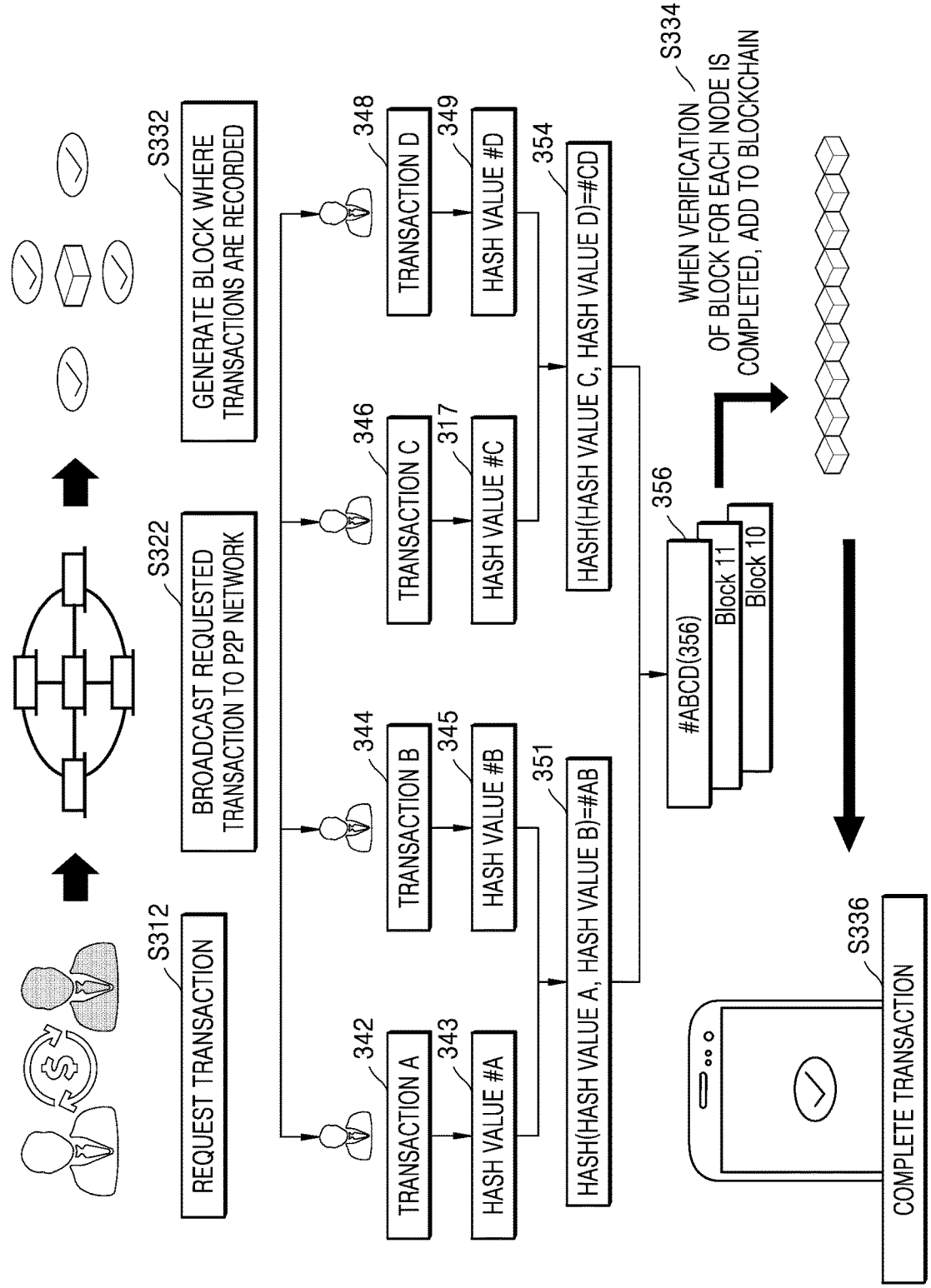

SWARM CONTROL APPARATUS AND METHOD USING DYNAMIC RULE-BASED BLOCKCHAIN

TECHNICAL FIELD

The present disclosure relates to an apparatus for controlling devices forming a swarm and an operating method of the apparatus. More particularly, the present disclosure relates to an apparatus for controlling a swarm including homogeneous and/or heterogeneous devices, and an operating method of the apparatus.

BACKGROUND ART

An artificial intelligence (AI) system is a computer system that implements human-level intelligence, and unlike an existing rule-based smart system, a machine learns, makes decisions, and becomes smarter by itself. The more the AI system is used, the more a recognition rate is improved and the more a user's taste is accurately understood, and thus the existing rule-based smart system is gradually being replaced by a deep learning-based AI system. The AI system includes machine learning (deep learning) and element technologies using the machine learning.

Recently, AI has been developed, not as a single concept, but as AI based on a self-organizing system and a distributed collective behavior called swarm intelligence. A swarm denotes a collection of entities that behave in a group, such as ants, bees, or birds. Each entity in the swarm behaves according to a very simple rule despite no central control structure that instructs actions of each entity, and even though each entity does not understand the entire rule, the entities partially behave through random interactions between entities to exhibit a global behavior that seems intelligent. The swarm is a sub-set of nodes sharing common collective characteristics and may make a collective decision.

A blockchain is an unforgeable distributed storage that is generated and managed by a peer-to-peer (P2P) network collectively complying with a protocol for validating new blocks, and denotes a collection in which data blocks generated via a transaction (a unit operation that cannot be split between two parties) are connected in a form of a chain. A representative application of the blockchain is bitcoin, i.e., decentralized electronic currency recording transactions of cryptocurrency. In the blockchain, confirmed transaction details that occur between users for a certain period of time may be stored, many users have blockchain copies, and the transaction details may be disclosed to everyone.

Rules of the blockchain are not changeable, but a collective property of a swarm may change over time. Accordingly, there is a need to develop a flexible blockchain technology that may be used for devices forming a swarm.

In addition, most blockchain and swarm technologies are limited to similar types of homogeneous devices, and a blockchain and swarm technology for heterogeneous devices has not been developed for the field of Internet of things (IOT) in which different types of devices form a network.

Accordingly, there is a need to develop a swarm control algorithm in which an existing property and current state of a swarm may control or set a boundary condition for rules of the blockchain, and to develop a technology for generating blockchain algorithm-based swarm intelligence applicable to all swarms including homogeneous and heterogeneous devices.

DESCRIPTION OF EMBODIMENTS

Technical Problem

According to embodiments, a swarm control system for detecting anomaly in a swarm, based on an evolving rule of the swarm including a plurality of nodes may be provided.

According to an embodiment, a swarm control apparatus and method for changing a rule regarding a swarm, based on a change in attributes of nodes in the swarm may be provided.

According to an embodiment, a swarm control apparatus and method for detecting an anomaly node, which indicates an operation not corresponding rule, from a swarm using blockchain based on a changing rule may be provided.

Technical Solution to Problem

According to an embodiment of the present disclosure, a method, performed by a swarm control apparatus using a blockchain, of controlling a swarm, includes: generating a first rule related to the swarm, based on an attribute of at least one node from among a plurality of nodes; sharing the generated first rule with the at least one node; forming the swarm including the at least one node, based on the shared first rule; detecting a change in the at least one node in the swarm; and changing the first rule to a second rule, based on the detected change.

The method may further include: sharing the second rule with the at least one node; and detecting a change in the at least one node in the swarm, based on the shared second rule.

The method may further include detecting an anomaly node in the swarm, which indicates an operation not corresponding to the second rule, based on the change detected based on the second rule.

The generating of the first rule may include generating the first rule based on data about an attribute, a property, and a current state of the at least one node and a kernel function using the data about the attribute, the property, and the current state as an input.

The sharing of the generated first rule may include: broadcasting the generated first rule to at least one randomly selected peer node of a node that generated the first rule; when the first rule is broadcasted to all nodes in the swarm, generating, by at least one node in the swarm selected based on the first rule, a block where the first rule is recorded; broadcasting, by the node that generated the block, the generated block to the randomly selected peer node; validating the broadcasted block, based on the first rule; and connecting the validated block to the blockchain.

The detecting of the change may include: detecting changes in an attribute, a property, and a current state of the at least one node in the swarm, based on the first rule; and detecting a change in the swarm, based on the changes in the attribute, the property, and the current state of the at least one node in the swarm.

The changing may include: updating the first rule, based on the detected change; modifying the first rule, based on the detected change; resetting a boundary condition of the first rule, based on the detected change; and generating the second rule by using at least one of the updated first rule, the modified first rule, and the first rule including the reset boundary condition.

The swarm may include at least one of a homogeneous or a heterogeneous node and operate based on at least one of the first rule and the second rule.

All nodes in the formed swarm may share transactions related to the first rule, the second rule, and operation histories of all the nodes in the swarm, and a blockchain in which at least one block where the transactions are recorded is connected in a chain form.

The first and second rules may include a rule regarding at least one of formation of the swarm, selection of a node for generating the block, validation of the block, and consensus of the blockchain.

According to another embodiment of the present disclosure, a swarm control apparatus using a blockchain, includes: a communication interface for communicating with at least one node in a swarm; a memory storing one or more instructions; and a processor configured to execute the one or more instructions to: generate a first rule related to the swarm, based on an attribute of at least one node from among a plurality of nodes; share the generated first rule with the at least one node; form the swarm including the at least one node, based on the shared first rule; detect a change in the at least one node in the swarm; and change the first rule to a second rule, based on the detected change.

The processor may be further configured to execute the one or more instructions to: share the second rule with the at least one node; and detect a change in the at least one node in the swarm, based on the shared second rule.

The processor may be further configured to execute the one or more instructions to: detect an anomaly node in the swarm, which indicates an operation not corresponding to the second rule, based on the change detected based on the second rule.

The processor may be further configured to execute the one or more instructions to generate the first rule based on data about an attribute, a property, and a current state of the at least one node and a kernel function using the data about the attribute, the property, and the current state as an input.

The processor may be further configured to execute the one or more instructions to: broadcast the generated first rule to a randomly selected peer node of a node that generated the first rule; when the first rule is broadcasted to all nodes in the swarm, generate, by at least one node in the swarm selected based on the first rule, a block where the first rule is recorded; broadcast, by the at least one node that generated the block, the generated block to at least one randomly selected peer node; validate the broadcasted block, based on the first rule; and connecting the validated block to the blockchain.

The processor may be further configured to execute the one or more instructions to: detect changes in an attribute, a property, and a current state of the at least one node in the swarm, based on the first rule; and detect a change in the swarm, based on the changes in the attribute, the property, and the current state of the at least one node in the swarm.

The processor may be further configured to execute the one or more instructions to: update the first rule, based on the detected change; modify the first rule, based on the detected change; reset a boundary condition of the first rule, based on the detected change; and generate the second rule by using at least one of the updated first rule, the modified first rule, and the first rule including the reset boundary condition.

The swarm may include at least one of a homogeneous or a heterogeneous node and operate based on at least one of the first rule and the second rule.

All nodes in the formed swarm may share transactions related to the first rule, the second rule, and operation histories of all the nodes in the swarm, and a blockchain in which at least one block where the transactions are recorded is connected in a chain form.

According to another embodiment of the present disclosure, a swarm-based system includes: a consensus-based rule unit configured to generate at least one runtime consensus rule, based on at least one of attributes, properties, behaviors, and current states of homogeneous and/or heterogeneous nodes; a runtime consensus rule-based swarm formation unit configured to form a swarm of the homogeneous and/or heterogeneous nodes; a detection unit configured to detect a change in at least one of an attribute, a property, consensus rules, a behavior, and a current state of the swarm; and an adaptive rule unit in a blockchain configured to update the swarm and rules in the blockchain, based on the detection.

The formation of the swarm of the homogeneous and/or heterogeneous nodes may be based on at least one rule in the rule unit.

The attribute, property, behavior, and current state of the swarm may be determined based on raw values or a function of the raw values.

At least one node in the swarm may self-register in a blockchain ledger and a modified ledger may be transmitted to a next node.

At least one of the attribute, property, behavior, current state, consensus rules, adaptive rules, and transactions may be input to the blockchain ledger.

The adaptive rule unit may be configured to update the rules in the blockchain by at least one of generating new rules, modifying existing rules, and setting a boundary condition for the existing rules.

The runtime consensus rule in the swarm may be updated based on the rules updated by the adaptive rule unit.

Anomaly may be detected based on at least one of the modified existing rules, the new rules, and the boundary condition of the existing rules.

Information about at least one of the new rules, the modified existing rules, or the boundary condition of the existing rules may be provided to the swarm.

The blockchain ledger may be updated based on at least one of the new rules, the updated rules, and the boundary condition of the existing rules.

The at least one node may be blocked after the anomaly is detected in the node.

According to another embodiment of the present disclosure, a swarm-based method includes: generating at least one runtime consensus rule based on at least one of attributes, properties, behaviors, and current states of homogeneous and/or heterogeneous nodes; forming a swarm of the homogeneous and/or heterogeneous nodes, based on the generated runtime consensus rule; detecting a change in at least one of an attribute, property, consensus rules, behavior, and current state of the swarm; and updating rules of an adaptive rule unit in a blockchain after the change is detected.

The forming of the swarm may be based on at least one rule in the rules.

The attribute, property, behavior, and current state of the swarm may be determined based on raw values or a function of the raw values.

At least one node in the swarm may self-register in a blockchain ledger and a modified ledger may be transmitted to a next node.

Each blockchain ledger may store at least one entry from among at least one of an attribute, a property, and a behavior between the nodes in the swarm, the current state of the swarm, the consensus rule, and transactions.

The updating may include: generating a new rule; modifying existing rules; and setting a boundary condition of the existing rules, which are performed by the adaptive rule unit.

Information about at least one of the new rules, the modified existing rules, or the boundary condition of the existing rules may be provided to the swarm.

The runtime consensus rule in the swarm may be updated based on the rules updated by the adaptive rule unit.

The detecting may include detecting anomaly in the swarm, based on the updated rules of the blockchain in the swarm.

The blockchain ledger may be updated based on at least one of the new rules, the modified existing rules, and the boundary condition of the existing rules.

The at least one node may be blocked after the anomaly is detected in the node.

Advantageous Effects of Disclosure

According to the present disclosure, a swarm control apparatus can change a rule regarding a swarm based on a change of nodes in the swarm.

BRIEF DESCRIPTION OF DRAWINGS

FIG. 3 is a diagram for describing operations of a general blockchain system.

BEST MODE

Figure 1:
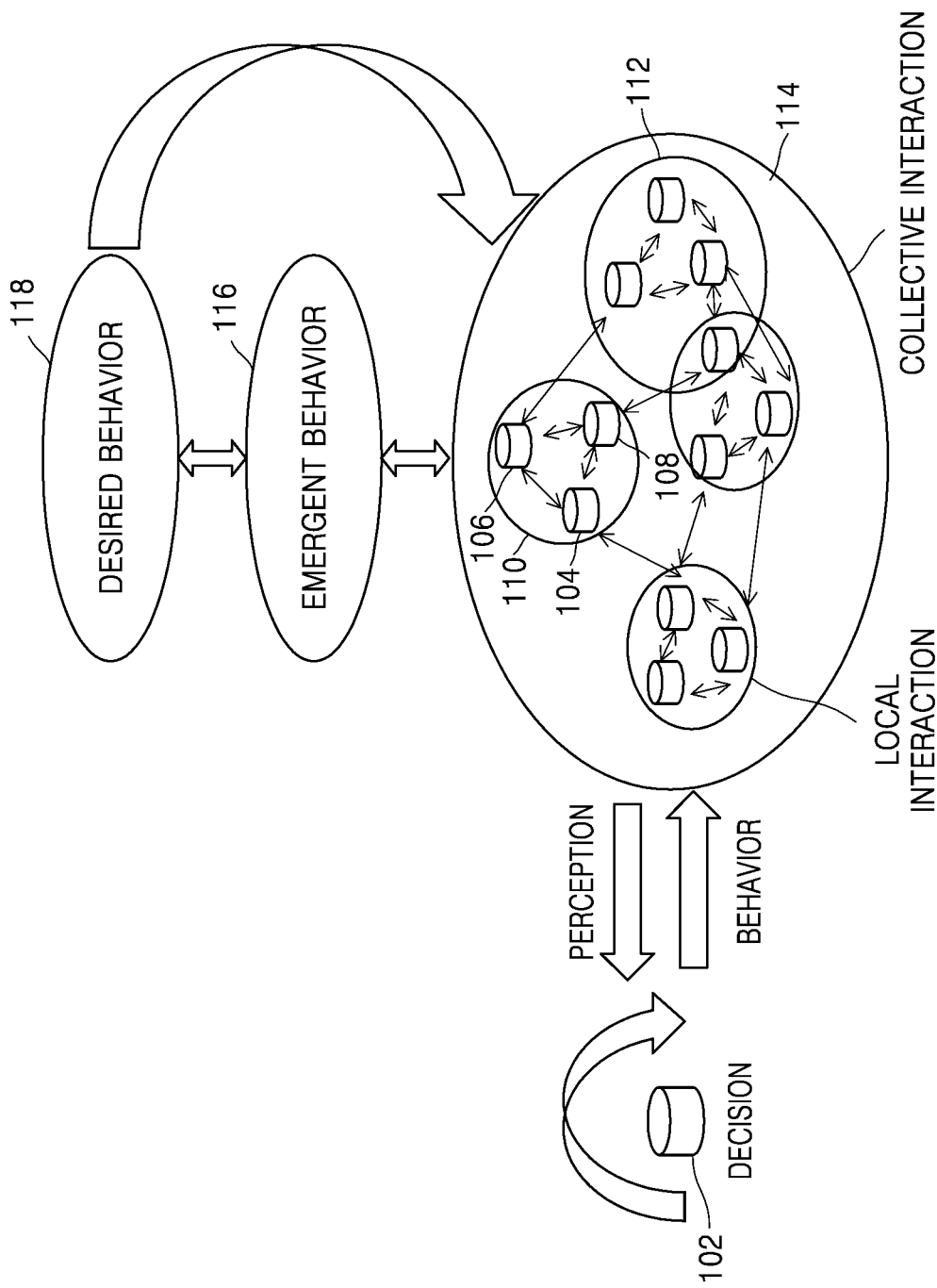
FIG. 1 is a diagram for describing a swarm system according to a general technology, according to an embodiment.

A method, performed by a swarm control apparatus using a blockchain, of controlling a swarm, according to an embodiment, includes: generating a first rule related to the swarm, based on an attribute of at least one node from among a plurality of nodes; sharing the generated first rule with the at least one node; forming the swarm including the at least one node, based on the shared first rule; detecting a change in the at least one node in the swarm; and changing the first rule to a second rule, based on the detected change.

A swarm control apparatus using a blockchain, according to an embodiment, includes: a communication interface for communicating with at least one node in a swarm; a memory storing one or more instructions; and a processor configured to execute the one or more instructions to: generate a first rule related to the swarm, based on an attribute of at least one node from among a plurality of nodes; share the generated first rule with the at least one node; form the swarm including the at least one node, based on the shared first rule; detect a change in the at least one node in the swarm; and change the first rule to a second rule, based on the detected change.

A computer-readable recording medium has recorded thereon a program for executing, on a computer, a swarm control method including: generating a first rule related to the swarm, based on an attribute of at least one node from among a plurality of nodes; sharing the generated first rule with the at least one node; forming the swarm including the at least one node, based on the shared first rule; detecting a change in the at least one node in the swarm; and changing the first rule to a second rule, based on the detected change.

Mode of Disclosure

The terms used in the specification will be briefly defined, and embodiments of the present disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the present disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

Hereinafter, embodiments of the present disclosure will be described in detail with reference to the accompanying drawings such that one of ordinary skill in the art may easily implement the embodiments of the present disclosure. However, the present disclosure may be implemented in various different forms and is not limited to the embodiments described herein. Also, in the drawings, parts irrelevant to the description are omitted in order to clearly describe the present disclosure, and like reference numerals designate like elements throughout the specification.

The present disclosure is a technology related to core artificial intelligence (AI) and may provide a method for detecting anomaly in a swarm including at least one device. The present disclosure is a combination of swarm intelligence and a blockchain technology and may address generation/change of a blockchain rule based on a current state and property of a swarm generated by swarm intelligence. Dynamic rules generated or changed based on a current state, parameter, and property of a swarm may be used to detect anomaly in the swarm including at least one device. In other words, dynamic rules of blockchain may lead to intelligence in a swarm.

A technology using blockchain in a swarm environment has not been disclosed and because collective properties of a swarm change over time, the natures of swarm and blockchain are opposite, and thus there is a need to develop an intelligence system capable of using the swarm and the blockchain including dynamic attributes of the swarm. Also, considering various future smart devices, there is also a need to develop an intelligence system capable of accommodating properties of both homogeneous and heterogeneous swarms. The present disclosure may correspond to an intelligence system including blockchain rules that are generated, changed, updated, and managed by a current state and property of the swarm.

According to an embodiment of the present disclosure, a homogeneous swarm may denote a swarm including similar types of devices having similar behaviors and attributes, and a heterogeneous swarm may denote a swarm in which different types of devices having different behavior attributes and properties are connected.

FIG. 1 is a diagram for describing a concept of swarm intelligence. Distributed self-organized agents/nodes that follow a simple rule may interact with locally adjacent nodes to show a collective behavior and creatively show a global behavior that looks intellectual via the collective behavior. By finely adjusting local interactions of the distributed self-organized agents and/or nodes of a swarm, the swarm performing a required behavior that seems intelligent may be generated globally.

In other words, entities in a swarm or parts of a swarm formed by entities may behave according to a simple rule despite not understanding an entire rule, thereby showing an emergent behavior that seems intelligent globally and thus showing a behavior required for an entire swarm. Swarm intelligence may be generated by a system including the distributed self-organized nodes/agents showing the collective behavior, and the nodes and/or agents showing the swarm intelligence may have arbitrary randomness in which interactions with each other are priority.

Figure 2A:
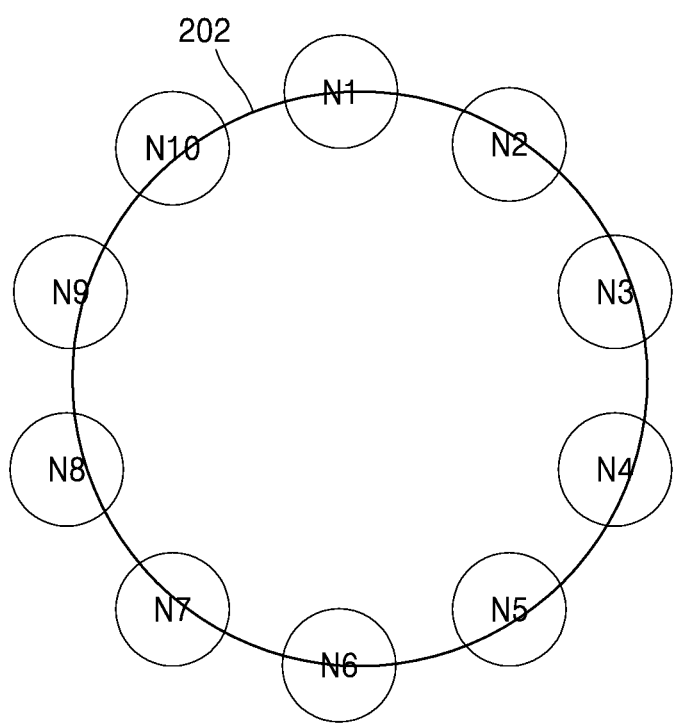
FIG. 2A is a diagram for describing formation of a swarm and detection of an anomaly in the swarm, in a general swarm system.

FIG. 2A is a diagram for describing a method by which a network including a plurality of nodes forms a swarm and detects an anomaly.

The network may include the plurality of nodes and may generate a sub-network including at least some nodes of the network by using an automatic sub-networking algorithm. The automatic sub-networking algorithm may provide a unique definition to each node in different sub-networks. The network according to the present disclosure may form a swarm including at least one node and detect anomaly by using the automatic sub-networking algorithm. The network according to the present disclosure may correspond to all nodes or a subset of nodes, and the nodes may correspond to electronic devices capable of wired or wireless communication. According to an embodiment, the swarm may include all nodes in the network or may include at least some nodes in the network. The swarm according to the present disclosure may denote a group of nodes showing an emergent behavior that seems intelligent globally, based on a local interaction of at least one node behaving according to a simple rule.

Referring to FIG. 2A, serial numbers from 1 to M may be respectively assigned to the nodes. Here, M may denote the total number of nodes in the swarm. According to an embodiment, the M nodes may be grouped according to a common attribute and property of a super set formed by K nodes forming the super set. (1<M<K)

The attribute and property of super set formed by the K nodes are leaned over time, and the K nodes may form a swarm of M nodes based on the learning. The formed swarm shows the common attribute and property of the super set in a same system and may be distributed and self-organized by locally and independently interacting with other swarms, instead of operating under a central control. The swarms may perform collective decision based on derived collective consensus.

Figure 2B:
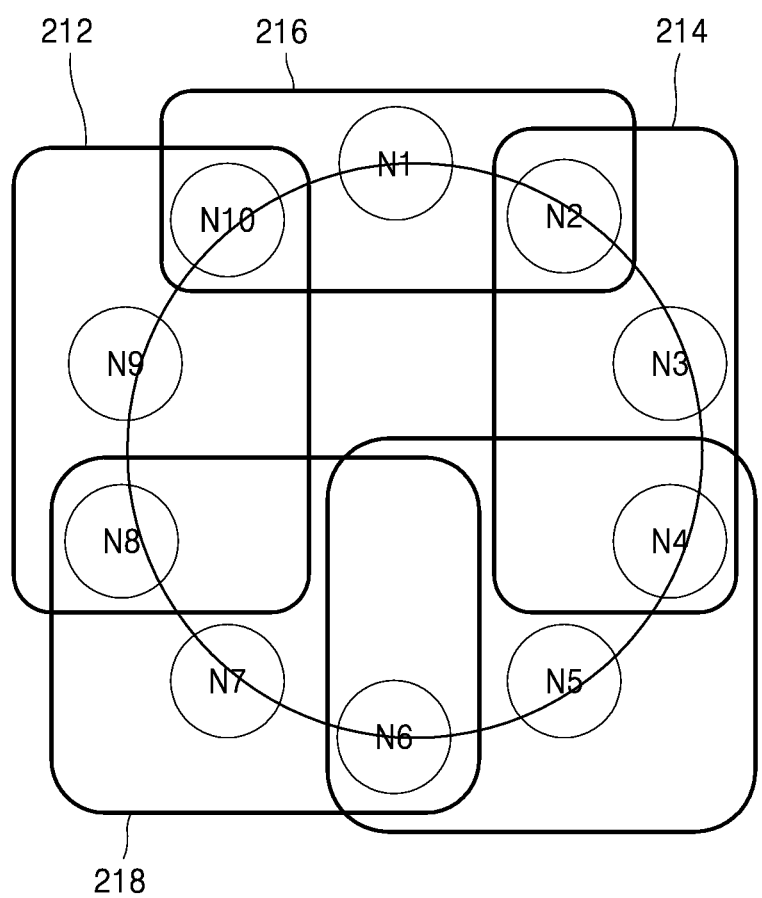
FIG. 2B is a diagram for describing formation of a plurality of random swarms and detection of an anomaly in a swarm, in a general swarm system.

FIG. 2B is a diagram for describing processes by which a network including a plurality of nodes forms different sub-swarms and detects an anomaly.

As shown in FIG. 2B, a swarm may aligned in a circular fashion. Referring to FIG. 2B, a swarm including M nodes may form sub-swarms each including n nodes (for example, n=3), and the sub-swarms may include a node common with adjacent sub-swarms. In other words, a specific node in one sub-swarm may be a node of another sub-swarm neighboring the one sub-swarm. An attack or anomaly in the swarm including M nodes may be easily detected based on the sub-swarms shown in FIG. 2B. The detecting of an attack or anomaly in the swarm may be described largely in two examples.

For example, when an attack is detected only in one sub-swarm of the swarm, it may be considered that a unique node (for example, a node N5) in the sub-swarm is compromised or attacked. In other words, when only a sub-swarm network including nodes N4, N5, and N6 includes an error, it may be determined that anomaly occurred in the node N5.

As another example, when an attack is detected in two adjacent sub-swarm networks, it may be determined that a common node shared by the sub-swarm networks where the attack is detected is compromised. In other words, when an attack is detected in a sub-swarm network including nodes N6, N7, and N8 and a sub-swarm network including nodes N4, N5, and N6, it may be determined that anomaly occurred in the node N6. Similarly, all nodes may be uniquely defined by the sub-swarms. The embodiments described above may be applied when each sub-swarm includes n=3 nodes, from among M nodes, wherein M is an even number. In general, there may be three or more nodes in each sub-swarm and the number of nodes included in sub-swarm may be calculated according to Equation 1 below.

$$n = \text{factor}(M) + I \quad \text{[Equation 1]}$$

Here, n denotes the number of nodes included in a sub-swarm and M denotes the number of nodes in an entire swarm including sub-swarms. In general, the number of nodes in each sub-swarm is 3 or greater and may be represented as Equation 1 above. When Equation 1 is applied, some secondary sub-swarms collecting nodes that do not overlap from primary sub-swarms need to be formed.

Figure 2C:
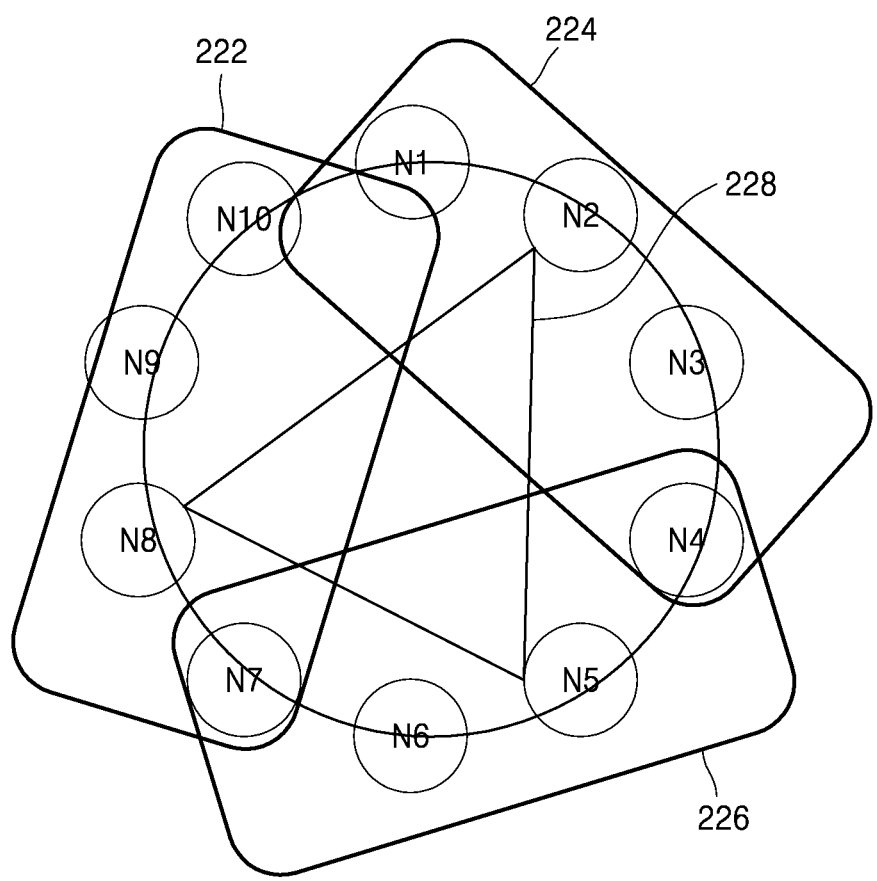
FIG. 2C is a diagram for describing formation of a plurality of random swarms and detection of an anomaly in a swarm, in a general swarm system.

FIG. 2C is a diagram showing processes in which certain secondary sub-swarms are formed by collecting nodes that do not overlap from primary sub-swarms.

$$S1 = M/(n-1)$$

$$S2 = (n-3) \quad \text{[Equation 2]}$$

Here, S1 denotes the number of primary sub-swarms and S2 denotes the number of secondary sub-swarms. For example, when M=10 and n=3, the number S1 of primary sub-swarms is 5 and the number S2 of secondary sub-swarms is 0. Also, when M=10 and n=4, the number S1 of primary sub-swarms is 3 and the number S2 of secondary sub-swarms is 1 (for example, a swarm connected in a triangular shape in FIG. 2C). As such, when n increases, the number S1 of primary sub-swarms is decreased but the number S2 of secondary sub-swarms is increased.

Thus, according to an embodiment of the present disclosure, an anomaly node in the swarm may be accurately searched for when there is a value n that is the optimal number of sub-swarms for reducing calculation complexity, sub-swarms are formed using the optimal value n, anomaly is detected in the formed sub-swarms, and an algorithm accurately defines each node.

In general, according to methods for detecting anomaly in a swarm, it is difficult to accurately detect an anomaly when the anomaly occurs in a plurality of nodes and many calculations are required to detect an anomaly in a large swarm including a plurality of nodes. Also, according to general methods for detecting anomaly in a swarm, a false result may be provided when one or more nodes are compromised or anomalistic, and it is impossible to detect an attached or compromised sub-swarm when all members in the sub-swarm is attacked or compromised.

FIG. 3 is a diagram for describing a blockchain algorithm according to an embodiment.

A blockchain is a distributed ledger (database) including blocks where continuously increasing transactions are recorded in a chain form, and each block may include a time stamp and a link to a previous block. For example, each block in the blockchain may include a unique hash value and the hash value of each block may include a hash value of a previous block. The blockchain is intrinsically resistant to modification of data and has integrity for reliability of data. The blockchain may be considered as a distributed digital ledger used to record transactions between a plurality of nodes/computers.

Accordingly, records of the transactions in the blockchain is unable to be changed retroactively unless combinations of all subsequent blocks and networks are changed. The blockchain may provide a reliable and inexpensive method for management or finance that may be recorded or validated in a decentralized distributed network. Not only in the blockchain but also in a swarm, because an architecture of the swarm is distributed and the blockchain and the swarm are both related to collective decision, robustness of the blockchain may be applied to the swarm including a plurality of devices.

A transaction according to an embodiment of the present disclosure may denote occurrence of a pre-defined event. Also, the transaction may include a transaction (for example, exchange of data or exchange of function of a data value) between two entities. According to an embodiment, the transaction in the swarm including at least one device may include exchange of raw data or function of raw data value of devices.

The raw data of devices according to an embodiment of the present disclosure may include device identification data or device state data. The device identification data may include attribute data of a device or property data of the device. The raw data of the device may form raw data of the swarm. The device according to the present disclosure may correspond to one node in one network.

According to an embodiment of the present disclosure, the node may include various types of devices or electronic devices. For example, the nodes included in the swarm in the present specification may each be a digital camera, a mobile terminal, a smart phone, a laptop computer, a tablet personal computer (PC), an electronic book terminal, a digital broadcast terminal, a personal digital assistant (PDA), a portable multimedia player (PMP), a navigation device, an MP3 player, an electronic device including a home appliance, but is not limited thereto.

Also, according to an embodiment, the node may be a wearable device. The wearable device may be at least one of an accessory type device (for example, a watch, a ring, a wrist band, an ankle band, a necklace, glasses, or a contact lens), a head-mounted device (HMD), a textile or apparel integrated device (for example, electronic clothing), a body-attachable device (for example, a skin pad), or a bio-implant type device (for example, an implantable circuit), but are not limited thereto. Also, according to an embodiment, the node is a unit of a network including a device and may correspond to each computer device, such as communicable drone, airplane, or vehicle. One node may include one or more communicable electronic devices. In other words, the nodes included in the swarm may correspond to a plurality of electronic devices capable of wired or wireless communication.

A technology applying swarm intelligence to a swarm including Internet of things (IoT) devices for security has not been disclosed until now. Detection of an anomaly or validation of a transaction in a blockchain may be managed by implied consensus rules, defined consensus rules, and runtime consensus rules.

Such consensus rules dynamically develop with a change in swarm property, and rules of the swarm may change with a change of the consensus rules. Thereamong, an important rule is a behavior artifact, i.e., the runtime consensus rules, and a behavior of the swarm may be determined based on a raw value or a function of raw value. The behavior of the swarm may be helpful in setting rules in the blockchain for anomaly detection.

The consensus rules of the blockchain according to the present disclosure may correspond to rules of the blockchain in a broad sense. The rules of the blockchain according to an embodiment of the present disclosure may include a rule for defining a swarm, a leader election rule for electing a node generating, in a swarm, a new block where a transaction is recorded, a validation rule for validating a block generated by a node elected as a leader in a swarm, and a decentralized consensus rule for unifying content of blockchains when different blockchains are formed in a network.

Figure 4A:
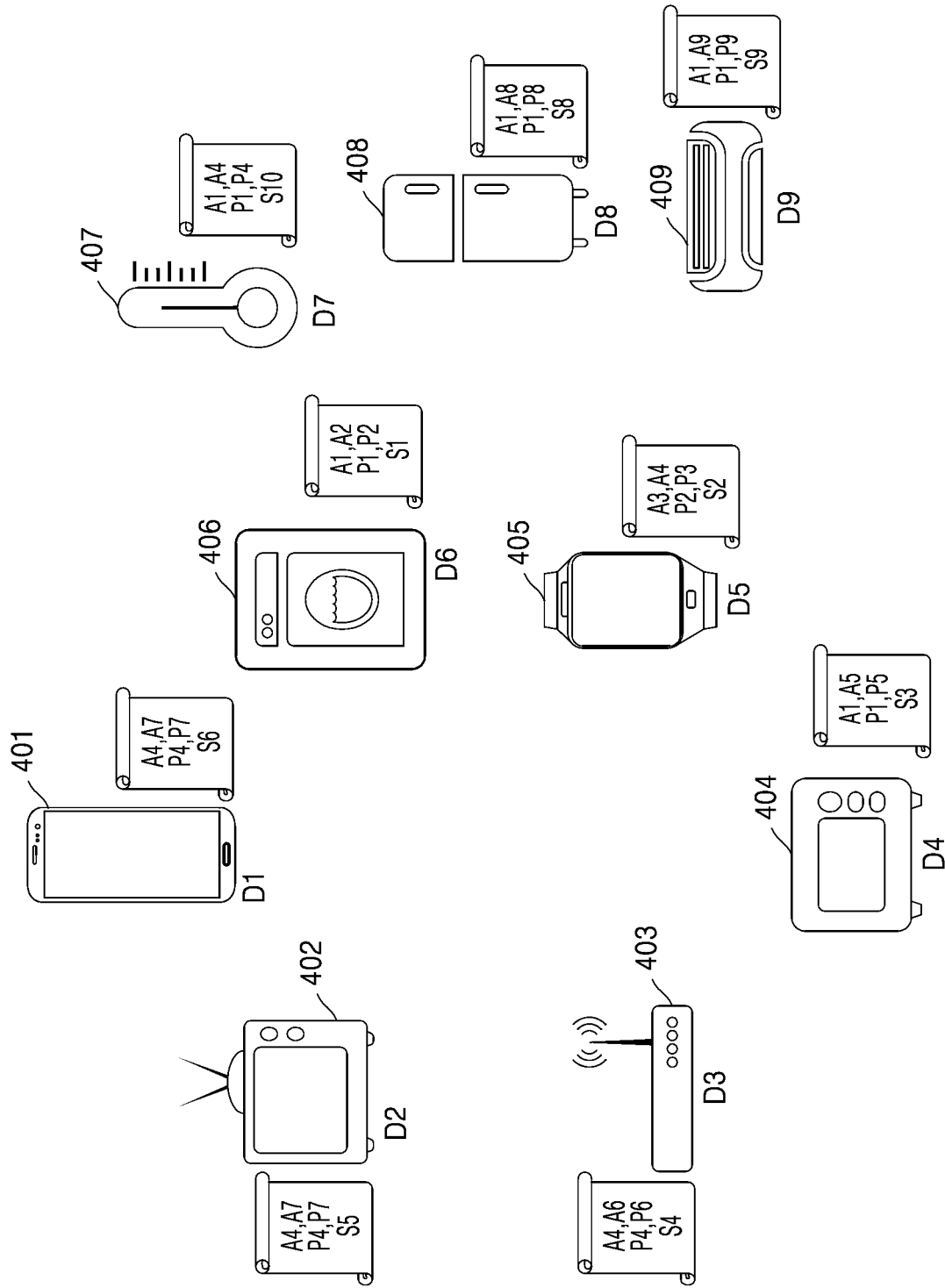
FIG. 4A is a diagram of a network of heterogeneous devices, according to an embodiment.
Figure 4B:
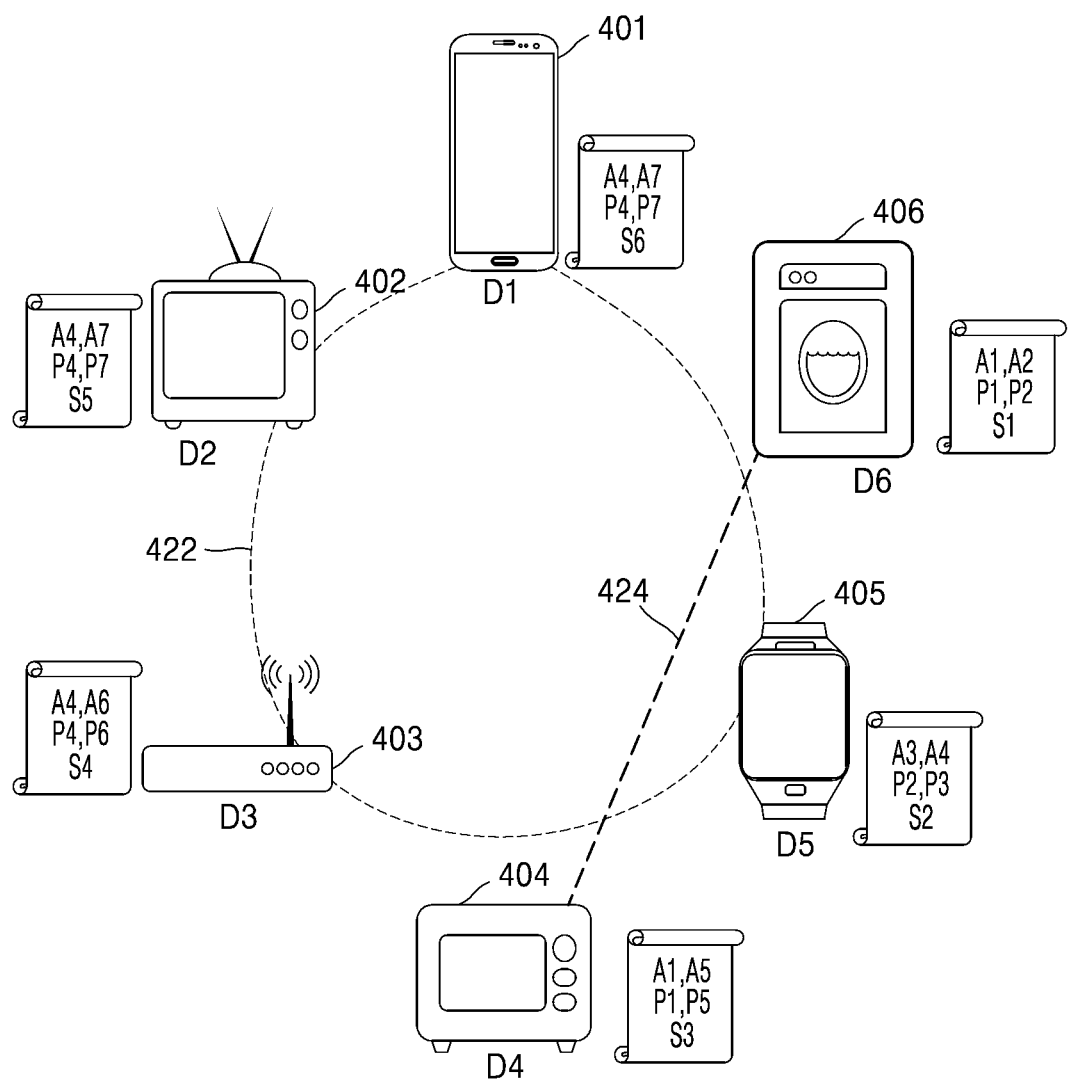
FIG. 4B is a diagram for describing processes of setting a rule of a swarm and a boundary condition of the rule, based on a property and attribute of the swarm including heterogeneous devices.

FIG. 4A is a diagram of a network of heterogeneous devices, according to an embodiment. FIG. 4B is a diagram for describing processes of setting a rule of a swarm and a boundary condition of the rule, based on a property and attribute of the swarm including heterogeneous devices, according to an embodiment.

A homogeneous swarm may denote a swarm including similar types of devices having similar behaviors and attributes, and a heterogeneous swarm may denote a swarm in which different types of devices having different behavior attributes and properties are connected. Accordingly, homogeneous devices in the homogeneous swarm may include data about homogeneous attributes, properties, and current states, and may share the homogeneous data with other devices in a swarm. Heterogeneous devices may include data about heterogeneous attributes, properties, and current states, and may share the heterogeneous data with other devices in a swarm. Properties or attributes of the homogeneous swarm and heterogeneous swarm may be intrinsically similar or different, but the homogeneous swarm and heterogeneous swarm may have collective interdependent attributes. Referring to FIG. 4A, IoT devices including a plurality of heterogeneous devices may be connected to each other via a network and may show different properties and usage examples depending on certain attributes.

The devices in FIG. 4A form a swarm and may each store a blockchain in which blocks including data (for example, raw data or a function of raw data) between the devices and activity records are connected in a chain form. Each device may maintain a ledger of each entry of the block such that activities related to the devices in the swarm are recorded in the ledger. Also, according to an embodiment of the present disclosure, a swarm-based system may generate a block where pre-defined events (for example, when a transaction, exchange of the data, addition of a new device to the swarm, or a change in at least one of the attribute, property, and current state of the device in the swarm is detected) between the devices and transactions generated by activities are recorded, and share the generated block with the devices in the swarm.

The swarm-based system according to an embodiment of the present disclosure may include an adaptive rules engine for updating, changing, and adapting rules for validation. According to an embodiment of the present disclosure, each block included in the blockchain may correspond to the ledger or a specific page in the ledger, and the entire blockchain may correspond to the ledger or entire ledger.

Operation states of the devices in FIG. 4A correspond to current states, a property value of each device may assign a set of series of property parameters, and attribute values may define a series of attribute parameters. Also, each node (for example, each device) may include a blockchain in which blocks including other nodes in the swarm and generated transactions and activities are connected.

A plurality of swarms indicating a common collective behavior between the nodes may be formed based on the property parameters and attribute parameters of the devices in the swarm. For example, nodes in the homogeneous swarm may share common property parameters and attribute parameters, and nodes in the heterogeneous swarm may share attributes and properties defined by different types of parameters.

FIG. 4B is a diagram for describing processes of setting a rule of a swarm and a boundary condition of the rule, based on a property and attribute of the swarm including heterogeneous devices.

TABLE 1

| First Swarm | | Second Swarm | |
| --- | --- | --- | --- |
| Attributes | Properties | Attributes | Properties |
| A1: Temperature | P1: Temperature Range (25° C. to 200° C.) | A4: Networking Capabilities | P4: Bandwidth Range (200 to 2000 MHz) |
| Devices: Washing Machine, Microwave | Devices: Washing Machine (25° C. to 30° C.) Microwave (30° C. to 200° C.) | Devices: Router, Smart TV, Phone, Smart Watch | Devices: Bandwidth of Each of Router, Smart TV, Phone, Smart Watch |

Referring to Table 1 and FIG. 4B, processes of forming a swarm including a plurality of home IoT devices that may be connected to each other via wires or wirelessly are illustrated. A first swarm 424 includes a washing machine 406 and a microwave 404, and the washing machine and the microwave may be connected based on a temperature attribute including, as a property, a temperature range of 25° C. to 200° C. including both 25° C. to 200° C. that are a water temperature range of the washing machine and 30° C. to 200° C. that are an operating temperature range of the microwave. According to an embodiment, attributes (for example, temperatures) of devices of the present disclosure may have properties (for example, temperature ranges) corresponding to the attributes.

For example, a boundary condition of a rule R1 for defining the first swarm 424 may be determined to be the temperature range including both 25° C. to 200° C. that are the water temperature range of the washing machine and 30° C. to 200° C. that are the operating temperature range of the microwave. However, referring to Table 1 and FIG. 4B, a second swarm 422 includes a router 403, a smart TV 402, a phone 401, and a smart watch 405, which are connected based on networking capability having a bandwidth of 200 to 2000 MHz as a common attribute.

Devices included in each swarm may store transactions occurred in themselves and a network, in queues set in memories of the devices, and may include blockchains in which blocks including previously occurred transactions are connected. When a new transaction occurs in the swarm, the all devices in the swarm may store the newly occurred transaction in the queues of their memories as randomly selected devices adjacent to a device where the transaction occurred first receive the transaction and the devices that received the transaction again transmits the transaction to adjacent randomly selected devices. According to an embodiment, the transactions occurred between the devices in the swarm may be randomly transmitted to adjacent peer nodes in a broadcasting manner, and the all devices in the swarm may share the newly occurred transaction within a certain period of time.

From among the devices in the swarm, a device elected according to at least one of proof-of-work (POW) and proof-of-stake (POS) may generate a new block by recording, in a block, transactions transmitted via broadcasting and stored therein. However, a leader electing method for generating a new block where a transaction in a network is recorded is not limited to POW and POS, and another leader electing algorithm for performing a function of generating a block in a blockchain may be used.

The device that generated the new block may randomly transmit the generated block to adjacent peer nodes (for example, devices), and a node that received the new block may again transmit the new block to adjacent randomly selected nodes. Each node in the swarm may validate the received block by using a rule of the swarm. Each of the nodes in the same swarm may validate the received block by using the rule of the same swarm and derive a same validation result for a block including a same transaction. The devices in the swarm may derive 'consensus' when the nodes in the swarm successfully complete validation on newly generated blocks received from a node selected as a leader.

The validation on the newly generated block of the nodes in the swarm may be performed based on the rule R1 and the rule R1 may be defined as R1=f(T1, T2, S1, S3). Here, T1 denotes a water temperature of the washing machine 406, T2 denotes an operating temperature range of the microwave 404, S1 denotes a current state of the washing machine, S3 denotes a current state of the microwave, and the rule R1 may be set according to states and properties of the devices in the first swarm 424, Processes of updating a rule and boundary condition of a swarm when new devices are added to the swarm will be described in detail with reference to FIG. 4C.

Figure 4C:
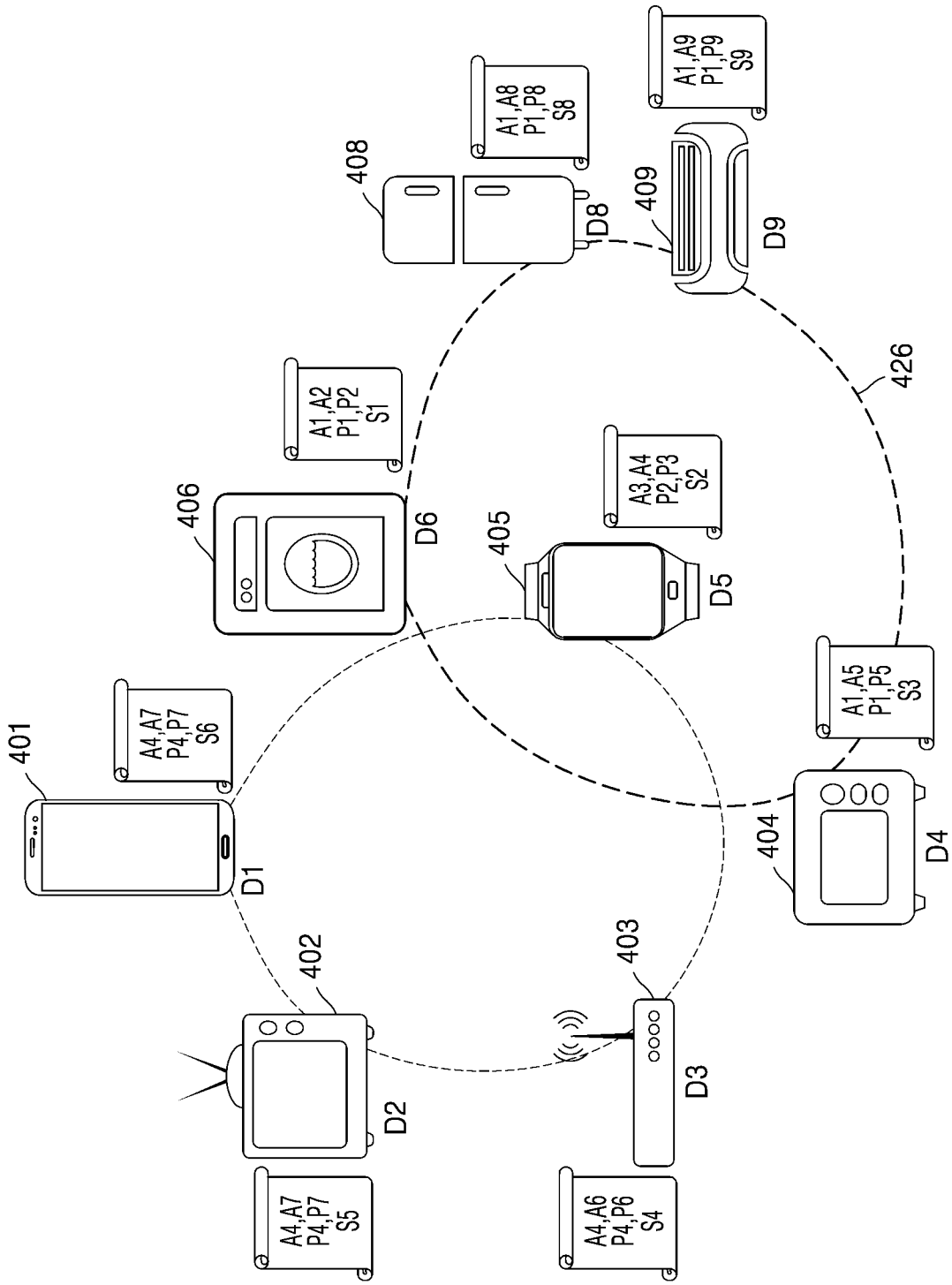
FIG. 4C is a diagram for describing processes in which a property and attribute of a swarm are changed as new devices are added to the swarm and a rule and boundary condition of the swarm are updated according to the changed property and attribute.

FIG. 4C is a diagram for describing processes in which a property and attribute of a swarm are changed as new devices are added to the swarm and a rule and boundary condition of the swarm are updated according to the changed property and attribute. Referring to FIG. 4C, a refrigerator 408 and an air conditioner 409 are added to a first swarm 426, and the first swarm 426 updated as new devices are added may be indicated as Table 2 below.

TABLE 2

| First Swarm | | Second Swarm | |
|---|---|---|---|
| Attributes | Properties | Attributes | Properties |
| A1: Temperature | P1: Temperature Range (25° C. to 200° C.) | A4: Networking Capabilities | P4: Bandwidth Range (200 to 2000 MHz) |
| Devices: Washing Machine, Microwave, Refrigerator, Air Conditioner | Devices: Washing Machine (25° C. to 30° C.) Microwave (30° C. to 200° C.) Refrigerator (−10° C. to 25° C.) Air Conditioner (18° C. to 28° C.) | Devices: Router, Smart TV, Phone, Smart Watch | Devices: Bandwidth of Each of Router, Smart TV, Phone, Smart Watch |

Referring to Table 2, the newly updated first swarm 426 may further include the refrigerator 408 and the air conditioner 409 in addition to the washing machine 406 and the microwave 404. The first swarm 424 and the updated first swarm 426 may be connected based on a temperature attribute. For example, the first swarm 424 of FIG. 4B may be connected based on the temperature attribute corresponding to a temperature range of −10° C. to 200° C. including both −10° C. to 25° C. that are an operating temperature range of the refrigerator and 18° C. to 28° C. that are an operating temperature range of the air conditioner. A temperature range regarding a temperature attribute of a swarm may denote a property of the swarm.

A boundary condition of the rule R1 updated to define the new first swarm 426 may be determined to be a temperature range including all of 25° C. to 200° C. that are the water temperature range of the washing machine, 30° C. to 200° C. that are the operating temperature range of the microwave, −10° C. to 25° C. that are the operating temperature range of the refrigerator, and 18° C. to 28° C. that are the operating temperature range of the air conditioner. Accordingly, when the boundary condition of the rule R1 is updated, the rule R1 defining the swarm may also be updated. In other words, the rule of the swarm and the boundary conditions of the rule, according to an embodiment of the present disclosure, may be updated based on a state, property, and attribute of the current swarm.

The rule R1 of the first swarm 424 may be updated to a rule R1' based on temperature attributes and properties of the newly added devices. The updated rule R1' may be defined as R1'=f(T1, T2, T3, T4, S1, S3, S8, S9) and may define the new first swarm 426. Here, T1 denotes a water temperature of the washing machine, T2 denotes an operating temperature range of the microwave, T3 denotes an operating temperature range of the refrigerator, and T4 denotes an operating temperature range of the air conditioner. Accordingly, the rules of the swarm may be updated based on the current state, attributes, and properties of the swarm to form swarm intelligence.

Figure 4D:
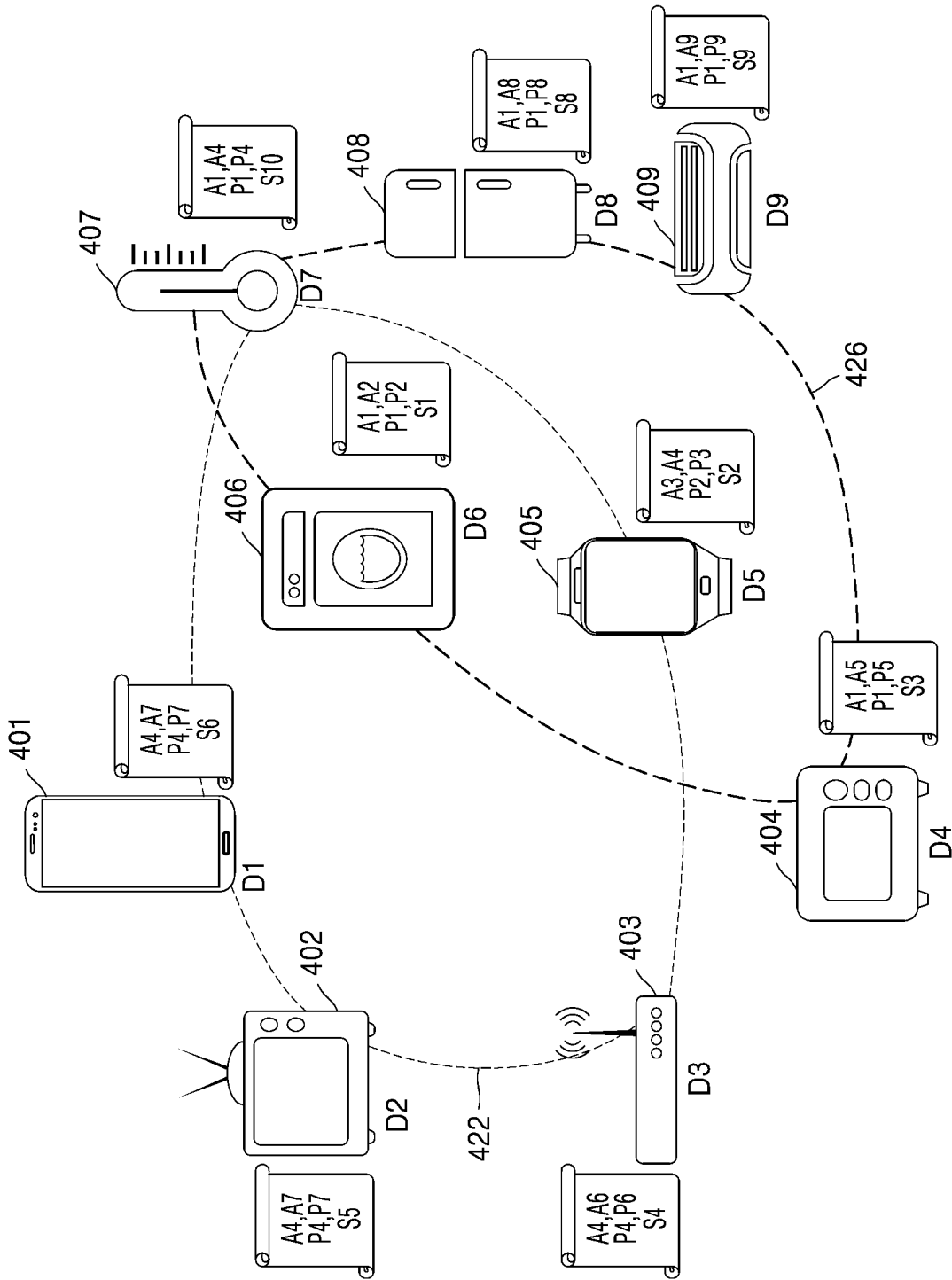
FIG. 4D is a diagram for describing a swarm formed between heterogeneous devices, according to an embodiment.

FIG. 4D is a diagram for describing a swarm formed between heterogeneous devices, according to an embodiment.

Referring to FIG. 4D, swarms formed based on rules generated by a rules unit 606 of the present disclosure may include a plurality of swarm including at least one device. In other words, the swarms formed based on the rules generated by the rules unit 606 may include one or more swarms.

For example, referring to FIG. 4D, a device D1 401, a device D2 402, a device D3 403, a device D5 405, and a device D7 407 may form one swarm and a device D4 404, a device D6 406, the device D7 407, a device D8 408, and a device D9 409 may form another swarm. According to an embodiment, the device D7 407 may be commonly included in different swarms. A swarm-based system according to an embodiment of the present disclosure may consider that an anomaly is generated in the device D7 407 when an anomaly is generated in both the swarm including the device D1 401, the device D2 402, the device D3 403, the device D5 405, and the device D7 407 and the swarm including the device D4 404, the device D6 406, the device D7 407, the device D8 408, and the device D9 409. According to an embodiment, the number of common nodes included in different swarms may be determined based on rules of each swarm.

According to an embodiment, the swarm may be formed in a pre-fixed swarm size, such as N. The number of nodes (for example, devices) included in all swarms in a network may be an arbitrary number M. According to an embodiment of the present disclosure, all the swarms in the network may include the same number of nodes (for example, devices) or different numbers of nodes.

According to an embodiment, in the entire network, M initiating nodes may be randomly selected (swarm initiation). According to an embodiment, the selecting of the initiating node may be performed in a distributed fashion and may be based on local clocks. According to an embodiment, each node in the swarm may be asynchronous and operate based on a unique clock.

For example, each of the initiating nodes may circulate a blank fixed-length ledge that is randomly selected and has a size of N to one of adjacent nodes. Thus, according to an embodiment, there may be M circulating ledgers. The devices in the swarm may involve a local interaction, based on the definition of swarm intelligence. According to an embodiment, the local interaction in the swarm has a certain degree of randomness and behaviors of nodes in others region in the swarm may change based on such local interaction having randomness.

For example, a node that received a ledger from the initiating node in the swarm may register itself to the ledger (for example, only once), and then transmit the modified ledger to neighboring randomly selected nodes. Such processes may continue until the M circulating ledgers are full. Entries in the ledger may determine members of swarm related to the ledger. Accordingly, M swarms may be formed for M circulating ledgers.

By defining the rules of the swarm, a specific number of nodes overlapped in the swarms (for example, nodes commonly included in the plurality of swarms) may be permitted. The swarms of a fixed size or variable size may be formed by selecting different sizes of ledgers.

According to an embodiment of the present disclosure, because the ledger may correspond to a block of a blockchain or the blockchain itself stored in each device, the sizes of swarms sharing the blockchain may be determined based on the sizes (or lengths) of blocks in the blockchain. The size of swarm is a design parameter and may be selected by a designer. The size of swarm may vary depending on the total number of nodes in the swarm, time constraints, and a type of specific application used to store data in a form of blockchain. Obviously, formation of such swarm does not require centralized control and may be performed based on a decentralized distribution system.

According to an embodiment of the present disclosure, a set of homogeneous and/or heterogeneous devices may collectively form a swarm. The homogeneous and/or heterogeneous devices share their raw data and/or functions of raw data with neighboring nodes (for example, neighboring devices), and the raw data and/or function of raw data of each device may configure transactions. The transactions occurred in each device may be shared with other nodes in a network online. For example, the raw data of devices may include data about attributes, properties, and current states of the devices in the swarm, and the function of raw data may include a function specified based on at least one of the attributes, properties, and current states of the devices. The raw data and/or function of raw data of the devices may define the transactions between devices. According to an embodiment, the transactions may occur based on exchanging, changing, and updating of the raw data and/or function of raw data according to at least one of addition, change, and withdrawal of a device member in the swarm, and may occur according to a change in the attributes, properties, current states, and behaviors of the devices in the current swarm.

In other words, the addition, change, and withdrawal of a member in the swarm, and the change in attributes, properties, current states, and behaviors of the devices in the swarm may be pre-defined as events, and when the pre-defined event is generated, the transactions occur. The occurred transactions may be transmitted (for example, broadcasted) to all devices in the swarm. In other words, all devices in the swarm may exchange data by being connected to each other via wires or wirelessly to transmit and receive the transactions and new blocks where the transactions are recorded.

According to an embodiment, a swarm may be formed by a heterogeneous network including various devices having different properties, different attributes, and different operations for current states. As described above, each node may include a blockchain ledger (for example, blockchain data where blockchain blocks are connected) where transactions and/or activity data of different devices are recorded. Property parameters and attribute parameters of the devices in the swarm may be generated based on a common collective behavior of the devices in the swarm.

When transactions of devices in the swarm newly occur according to the pre-defined event, each node in the swarm may validate a block where the newly occurred transactions are recorded and add the block of which validation is completed to its blockchain. In other words, the devices in the swarm may update the blockchain when the new transaction occurs in the swarm.

The transactions transmitted to all devices in the swarm may be stored in a queue of the devices in the swarm and the all devices in the swarm may share the transactions. According to an embodiment, all devices in the swarm may share a transaction of same content but because an order in which the transactions are transmitted to the nodes in the swarm may be random, an order in which the transactions are stored in each device may be changed. According to an embodiment, from among the nodes in the swarm, a node that found an answer to a hash puzzle by performing POW is elected as a leader, generates a new block where its current transactions are recorded, transmits the generated block to all nodes in the swarm, and be validated by each node.

Rules of verification of the blockchain may be derived by the attribute, property, and current state of the swarm. Validation of the devices in the swarm may include determining whether a node that generated a block is a leader that has authority to generate a block, and determining whether transactions in a newly generated block are changed.

According to an embodiment, whether the transactions in the block are changed may be determined based on an electronic signature and hash function. The blockchain rules of the devices in the swarm may be updated or changed according to the attribute, property, and current state of the swarm. Also, the boundary condition of the rules may be set according to the attribute, property, and current state of the swarm.

Figure 4E:
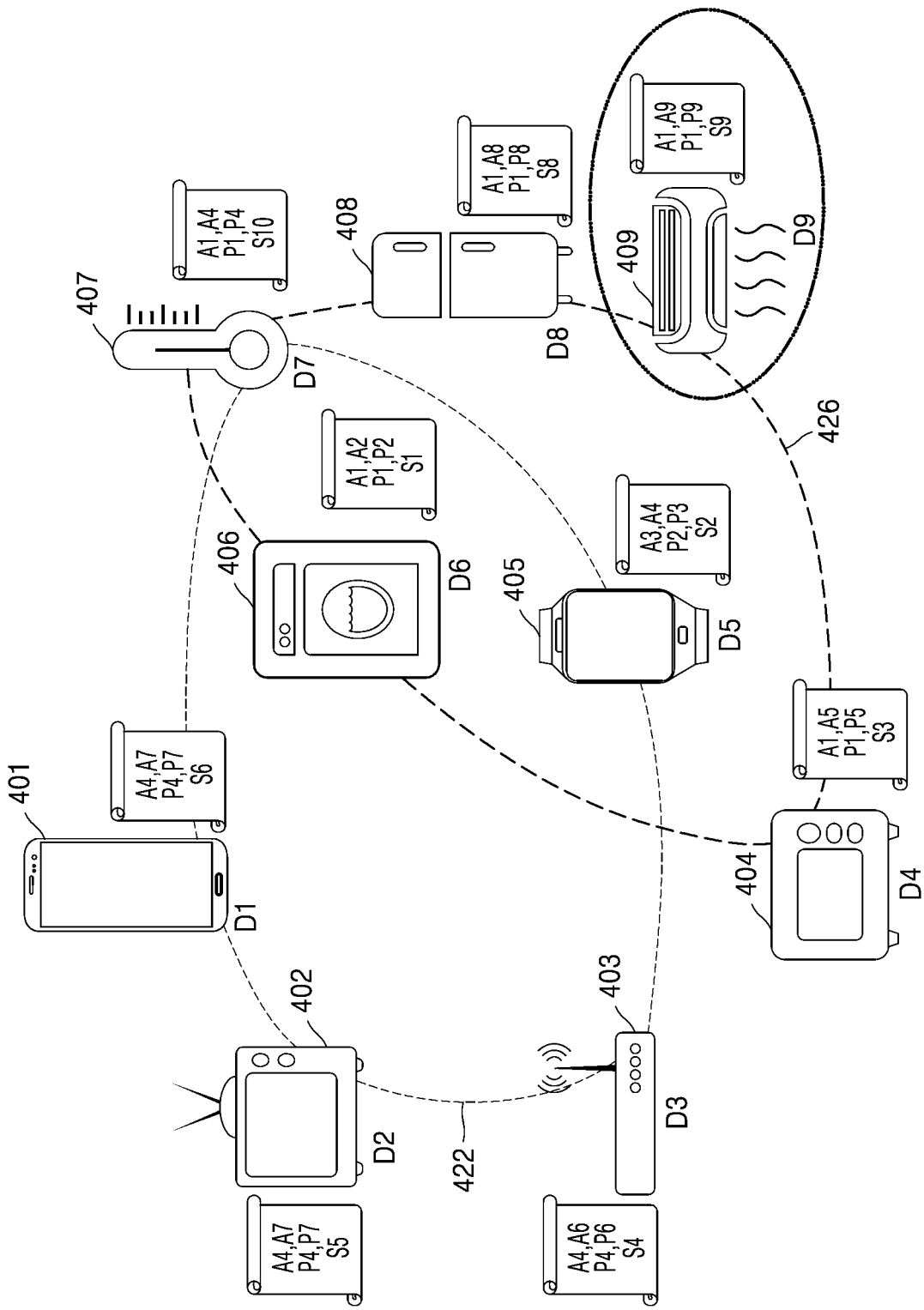
FIG. 4E is a diagram for describing a swarm formed between heterogeneous devices, according to an embodiment.

FIG. 4E is a diagram for describing a swarm formed between heterogeneous devices, according to an embodiment. For example, as shown in FIG. 4E, nodes (for example, the device D1 401, the device D21 402, the device D3 403, the device D5 405, the device D6 406, the device D7 407, the device D8 408, and the device D9 409) may be connected to form different swarms. According to an embodiment, one node may be included in a plurality of swarms, such as the node D7 407.

Heterogeneous devices (D4 404, D6 406, D7 407, D8 408, and D9 409) forming a home network may be connected by a common attribute (for example, a temperature attribute). For example, a common property parameter of the devices, i.e., a general temperature range in which each device operates, may vary from $-10°$ ° C. to $200°$ C.

According to an embodiment, each device in the swarm may measure a current temperature range of other devices and update a block of a blockchain using the measured temperature range of the other devices as a transaction. For example, when an operating range of units (for example, D9 409) during the summer is 18° C. to 22° C. and general rules of a blockchain are applied to the swarm, a current temperature of the unit (D9 409) may be considered as valid reading even when the current temperature is 25° C., unless there is a separate regulation. In other words, when D9 409 is compromised and thus is not cooled down to 19° C. that is a preferable temperature in the summer but is at 24° C. that is the current temperature, traditional rules of the blockchain (for example, implied rules or defined consensus rules) may not discover D9 409.

However, according to an embodiment of the present disclosure, rules for defining the swarm may change according to attribute, property, and current state of the swarm. For example, when a temperature boundary condition of D9 is set between 18° ° C. to 24° C. as a correct temperature operating range of D9 in a blockchain stored by each device in a current swarm and the boundary condition is not updated, anomaly of the device D9(409) indicating an anomaly temperature of 24° C. may not be detected.

However, according to an embodiment of the present disclosure, the temperature boundary condition of D9 stored in the blockchain included in each device that is a member in the swarm may be updated from 18° C. to 22° C., based on the current attribute, property, and current state of the swarm, and in this case, the anomaly of the device D9 409 currently indicating the anomaly temperature of 24° C. may be detected. The boundary condition according to an embodiment of the present disclosure may include the temperature range of each device that is a member in the swarm or may include temperature ranges of all devices in the swarm.

For example, when a temperature range is 5° C. to 26° C. as the boundary condition of the rule of the swarm including the air conditioner 409, a current temperature of 24° C. of the air conditioner may be considered as a normal temperature, but based on a dynamic rule, when the temperature range is updated to 5° C. to 23° C. as the boundary condition of the rule of the swarm of a swarm system using the blockchain, the current temperature 24° C. of the air conditioner may be considered as an anomaly temperature.

According to an embodiment of the present disclosure, the changing or updating of the rules of the swarm and the boundary condition of the rules may be generated as a new transaction, and simple rules that is a basis of local interaction followed by members of the swarm based on the attribute, property, current state, and current behavior of the swarm, runtime consensus rules for defining the swarm, leader node election rules for generating a block in the swarm, validation rules for validating a generated block, and decentralized consensus rules for unifying blockchains when the blockchains in which blocks where different transactions are recorded are generated in the swarm may be generated, changed, modified, and updated. Accordingly, an anomaly detection algorithm (for example, mechanism) in the swarm using the blockchain according to an embodiment of the present disclosure may also be generated, changed, modified, and updated.

Figure 5:
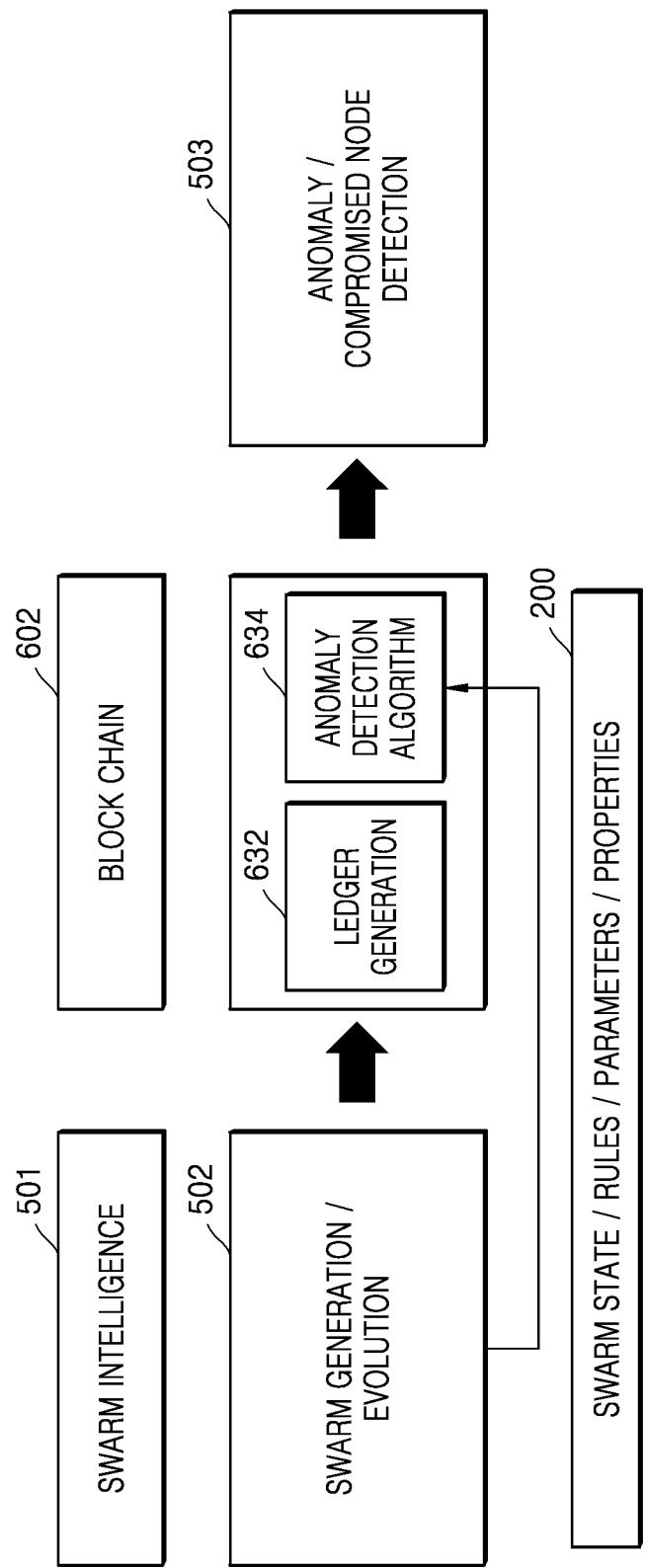
FIG. 5 is a diagram for describing a swarm environment according to an embodiment.

FIG. 5 is a diagram for describing a swarm environment according to an embodiment. Referring to FIG. 5, the swarm environment may include a swarm (including homogeneous or heterogeneous nodes) interacting with another swarm and interacting with an environment to solve a problem or achieve a desired behavior. In other words, the swarm environment may denote a target to be interacted by a swarm-based system interacting with an environment or with each other or by a swarm control device including a plurality of devices.

According to an embodiment, the swarm-based system may include certain blocks performing functions of swarm intelligence 501, blockchain 602, and anomaly and/or compromised node detection 503.

The swarm intelligence unit 501 may cause generation, formation, and evolution of a swarm, based on a given series of simple rules. For example, the swarm intelligence unit 501 defines the simple rules for local interaction of devices in the swarm, and generate the simple rules to adapt to a state, property, attribute, and parameter of the swarm. The swarm intelligence unit 501 may transmit, to the blockchain unit 602, data about the current state of the swarm, rules, parameters, properties, and attributes of the swarm.

The blockchain unit 602 may be used to validate and store transactions 603. The blockchain unit according to an embodiment may include a ledger generation unit and an anomaly detection algorithm unit. The blockchain unit may validate the transactions 603 and a block where transactions are recorded by using a consensus manager 610 having a pre-defined rule set.

For example, the ledger generation unit may generate a new ledger in each node by transmitting, to all nodes sharing a blockchain, a block generated by a leader elected based on rules of the blockchain and adding the block to the blockchain of each node after the node that received the new block validates the block. In other words, in the blockchain system, the blockchain stored in each node may correspond to one ledger.

Also, the anomaly detection algorithm unit may receive the data about the state, rules, parameters, and properties of the swarm from the swarm intelligence unit, and store an algorithm for detecting an anomaly in the swarm, based on the data about the state, rules, parameters, and properties of the swarm. According to the present disclosure, the state, parameters, attributes, current state, and properties of the swarm may be used to define runtime rules of the blockchain 602 and make the runtime rules to be further adaptive.

The anomaly detection unit 503 may detect the anomaly in the swarm including a plurality of nodes, by using an attribute that the transactions are unable to be over-written according to an immutable property of the blockchain. According to an embodiment, "intelligence" of the swarm may be generated by using the blockchain 602. The rules of the blockchain 602 may be generated, updated, and changed based on the current state, property, and attribute of the swarm. Accordingly, the blockchain 602 may be flexible to accommodate changing behaviors of the swarms.

According to an embodiment, the swarm intelligence unit and the blockchain unit 602 may be combined to generate or change the rules of blockchain based on the property and current state of the swarm generated by the swarm intelligence, thereby making the rules of the blockchain dynamic. Dynamic rules of the blockchain generated or changed as such may be used to detect an attack or anomaly in the swarm. The detecting of anomaly or threat in the swarm by using the blockchain 602 technology may be determined based on the property, attribute, and current state of the swarm. Accordingly, the rules of blockchain 602 may develop together with evolution of the swarm.

Figure 6:
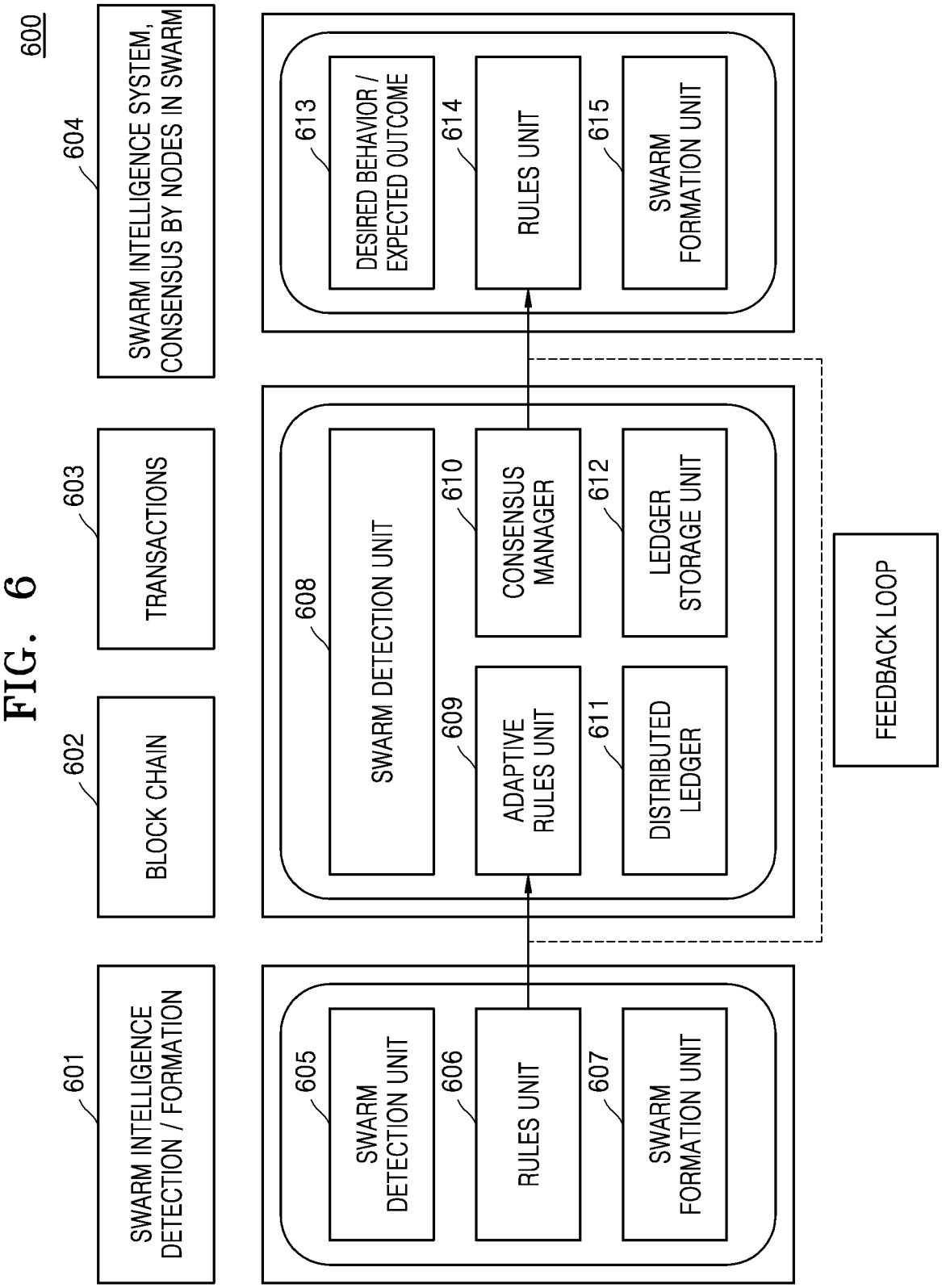
FIG. 6 is a diagram for describing a swarm intelligence system including a blockchain service, according to an embodiment.

FIG. 6 is a diagram for describing a swarm intelligence system including a blockchain service, according to an embodiment.

Swarm intelligence is global collective behavior that seems intelligent by agents (for example, nodes) that are locally distributed (for example, decentralized) according to simple rules and self-organized. The swarm intelligence may denote that local interactions between distributed and self-organized nodes or local interactions between nodes and an environment show emergent behavior that seems intelligent in view of an entire swarm.

According to an embodiment, the swarm-based system may detect nodes for forming a swarm. For example, a swarm detection unit 605 in a swarm intelligence detection/formation unit 601 may randomly detect nodes corresponding to swarm rules generated in relation to signal strength, a distance of nodes, and perception of nodes in an environment. Processes by which the swarm detection unit 605 detects a swarm in an environment may be similar to an algorithm of practice swarm optimization (PSO) 706, but is not limited thereto.

The rules unit 606 may generate simple rules for forming a swarm between a plurality of nodes. For example, a swarm formation unit 607 may form a swarm based on the simple rules generated by the rules unit 606. A method by which the swarm formation unit 607 forms a swarm may vary. In other words, the plurality of nodes may follow the simple rules generated by the rules unit 606 to form a swarm. As described above, the swarm may include homogeneous and/or heterogeneous nodes, wherein the homogeneous nodes may have similar behaviors and properties, and the heterogeneous nodes may have a series of unique behaviors and different properties.

Unlike general rules of a blockchain, the rules generated by the rules unit 606 need to be adapted and changed to process demands of the swarm according to various behaviors and properties of the nodes and at the same time, maintain integrity of the swarm. For example, the rules may be changed in the homogeneous nodes, based on behavior result indicating a better result. In such homogeneous nodes, the behavior results of the nodes are shown through updating, changing, or modifying of the blockchain rules, and the updated, changed, or modified rules may be input, as feedback, to an adaptive rules unit 609 via a feedback loop. Behaviors of the swarm may be further dynamically adapted to the environment according to the changed, updated, and modified rules.

According to an embodiment, the blockchain unit 602 providing blockchain services may include the adaptive rules unit 609, a consensus manager 610, a distributed ledger unit 611, and a ledger storage unit 612.

The blockchain service unit may include, to maintain integrity of data, a blockchain algorithm for controlling the adaptive rules unit 609, the consensus manager 610, the distributed ledger unit 611, and the ledger storage unit 612. The adaptive rules unit 609 may change, update, or modify the rules generated by the rules unit 606, based on changes in a current state, parameters, properties, and attributes of the swarm.

The adaptive rules unit 609 may react sensitively to different behaviors and properties of the homogeneous and/or heterogeneous nodes in the swarm to obtain desired outcomes, and as a result, the swarm-based system may combine the generated adaptive rules with immutable attributes of the blockchain to detect anomaly and/or threat in the swarm.

According to an embodiment, the consensus manager 610 may manage the rules of the blockchain for maintaining integrity of data. For example, the consensus manager 610 may manage leader election rules (for example, POW or POS) for electing a leader from among nodes of a blockchain system to generate a block by recording transactions, validation rules for validating a generated block, decentralized consensus rules for unifying a blockchain when the blockchain in which different transactions are recorded grows in one network, and runtime consensus rules related to operations of a blockchain.

The distributed ledger unit 611 may generate a block where transactions are recorded in the blockchain system and transmit the generated block to nodes in the blockchain system. The ledger storage unit 612 may connect a new block to the blockchain when validation of the generated block is completed. The ledger storage unit 612 may store the blockchain in which the newly generated block is connected in the swarm-based system or at least one node.

In a network including a plurality of nodes, the consensus-based swarm intelligence system may show a desired behavior/expected outcome 613 as an expectation of a system user. In other words, in the network including the plurality of nodes, the expectation of the system user is shown as a behavior of the nodes in the swarm, and such nodes may follow the simple rules defined by the rules unit 606 when starting to operate.

A feedback manager 615 may provide feedback regarding properties of the nodes, and the swarm-based system may collectively determine a desired change with respect to the properties of the nodes so as to modify and/or update rules required to derive a desired behavior/expected outcome corresponding to a demand of the system user.

Sub-swarms of the swarm may include a blockchain. However, according to an embodiment of the present disclosure, the blockchain may be generated based on raw data and a function of raw data shared by the nodes. Values shared by the nodes in the swarm may be raw values (for example, temperatures of air conditioners) or a function (for example, entropy) of values.

Tampering or anomaly in the swarm may be detected by using an immutable attribute (for example, tamper-proof) of the blockchain according to the definition of blockchain. The behavior of the swarm may be determined based on raw values of a function of raw values. The behavior of the swarm may be used to set rules in the block for anomaly detection. Hash values of all transactions in the blockchain are stored in a form of Merkle tree to be stored as one final hash value in a block header, and the hash value is encrypted according to an asymmetric encryption technique and transmitted to each node as an electronic signature. For example, when transmitted transactions are changed, at least one hash value in a Merkle tree root is changed, and as a result, the final hash value at the top of the Merkle tree is changed, and thus a change in the transaction may be detected.

As such, each entry of the block in the blockchain may be unable to be changed. IoT devices that are to modify their values are assigned with flags, and the swarm-based system may detect anomaly of the flagged IoT devices. An anomaly node or a compromised node is unable to be reversed or modified later once an unusual behavior is performed. All pieces of data in the blockchain may have been already shared with other people, and thus the cost of data forgery is very high.

Figure 7A:
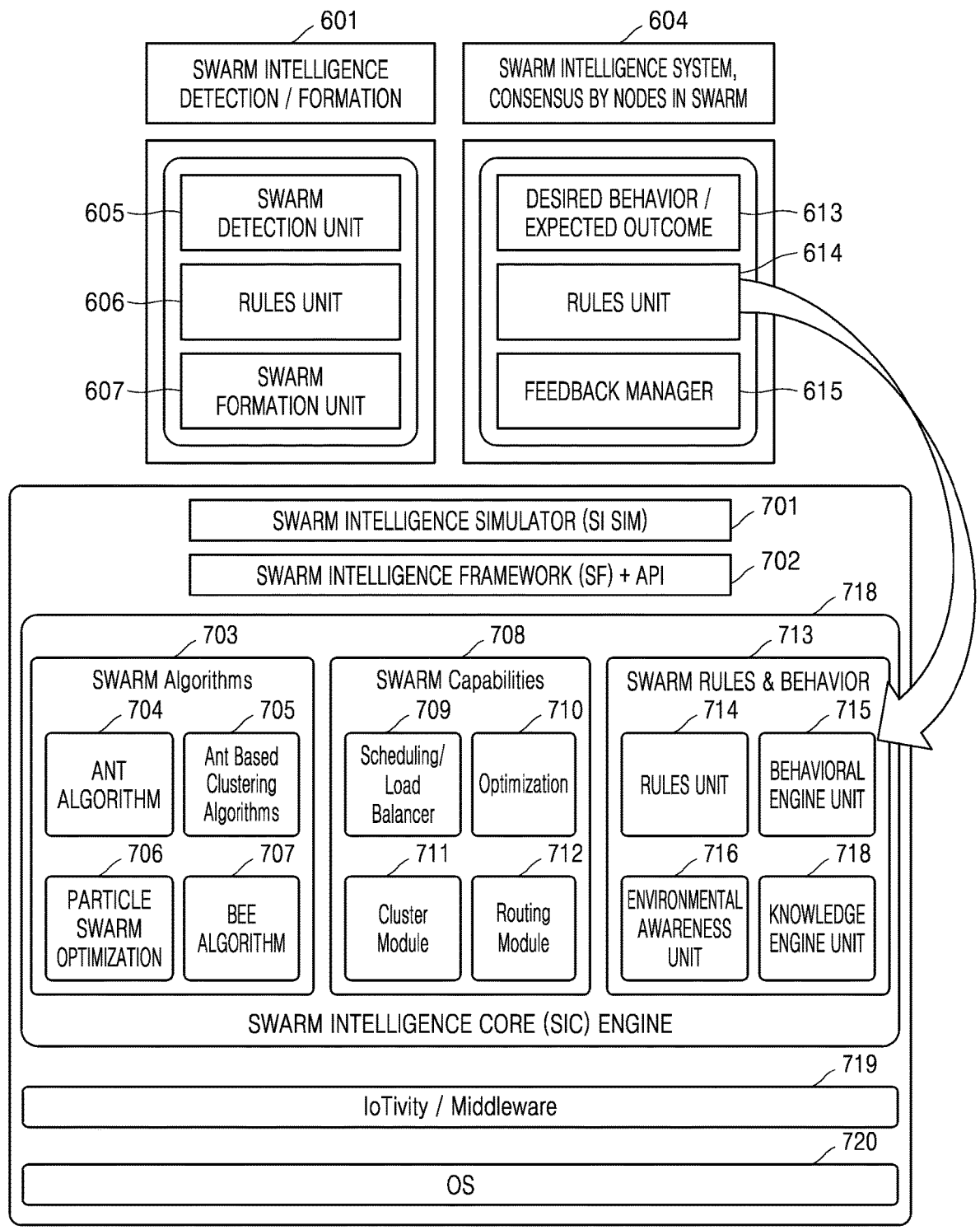
FIG. 7A is a diagram for describing a swarm intelligence core engine according to an embodiment.

FIG. 7A is a diagram for describing a swarm intelligence core (SIC) engine according to an embodiment. An SIC engine 718 may include swarm algorithms 703, a swarm capabilities unit 708, and a swarm rules and behavior unit 714. The warm rules and behavior unit 714 includes the rules unit 714 and an environmental awareness unit 716, and the swarm capabilities unit 708 may include a capabilities modeling configuration for obtaining individual functions and a behavior modeling configuration for modeling rules.

According to an embodiment, the SIC engine may be in charge of all calculations and rules related to a swarm. The swarm algorithms 703 may determine, according to simple rules, distributed collective behaviors of self-organized agents that locally interact, and the locally determined collective behavior may lead to a global intellectual behavior interacting with an environment. The swarm algorithms 703 may be based on biological algorithms based on behaviors of ants, birds, bees, and fish. Such behaviors may be applied to solve real-life problems, such as ant colony optimization (ACO) 704, the PSO 706, and artificial bee colony (ABC) The 707.

The ACO may use an indirect communication algorithm between ants, called stigmergy. The stigmergy was used by an interaction through an environment to solve a combinatorial (discrete) optimization problem and then has been modified to adapt to a continuous problem. An ACO algorithm enables global optimization to be found within a finite time, but it is difficult to determine an accurate time. An ACO solution space may be represented in a weighted graph. A purpose of ACO is to search for an optimal path in a construction graph. The ACO solution space is generally represented in a weighted graph called a construction graph, but the purpose of ACO is generally to search for the optimal path in the construction graph.

Merits of the ACO is robustness to avoid premature convergence and adaptive in nature and to have distributed computing for providing positive feedback that induces a good solution search suitable for a dynamic application. Disadvantages of the ACO is that although convergence is guaranteed, a convergence time is uncertain and a local optima solution may fail.

According to an embodiment, ACO may include AntNet, multiple trip rounding, elitist ant system, max-min ant system (MMAS), eigen ant and rank-based ant system (ASrank), continuous orthogonal ant colony (COAC), and recursive ant colony optimization algorithms. The ACO algorithm may be used for sequential ordering, scheduling, vehicle routing, assembly line balancing, probabilistic traveling salesman problem (TSP), DNA sequencing, 2D-HP protein folding, and protein-ligang docking.

In the PSO 706, communication between particles is used to solve direct and continuous problems without changing an environment, but may be modified to adopt a binary/discrete optimization problem later.

The PSO 706 is a clustering algorithm in fields of multi-purpose dynamic optimization and constraint condition processing, and is less adaptive, is highly scalable, and may require more operations than an ABC method that cause less regulations in partial optimization problem, speed, and direction. Because a solution space of the PSO 706 generally requires less calculations compared to other methods, it can be represented in a set of N-dimensional points to find an optimal point in an orthogonal coordinate system where a solution is easily found.

A fitness function for minimizing or maximizing a function may be selected. Achieving optimal convergence is strongly influenced by the inertia weight, and when an algorithm converges, fixed values of parameters may cause unnecessary fluctuations of particles.

According to an embodiment, the PSO 706 may include a standard particle swarm optimizer, a combined particle swarm optimizer, a modified particle swarm optimizer, and a particle swarm without velocity (PSWV), which may be used to track a dynamic system, evolve NN weights, analyze human tremor, registers 3D on a 3D biomedical image, control reactive power and voltage, and operate a game.

Communication between bees in the ABC 707 may be related to the quality of food sources in a dancing area. Such a dance of bees is called a waggle dance. The ABC is a new probability algorithm for relatively global optimization used for both discrete (modification) and continuous optimization problems. The ABC may be based on a generalized assignment problem (GAP).

The GAP aims to assign a series of tasks to a set of agents at minimum cost. Each agent indicate a single resource having limited capacity and each task may be assigned only to one agent because a certain amount of resources of the agent is required. The ABC is less adaptable, is highly scalable, and requires three times fewer repetitions to collect all food. The ABC may be applied to all functions where a combination (for example, finding an optimum object such as a finite set within a minimum spanning tree) and a single output (a single output of a total function) for all inputs are expected, but an output may be more complex. In other words, it is not an optimization problem such as "yes" or "no".

The ABC algorithm 707 may be used to optimize a problem of a plurality of purposes, such as a fuzzy or enhanced bee algorithm (EBA). According to an embodiment, the ABC may also include grouped BA (GBA), hybrid modified BA (MBA), cooperative ABC (CABC), and vector evaluated artificial bee colony (VEABC) algorithms.

The above-described algorithms (for example, ACO, SPO, and ABC) may each include 5 to 6 variations and may be modified when necessary. In addition to the above-described algorithms, intelligent water drop (IWD), firefly algorithm, bat algorithm (BA), bacterial foraging (BF), and Bif(alternatives) algorithm may be further included. Some algorithms quickly converge, but more resources may be used depending on a problem.

According to an embodiment, a swarm may have various functions. In other words, the swarm capabilities unit 708 may provide various functions that are obtainable via multi-systems and algorithms. The swarm capabilities unit 708 may include a swarm optimization unit 710, a scheduling load balancer 709, a cluster module 711, and a routing module 712 to search for an optimum or minimum cost solution from among all available solutions.

The cluster module may collect a set of similar or not similar types of agents compared to other clusters. The routing module 712 may control transmission or reception of data in the swarm such that a reverse node uses useful information collected by forward nodes, on a path from a source to a destination. Also, the scheduling load balancer 709 may control behaviors of devices in the swarm based on relative locations of preceding or following tasks in a schedule, summation evaluation rules and global pheromone evaluation rules.

According to an embodiment, a swarm rules and behavior unit 713 may include the rules unit 714 where swarm rules having various types are defined. The swarm rules generated by the rules unit 714 may include validation rules for data validation, rules for consistency check, calculation rules for computing values based on input data, and determination rules for business process path selection. The environmental awareness unit 716 may recognize how well a node interacts with an environment and cause a change in environment, a change in behavior, and determination based on properties and rules of nodes to sequentially change behaviors of the swarm.

A behavioral engine unit 715 and a knowledge engine unit 717 may model how to manage all behaviors of the swarm and knowledge of the swarm. The behavioral engine unit 715 and knowledge engine unit 717 may model behaviors and knowledge of the swarm, which seem globally intellectual, via minimum local interactions.

According to an embodiment, a swam intelligence framework 702 (SIF) may provide various protocols and utilities for communication and calculation between nodes supporting homogeneous and/or heterogeneous nodes. In other words, the swam intelligence framework 702 may support homogeneous and/or heterogeneous nodes.

According to an embodiment, a swarm intelligence simulator (SIS) 701 may simulate various operations by using different algorithm sets, simulate operations of a desired solution by combining various usage examples, and test various scenarios. In other words, the SIS may be a unit for easily simulating and finely adjusting operations of a required solution and testing various scenarios.

According to an embodiment, the swarm-based system of the present disclosure may include at least one of the swarm intelligence frame and the SIS, but when required, the swarm intelligence framework and the SIS may not be included in the swarm-based system. An IoTivity/middleware unit 719 may include an algorithm for communicating with IoT devices and indicating swarm intelligence in an IoT level. An operating system (OS) unit 720 may include an algorithm related to an application or OS required to operate the swarm including a plurality of devices.

Figure 7B:
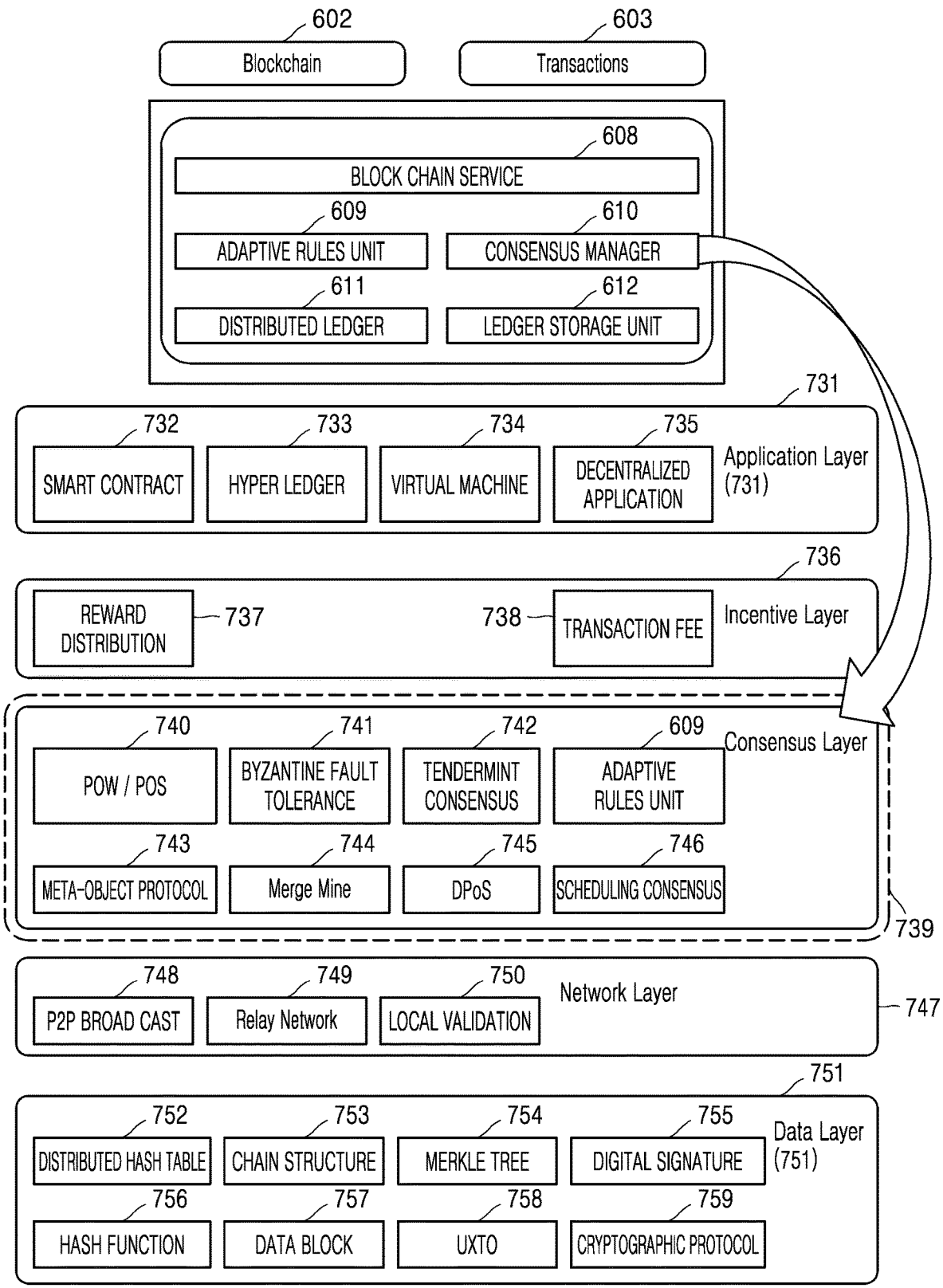
FIG. 7B is a diagram of a plurality of layers in a blockchain, according to an embodiment.

FIG. 7B is a diagram of a plurality of layers in a blockchain, according to an embodiment.

According to an embodiment, the blockchain unit 602 may include the adaptive rules unit 609, the consensus manager 610, the distributed ledger unit 611, and the ledger storage unit 612. However, the blockchain unit 602 is not limited thereto, and according to an embodiment, the blockchain unit 602 may include a peer-to-peer (P2P) protocol, rules, and other service components. According to an embodiment, the P2P protocol may be used for P2P connection between nodes/blocks in a distributed environment, and the ledger storage unit 612 may store ledgers where transactions are stored and store methods of storing transactions and generating ledgers.

The distributed ledger 611 may define methods and mechanisms of storing transactions between nodes, and blocks. The adaptive rules unit 609 may adapt the rules of the blockchain 602 generated by the rules unit 606. Processes by which the adaptive rules unit 609 according to an embodiment of the present disclosure adapts the rules may include changing, modifying and updating the rules. According to an embodiment of the present disclosure, the swarm-based system of the present disclosure may update, modify, and change the rules generated by the rules unit 606, based on feedback received with respect to behaviors of the swarm such that the rules become further adaptive, and operate based on the further adaptively generated rules to maintain the concept of the entire blockchain while expanding the rules to other usage examples.

In general, the blockchain may follow implied consensus rules, defined consensus rules, and runtime consensus rules. According to an embodiment of the present disclosure, the present disclosure relates to a technology for making the runtime rules further adaptive while maintaining integrity of the blockchain. The runtime rules according to the present disclosure are rules related to the blockchain, and may include rules related to swarm formation, leader election rules for generating a block, validation rules for validating a generated block, and decentralized consensus rules for unifying different transactions when content of the transactions conflict.

The swarm-based swarm may be adaptive, be robust, be excellently scalable, be distributed, and have self-organizing attribute, according to defined simple rules. The "runtime rules" according to the present disclosure may be based on a state, behavior, attribute, and property of an existing swarm to become further adaptive in maintaining the integrity of the blockchain, and may be generated, changed, and updated based on feedback of a swarm activity result.

The blockchain 602 may include a distributed digital ledger and the distributed digital ledger 611 may be used to record the transactions 603. Because the transactions 603 recorded in a ledger are unable to be retroactively changed without a change in all subsequent blocks, a change of any data may be detected based on integrity of changes in the transactions.

Unlike a general blockchain technology, the transactions according to the present disclosure may be performed not only between two entities but also between two groups, and a relationship between two groups may be further expanded. For example, one IoT (homogeneous and/or heterogeneous) device may share values (for example, data about properties, attributes, and current states of devices) of IoT devices with a plurality of IoT (homogeneous and/or heterogeneous) devices, and the blockchain may be generated by using the shared values. Such values may be raw values (for example, temperatures of air conditioners) or a function of values (for example, entropy).

Anomaly detection may be performed by using features of the blockchain and collective behavior of the swarm. The swarm may detect an anomaly in the swarm by using a specific algorithm and/or statistical method, and a behavior of the swarm may be used to set rules in the blockchain for detecting an anomaly. An anomaly detection method may be derived based on the current behavior of the swarm, and the blockchain may self-evolve when such rules are updated, based on evolution of the swarm.

Referring to FIG. 7B, unlike a general blockchain technology of managing transactions between two groups, a block of a blockchain system capable of generating 'intelligence' of a swarm is illustrated.

Values of the devices in the swarm may be based on raw data (for example, temperatures of air conditioners) or a function of raw data (for example, entropy). Accordingly, tampering or anomaly in the swarm may be detected by using an immutable attribute (for example, tamper-proof) of the blockchain. The behavior, attribute, property, and current state of the swarm may be used to set rules in the block for anomaly detection. The swarm-based system according to the present disclosure may detect a change in transaction by signing transactions of each block in a digital manner, by using an asymmetric encryption technique via an electronic signature and hash function, and the detected change in transaction may be used for the validation rules of the block in the blockchain.

The anomaly detection method according to an embodiment may be defined with respect to the current behavior of the swarm, by evolution of the blockchain when the current rules of the blockchain are updated in the blockchain 602 based on evolution of the swarm.

The blockchain may include an application layer 731, an incentive layer 736, a consensus layer 739, a network layer 747, and a data layer 751. According to an embodiment, the application layer 731 may provide an interface for an application program at an uppermost layer of the blockchain 602. Also, the incentive layer 736 may provide rewards to participants and units of the blockchain. Also, the consensus layer 739 may assign a set of transactions for processes that may be accepted globally, and assign a processing method and a total or partial order of such transactions. Also, the network layer 747 may propagate or broadcast the transactions between nodes. Recently, with respect to propagating of the transactions between the nodes, there is a demand to develop a technology for using a network bandwidth to the maximum limit, and the data layer 751 may include a blockchain data structure and physical storage.

The application layer 731 according to an embodiment may include a smart contact 732, a hyper ledger 733, a virtual machine 734, and decentralized application 735. For example, the smart contact 732 may provide a protocol for performing a transaction between two subjects without intervention of a third party, based on a commerce protocol. The hyper ledger 733 may provide a protocol for a blockchain including only certified nodes, unlike a public blockchain system where transactions are disclosed to all nodes. The virtual machine 734 block may provide an algorithm related to a machine required to perform an application in a virtual environment. The decentralized application 735 may provide an application for setting the decentralized consensus described above.

The incentive layer 736 according to an embodiment may include a reward distribution unit 737 and a transaction fee unit 738 The reward distribution unit 737 according to an embodiment may provide a reward for generating a block to a node that generated the block (for example, a node that is elected as a leader by finding an answer to a hash puzzle in the swarm). The transaction fee unit 738 may assign a transaction fee related to a transaction processing order stored in a queue of each node.

According to an embodiment, the consensus layer 739 may include a plurality of algorithms for providing rules related to operations of the blockchain. For example, the consensus layer 739 may include rules about POW/POS 740, byzantine fault tolerance (BFT) 741, a Tendermint consensus 742, adaptive rules unit 609, meta protocol 743, merge mine 744, delegated POS (DPOS) 745, and scheduling consensus 746. The POW or POS 740 algorithm may provide an algorithm for electing a leader for generating a new block from among nodes sharing the blockchain. The POW 740 algorithm is an algorithm used in bitcoin, which requests a computing work (for example, a hash puzzle) to nodes according to specific rules to make an attack of an attacker requesting the computing work economically unpractical, and as a result, protects the integrity of the blockchain. The POW algorithm is the most reliable algorithm because mathematical rules are accurately defined and a lot of energy and computing performance are requested according to specific rules. Accordingly, the attacker may require authority to interfere with a network considered impractical.

The POS 740 is a type of consensus algorithm and because there is no coin generation (for example, mining) in POS, a 'validator' may need to invest in system's coins in a POS type algorithm instead of investing in an expensive computer device during a competition for mining a block. However, all coins are present from day one and the validators (for example, stakeholders because they hold stakes in a system) need to strictly pay transaction fees. Also, when POS is used, a consuming task such as solving a hash puzzle to elect a leader for generating a block is not required, but a leader is elected according to the amount of held cryptocurrency. Accordingly, the more the cryptocurrency is accumulated, the more blocks the node generates. The POS is used together with various types of algorithms and may include a chain-based POS and BFT-based POS algorithm.

The Byzantine Fault Tolerance 741 or practical Byzantine Fault Tolerance (PBFT) is a consensus algorithm used for consensus in a distributed system and does not substantially satisfy a demand for economic consensus in the blockchain. The PBFT is unable to be executed in networks including a plurality of nodes due to required communication, and thus blockchain technologies using PBFT may be dependent only on a reliable sub-network of participants for setting consensus in the consensus layer 739 (for example, a unique node list of each participant in a ripple). In other words, by using a BFT or PBFT algorithm, a reliable swarm-based system may be provided despite there is a malicious or compromised node in a network.

The Tendermint consensus 742 does not require mining by applying an existing solution to a byzantine general problem, but may solve a "noting at stake" problem of the POS 740. A Tendermint-core may be a high-performance blockchain consensus engine capable of executing tolerant applications of the BFT 741 where security is guaranteed.

The DPOS 745 may operate on a same line as the POS 740 system except that an individual selects the most important entity that may represent a part of stake in the system. Accordingly, individuals having smaller stakes may form a team and expand their representations, and thus a mechanism to achieve power and balance of greater stake stakeholders may be generated. (for example, bitshares)

A concept of the merge mine 744 of mining does not require efforts of additional POW 740, and may denote a process for mining one or more cryptocurrency. The meta-object protocol (MOP) may provide a vocabulary protocol to manipulate or access a structure and behavior of an object system.

The adaptive rules unit 609 may provide various types of rules, such as implied rules, defined rules, and runtime rules. Such runtime rules are essentially fixed, but according to an embodiment of the present disclosure, the adaptive rules unit 609 may adaptively change the rules generated by the rules unit, based on changes in attribute, property, current state, and behavior of the swarm. In other words, the adaptive rules unit 609 may change the above-described rules based on the state, property, behavior, and attribute of the swarm. Accordingly, because the rules of the swarm may be changed based on the state, property, and behavior of the swarm, the consensus rules in the blockchain 602 may be dynamically adapted or evolved. The runtime rules adapted as such may be used to detect an anomaly or threat in the swarm by combining with an immutable attribute of the blockchain.

The data availability scheduling consensus 746 may be used by a user to vote whether a specific fact is true (1) or false (0). In such consensus, instead of determining a person to be rewarded according to "majority is right" by using rounds N of the scheduling consensus, rounds N+1 may be used to determine a person to be rewarded according to default equilibrium in which a person who voted accurately for rounds N is to be rewarded. The DPoS 745 may provide a modified consensus algorithm of POS further providing scalability by limiting the number of validation nodes of the block generated on the network.

The network layer 747 may manage the transactions between the nodes. For example, the network layer 747 may broadcast the transactions between nodes to at least one node in the network. In the network layer, there is a demand to develop a technology for using the basic network bandwidth as much as possible. The network layer 747 may include a P2P broadcasting unit 748, a relay network 749, and local validation 750 to set a P2P connection between nodes/blocks in a distributed environment.

The P2P broadcasting unit 748 may manage broadcasting of the transactions between nodes. According to an embodiment, the P2P broadcasting unit 748 may provide a broadcasting algorithm of transmitting a transaction, wherein a transaction is broadcasted to randomly selected nodes adjacent to nodes where the transaction is generated, and the node that received the broadcasted transaction again broadcasts the received transaction to randomly selected nodes adjacent thereto. The relay network 749 may provide a transmission algorithm for broadcasting the transaction between nodes that are targets of transaction start and destination. The local validation 750 may provide an algorithm by which a node that received a block where a transaction is recorded validates the received block.

The data layer 751 is a layer for blockchain data structure and physical storage device, and may include a distributed hash table 752, a chain structure 753, a Merkle tree 754, a digital signature 755, a hash function 756, a data block 757, an unspent transaction output (UxTo) 758, and a cryptographic protocol 759.

The distributed hash table 752 may provide a table where hash functions for hashing the transactions are stored. The hash table includes hashed values of transactions and enable the nodes in the blockchain system to detect changes in the transactions.

The chain structure 753 may provide a connection method of blocks generated after a genesis block (for example, an initially generated block). In other words, the chain structure 753 may define a structure of an entire blockchain by defining the connection method of blocks.

The Merkle tree 754 is a data structure in a form of binary tree and may provide an algorithm for deriving a single hash value for all transactions of the node. The swarm-based system according to the present disclosure may detect a change in single transaction even based on one hash value by compressing all pieces of transaction information into one hash value by using a Merkle tree structure.

The digital signature 755 may provide an algorithm for encrypting the hash value obtained by hashing all transactions. According to an embodiment, the swarm-based system may encrypt the hash values of all transactions by using an asymmetric encryption technique. A node transmitting the transaction may provide, to a reception node, an electronic signature together with a public key symmetrical to a private key used to encrypt the electronic signature such that the reception node validates the change in the transaction based on a hash value generated by decrypting the received electronic signature.

The hash function 756 is a function used to check change states of the transactions and may output a hash value of a fixed length regardless of an input value. The swarm-based system according to an embodiment of the present disclosure may hash the transactions by using the hash value twice consecutively, but is not limited thereto. The data block 757 may provide information about a structure of the generated block, a size of elements in the block, and the like.

The cryptographic protocol 759 may provide an encryption method of transactions in the blockchain used by the swarm-based system. According to an embodiment, the cryptographic protocol 759 may provide an asymmetric encryption technique using a private key and a public key.

The UxTo 758 may provide an algorithm for indicating entries remaining in the block without being used after cryptocurrency is received.

Figure 7C:
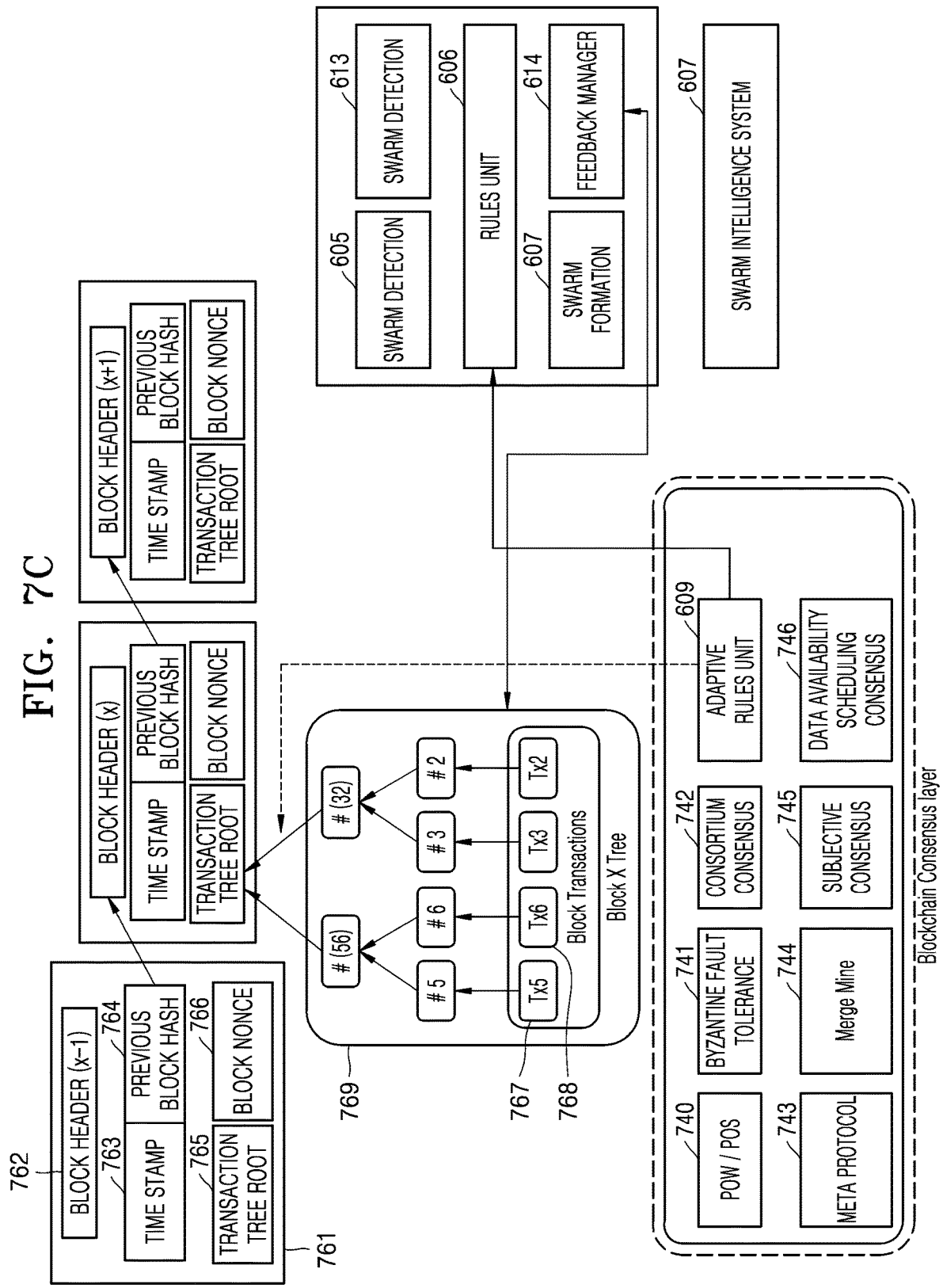
FIG. 7C is a diagram for describing processes of transaction in a blockchain, according to an embodiment.

FIG. 7C is a diagram for describing processes of transaction in a blockchain, according to an embodiment.

According to an embodiment, generation, formation, and evolution of the swarm based on a series of simple rule sets, state, attribute, and property of the swarm may be used to adapt rules to derive desired behaviors of the swarm. The runtime rules of the blockchain 602 are modified as the rules of the swarm change, and changes in raw values or a function of raw values may be recorded in a block as a transaction of the blockchain 602. The raw values of devices in the swarm may include data about the attributes, properties, and current states of the devices, and may be shared between nodes as transactions according to a pre-defined event (for example, the changes in attributes, properties, and current states of the devices).

The block shared by the nodes in the swarm according to an embodiment may include a block header 762, a time stamp 763, a previous block hash value 764, a transaction tree root 765, a block nonce 766, and version information of the block. For example, the version information of the block may include information about a system when the block is generated and the previous block hash value may include a unique hash value specifying a previous block. Also, the transaction tree root 765 may include information about a path of a hash value in a hash tree where hash values of transactions are recorded, and the block nonce 766 may be a reference for leader election in POW as an answer to a hash puzzle.

The hash values of the transaction in the blockchain has a tree structure and may be compressed to one hash value, based on the transaction tree root 765. For example, the swarm-based system according to an embodiment of the present disclosure may obtain a hash value #56 by using a hash function using transactions Tx5m and Tx6 767 and 768 of a lowest level as inputs, and obtain a hash value #32 by using a hash function using other transactions Tx3 and Tx2 of a lowest level as inputs. The swarm-based system according to an embodiment may input the obtained hash values #56 and #32 into a hash function to finally obtain one hash value, and store, in a memory, a path of the hash values obtained during these processes as a transaction tree root.

The swarm-based system using the blockchain 602 according to an embodiment may validate the transactions and a block where the transactions are recorded by using adaptive runtime rules. The hash values of all transactions in the blockchain may be recorded in the block header in a form of a hash tree (for example, the Merkle tree 754), and nodes that received the block where the hash value is recorded may detect whether the transaction is changed by comparing the hash values in the form of a hash tree with a hash value generated based on the transactions received.

The current state, attribute, property, and parameters of the swarm according to an embodiment of the present disclosure may be used to define dynamic rules (for example, changed, updated, and modified rules of the blockchain) and to make the rules of the blockchain further adaptive. Also, immutable attributes of the blockchain 602 combined to the (updated or modified) rules of the blockchain and attribute or property of the swarm may be used to detect an anomaly in the swarm. According to an embodiment, the dynamic rules of the blockchain may include at least one of the changed rules of the blockchain, the modified rules of the blockchain, and the updated rules of the blockchain, based on a change in the swarm.

According to an embodiment, the rules unit 606 of the swarm-based blockchain 602 may be adaptively generated and the rules may be updated based on received feedback (for example, the changes in attribute, property, behavior, and state of the swarm). The feedback may be provided by the feedback manager 615. The swarm may operate based on the received feedback and the dynamic rules.

Because features of the consensus layer 739 may correspond to the consensus layer 739 of FIG. 7B, detailed descriptions thereof will be omitted. Also, features of the swarm intelligence system may correspond to features of the swarm intelligence detection/formation unit 601, swarm intelligence system, and consensus by the nodes in the swarm of FIG. 7A, detailed descriptions thereof will be omitted. The blockchain 602 according to an embodiment of the present disclosure may include various types of rules, such as pre-defined and implied runtime rules. According to an embodiment, the runtime consensus rules are adaptively generated and may dynamically change based on the collective behavior, property, attribute, and state of the swarm. When the swarm rules are changed, the runtime consensus rules of the blockchain may dynamically evolve or be employed.

Figure 8:
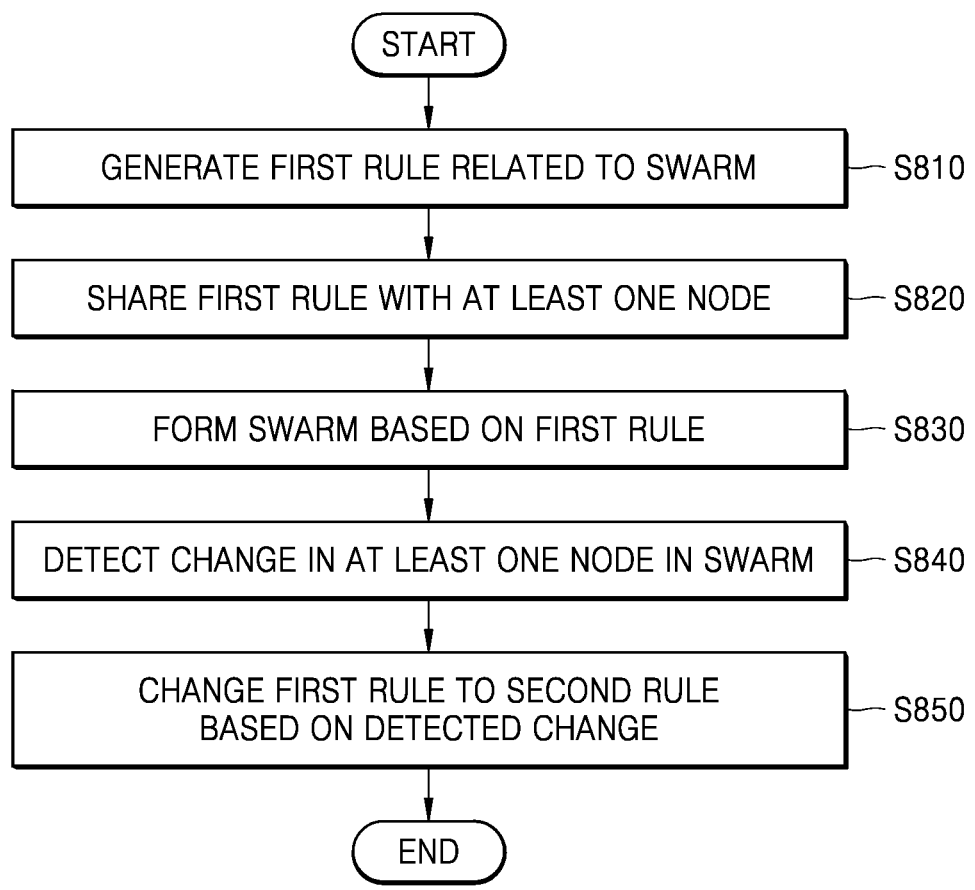
FIG. 8 is a flowchart of a swarm control method according to an embodiment.

FIG. 8 is a flowchart of a swarm control method according to an embodiment.

A swarm control apparatus according to an embodiment of the present disclosure is an apparatus for controlling a swarm by using blockchain, and may include a memory, a communication interface, and a processor. The swarm control apparatus according to an embodiment of the present disclosure may correspond to a swarm-based system and the swarm control apparatus or the swarm-based system may be included in one swarm or in each node in the swarm.

In operation S810, according to an embodiment, the swarm control apparatus may generate a first rule related to a swarm, based on attributes of at least one node included in the swarm. For example, the first rule generated by the swarm control apparatus may include at least one of rules for defining the swarm, runtime consensus rules for operating a blockchain, leader election rules for electing a leader node for selecting a block based on transactions, decentralized consensus rules for unifying differently generated blockchains, and simple rules defining local interactions of devices in the swarm.

For example, the swarm control apparatus may generate the first rule based on data about an attribute, a property, and a current state of the at least one node and a kernel function using the data about the attribute, the property, and the current state as an input.

In operation S820, the swarm control apparatus may share the generated first rule with at least one node. For example, the swarm control apparatus may broadcast the first rule generated based on changes in the attribute, property, and current state of the at least one node in the swarm to randomly selected nodes, and the all nodes in the swarm may share the generated first rule.

In operation S830, the swarm control apparatus may form a swarm including at least one node based on the shared first rule. For example, the swarm control apparatus may form a swarm between nodes sharing a same attribute, based on the shared first rule.

In operation S840, the swarm control apparatus may detect a change in the at least one node in the swarm. The change in the at least one node in the swarm may occur based on changes in the property, attribute, and current state of each node in the swarm, or changes in the nodes included in the current swarm may occur based on withdrawal of a device from the swarm or addition of a new device to the swarm. According to an embodiment, the swarm control apparatus may detect the changes in the attribute, property, and current state of the at least one node in the swarm, based on the first rule, and detect the change in the swarm, based on the changes in the attribute, the property, and the current state of the at least one node in the swarm. In operation S850, the swarm control apparatus may change the first rule to a second rule, based on the detected change. According to an embodiment, the first and second rules may include a rule regarding at least one of formation of the swarm, selection of a node for generating the block, validation of the block, and consensus of the blockchain.

According to an embodiment, the swarm control apparatus may share the generated second rule with at least one node and further detect a change in the at least one node in the swarm based on the shared second rule. Also, according to an embodiment, the swarm control apparatus may detect an anomaly node in the swarm, which shows an operation not corresponding to the second rule, based on the change detected based on the second rule.

The swarm according to an embodiment of the present disclosure may include at least one of a homogeneous or a heterogeneous node and operate based on at least one of the first rule and the second rule. Also, all nodes in the formed swarm may share transactions related to the first rule, the second rule, and operation histories of all the nodes in the swarm, and a blockchain in which at least one block where the transactions are recorded is connected in a chain form.

Figure 9:
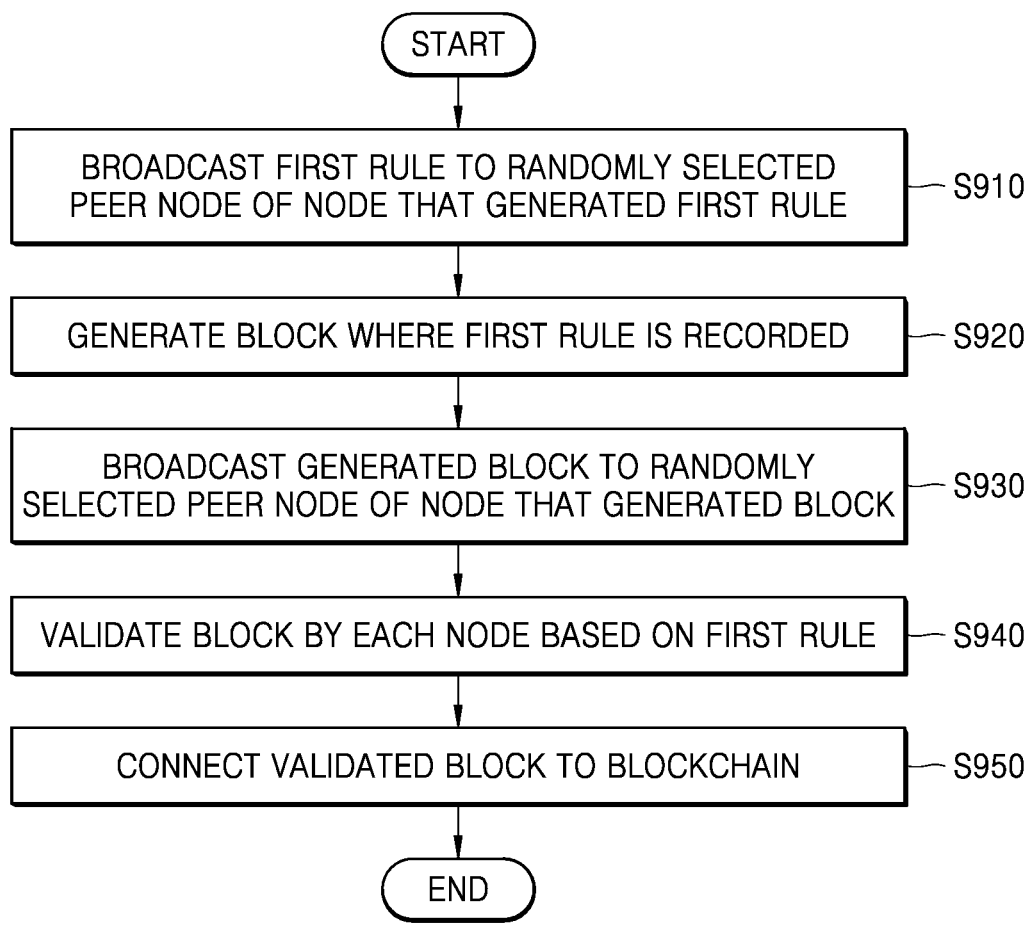
FIG. 9 is a diagram for describing in detail an operation of sharing a first rule, according to an embodiment.

FIG. 9 is a diagram for describing in detail an operation of sharing a first rule, according to an embodiment.

In operation S910, the swarm control apparatus may broadcast the generated first rule to a randomly selected peer node of the node that generated the first rule. According to an embodiment of the present disclosure, a peer node may denote a set of nodes adjacent to a corresponding node.

In operation S920, the swarm control apparatus may generate a block where the first rule is recorded. For example, the swarm control apparatus may determine whether the generated first rule is broadcasted to all nodes in the swarm and after the first rule is transmitted to all nodes in the swarm, determine a node that is to generate the block based on the first rule. According to an embodiment, the swarm control apparatus may elect a leader node for generating the block, based on POW, but is not limited thereto. The swarm control apparatus may cause a node selected as a leader to generate the block where the first rule transmitted to the node is recorded.

In operation S930, the swarm control apparatus may control the generated block to be broadcasted to a randomly selected peer node of the node that generated the block. In operation S930, a method of transmitting the newly generated block may correspond to a transmission method of the first rule of operation S910.

In operation S940, the swarm control apparatus may cause each node to validate the received block, based on the first rule. For example, the swarm control apparatus may cause each node in the swarm to validate the block based on the first rule, when all nodes in the swarm receive the newly generated block. Processes by which each node validates the block may include determining whether the node that generated the received block is a node elected as a leader according to the first rule and determining whether a transaction in the received block is not changed.

In operation S950, when the block is validated, the swarm control apparatus may connect the validated block to a blockchain. For example, the swarm control apparatus may cause each node that received the block to validate the block, and each node that successfully validated the block may connect the validated block to the blockchain already present in each node.

Figure 10:
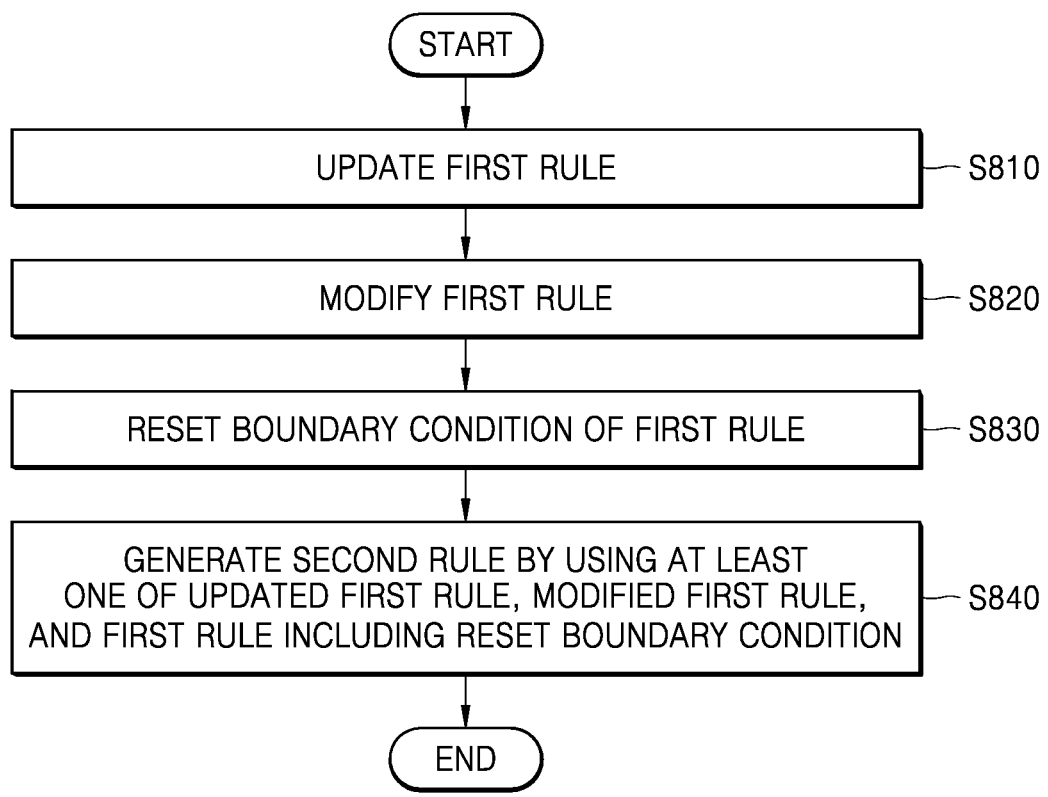
FIG. 10 is a diagram for describing in detail an operation of changing a first rule to a second rule, according to an embodiment.

FIG. 10 is a diagram for describing in detail an operation of changing a first rule to a second rule, according to an embodiment.

In operation S1010, the swarm control apparatus may update the first rule based on the detected change. In operation S1020, the swarm control apparatus may modify the first rule based on the detected change. In operation S1030, the swarm control apparatus may reset a boundary condition of the first rule based on the detected change. In operation S1040, the swarm control apparatus may generate the second rule by using at least one of the updated first rule, the modified first rule, and the first rule including the reset boundary condition.

For example, when a device having an operation temperature range of 12° C. to 18° C. is added to a swarm of which a current boundary condition is a temperature range of 10° ° C. to 14° C., the swarm control apparatus may update an entire operation temperature range of the swarm to 10° C. to 18° C. and newly define the swarm according to the updated temperature range.

Figure 11A:
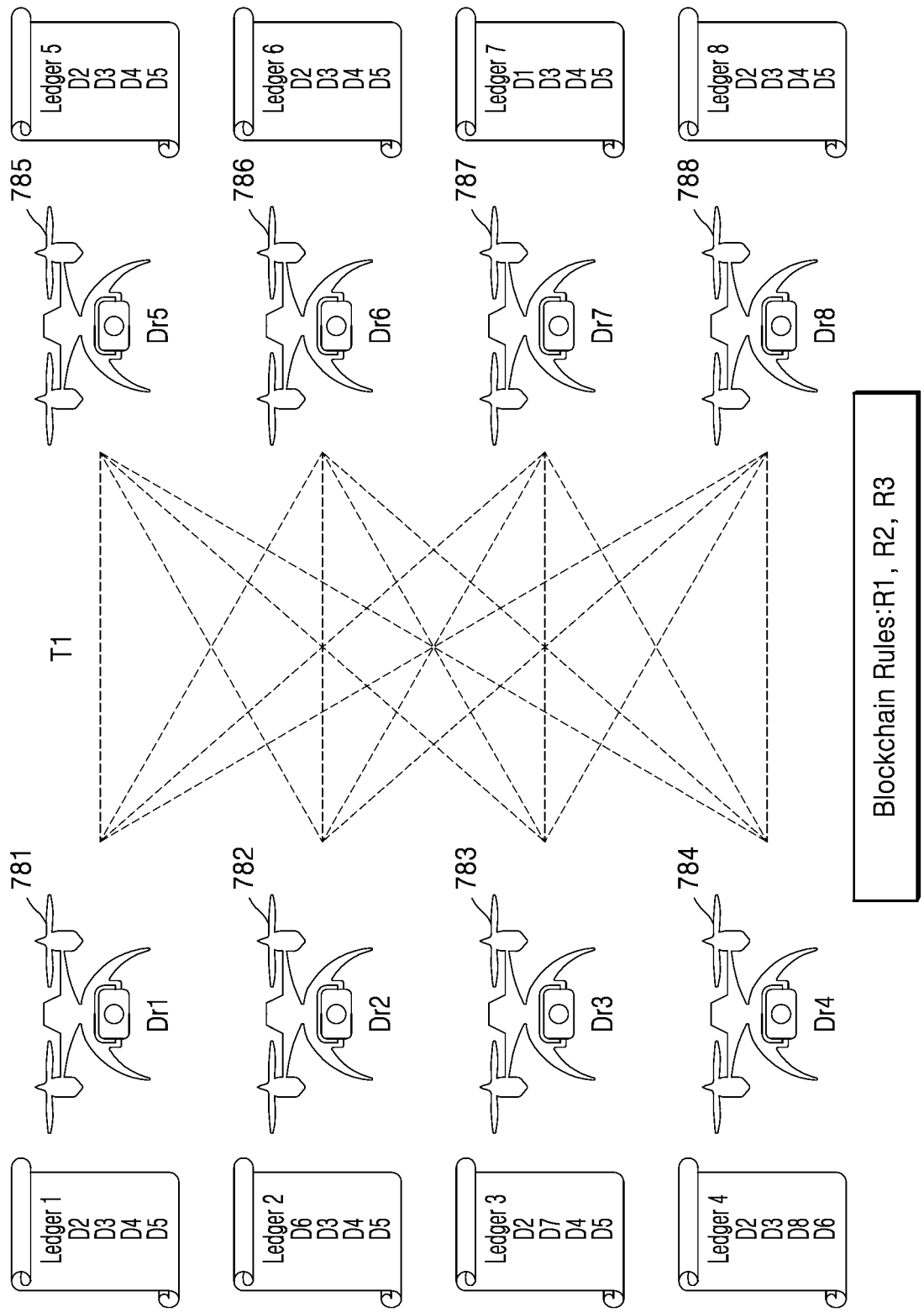
FIG. 11A is a diagram for describing a swarm including a plurality of drones, according to an embodiment.

FIG. 11A is a diagram for describing a swarm including a plurality of drones, according to an embodiment.

Referring to FIG. 11A, a plurality of surveillance drones provided to cover a landscape region by using mounted cameras are illustrated. FIG. 11A illustrates drone arrays Dr1 781 through Dr8 788, and surveillance drones may form swarms based on certain common attributes and properties, such as altitudes, coverage areas, and flight speeds. The purposes of such swarms are to maintain the attributes and properties of the swarms while covering the entire surveillance areas (for example coverage areas) at the same time.

For example, the surveillance drones may communicate with each other and pieces of data of the drones may be recorded in respective ledgers (for example, ledgers 1 through 8). According to an embodiment of the present disclosure, the ledgers respectively stored in the drones correspond to a blockchain in which blocks are connected to each other, and the drones may share the blockchain in which same transactions are recorded. Also, the ledgers respectively stored in the surveillance drones may be validated by the drones according to rules shared by the drones in the swarm. The validated ledgers may form the blockchain after entries corresponding to the drones Dr1 through Dr8 are validated. D1 through D8 indicated besides the drones of FIG. 11A are functions of current states, attributes, and properties of the surveillance drones and may be represented as Equation 3 below.

$$[D1, D2 \ldots D8] = [f(a1, p1, s1), f(a2, p2, s2), \ldots f(a8, p8, s8)] \quad \text{[Equation 3]}$$

Here, D1 through D8 denote values of functions using the attributes, properties, and current states of the drones in the current swarm as inputs, a1 through a8 denote attributes of current drones, p1 through p8 denote properties of the current drones, and s1 through s8 denote current states of the drones. Rules R1 through R3 of a blockchain may be derived as Equation 4 below from the functions D1 through D8 of the current states, attributes, and properties of the surveillance drones.

$$R1 = f1(D1, D2 \ldots D8)$$

$$R2 = f2(D1, D2 \ldots D8)$$

$$R3 = f2(D1, D2 \ldots D8) \quad \text{[Equation 4]}$$

Here, R1 through R3 denote the rules of the swarm, which vary depending on the attributes, properties, and current states of the drones in the current swarm, and f1 through f3 denote rules definition functions using, as inputs, output values of function f using data on the attributes, properties, and current states of the surveillance drones as inputs. Because the rules of the swarm including the plurality of drones include the data on the current states, the rules may be dependent on time. For example, the rules of the swarm may be represented as $R1_t$, $R2_t$, and $R3_t$ in time t, and the rules in each time may be dependent on the attributes, properties, and current states of the drones in the swarm.

According to an embodiment, the rules R1 may be a machine learning-based classification algorithm based on parameter values of the drone, which correspond to the attribute, property, and current state of the drone.

Figure 11B:
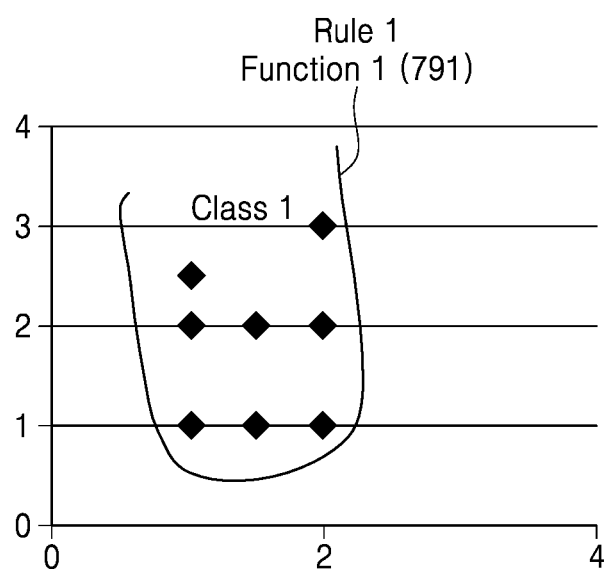
FIG. 11B is a diagram for describing a swarm including a plurality of drones, according to an embodiment.

FIG. 11B is a diagram for describing a swarm including a plurality of drones, according to an embodiment.

Referring to FIG. 11B, the plurality of drones may be indicated in a plurality of points in a curve showing the rules R1. According to an embodiment, the rules R1 indicate a machine learning-based drone classification and may be based on parameter values corresponding to an attribute, property, and current state. The drones following the rules R1 may be located in the curve corresponding to the rules R1.

For example, when the rules R1 is a support vector machine (SVM) that checks coverage of each drone and guarantees a collective behavior for current coverage to cover entire landscape, rules or training data may need to be updated according to the rules R1 as relative locations of the drones change over time. At a time T1, the attribute a1, the property p1, and the current state s1 may define a kernel function as follows.

$$K(a1p1, s1) = (a1p1 T1^{T1} s1 + c)^d \quad \text{[Equation 5]}$$

Figure 12A:
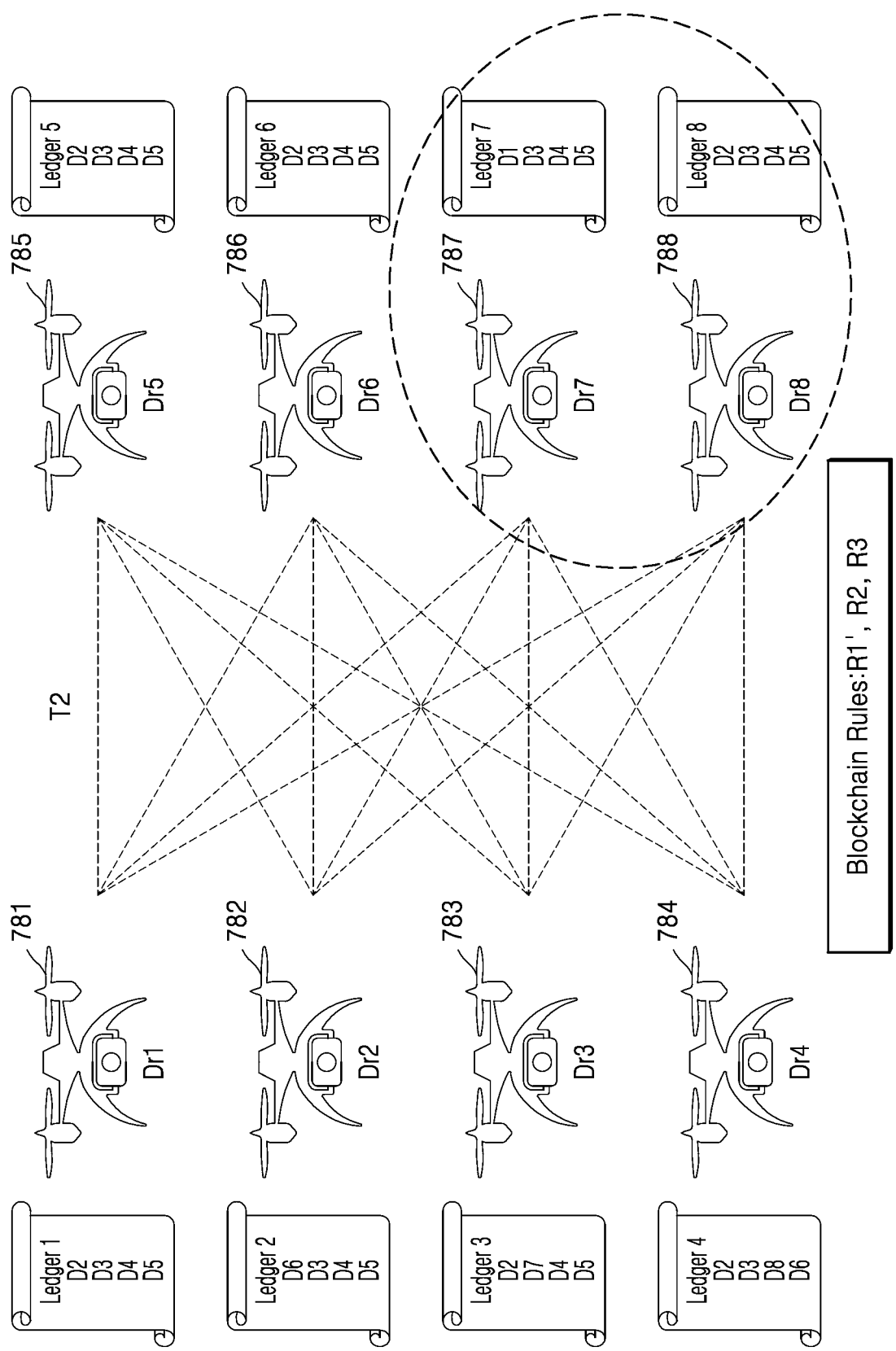
FIG. 12A is a diagram for describing a swarm including a malicious drone, according to an embodiment.

K denotes a polynomial kernel, c denotes a free parameter, a1p1 denotes a vector including the attribute and property of the drone, and s1 denotes the current state of the drone. Accordingly, all drones may operate according to an output of the defined kernel function, based on the state of swarm at T1. Referring to FIG. 12A, a situation in which two drones Dr7 and Dr8 from among the drones following the rules R1 in FIG. 11B moved to unexpected locations will be described.

FIG. 12A is a diagram for describing a swarm including a malicious drone, according to an embodiment.

At a time T2, when the plurality of drones have changed the relative locations and the two drones Dr7 787 and Dr8 788 are moved to unexpected locations, because values of the attribute and property of the swarm are changed, the rules R1 based on the kernel function K may be modified to rules R1' corresponding to a kernel function K'. At the time T2, the attribute ap, the property, p2, and the current state s2 may define a kernel function for SVM as Equation 6 below.

$$K(a2p2,s2)=(a2p2^{T2}s2+c)^d \quad \text{[Equation 6]}$$

Here, K denotes a polynomial kernel, c denotes a free parameter, T2 denotes a specific time, a2p2 denotes the attribute and property of the drone at the time T2, and s2 denotes the current state of the drone at the time T2. Changed behaviors of the polynomial kernel using the kernel function based on Equation 6 above may be represented by drones having an arrangement of points in FIG. 12B.

Figure 12B:
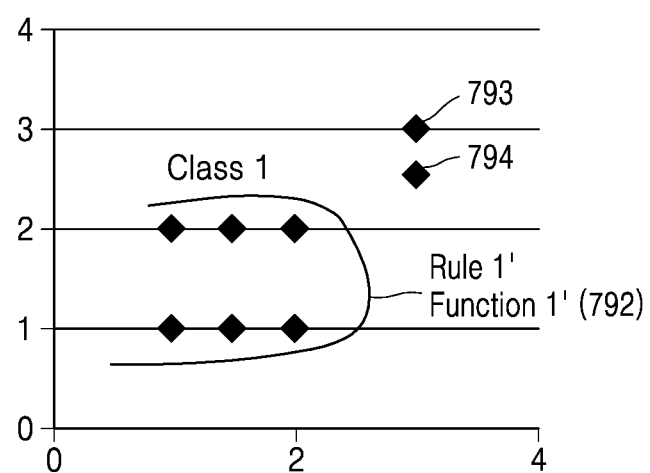
FIG. 12B is a diagram for describing a swarm including a malicious drone, according to an embodiment.

FIG. 12B is a diagram for describing a swarm including a malicious drone, according to an embodiment.

For example, referring to FIG. 12B, points may indicate locations of drones. The points located outside a curve indicated by the rules R1' may be the two drones Dr7 787 and Dr8 788 having the changed locations. At the time T2, as some drones changed their locations and the two drones Dr7 787 and Dr8 788 are moved to the unexpected locations, values of attribute and property of a swarm are changed, and the rules R1 based on the kernel function K may also be modified to the rules R1' corresponding to the kernel function K'.

In other words, when the rules are not modified based on the current state of the swarm, anomaly of the drones Dr7 787 and Dr8 788 may not be detected, but the swarm-based system according to the present disclosure is able to detect the anomaly drones Dr7 787 and Dr8 788 because adaptive rules changed and updated based on the state and property of the swarm are used.

Figure 13:
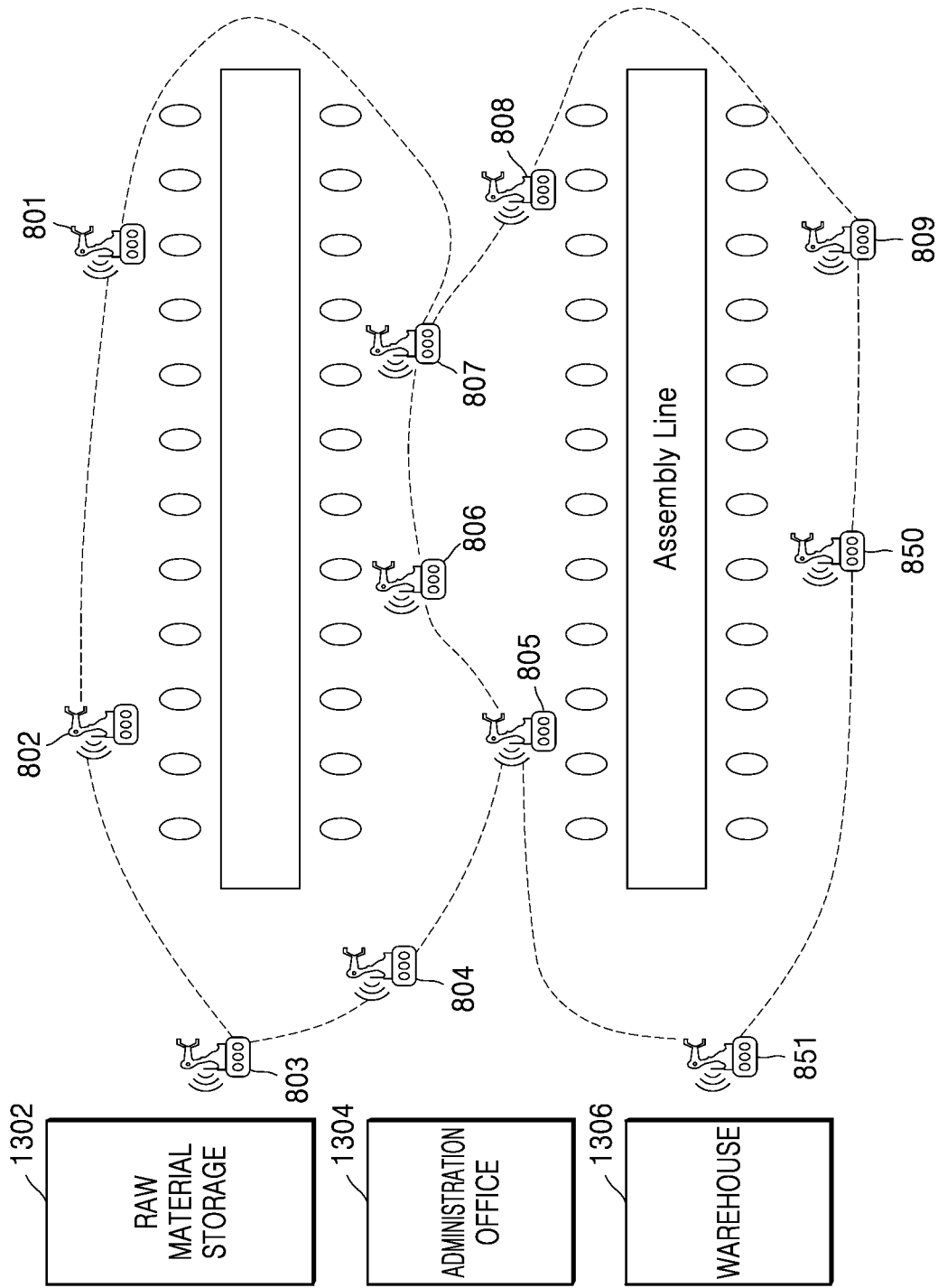
FIG. 13 is a diagram for describing a swarm including industrial robots in a manufacturing assembly factory, according to an embodiment.

FIG. 13 is a diagram for describing a swarm including industrial robots in a manufacturing assembly factory, according to an embodiment.

The swarm including at least one mobile industrial robot may operate on an assembly line, and the mobile industrial robots may supply raw materials from a raw material storage 1302 to a required place according to a request of an administration office 1304 and convey a completed product to a warehouse 1306. For example, when the administration office requests a raw material of a product, the robots may form a swarm according to consensus between the robots and a job required to the formed swarm may be assigned.

For example, the swarm control apparatus may generate rules according to a request of the administration office requesting the raw material, and form a swarm of robots required for a task according to the generated rules. The swarm control apparatus may assign a job to the formed swarm according to the request of the administration office, detect a change in the swarm, and detect anomaly of robots in the swarm during the task, based on the detected change.

According to an embodiment, a schedule for the robots may be pre-defined or determined based on a request, the schedule and request of the robots may form a transaction, and formed transaction may be recorded as a part of a blockchain. The swarm control apparatus according to the present disclosure may prevent a redundant task and verify a fact that there is a robot to process the task.

According to an embodiment, when the administration office requests an item but there is barely no robot to convey raw materials, the swarm may set a shortest path of robots capable of providing a required amount within a shortest time. According to various requests of the administration office, rules of the swarm (for example, runtime consensus rules and rules for consensus of nodes participating in the blockchain) may be changed, rules of blockchain for nodes corresponding to the mobile industrial robots may be updated, changed, and modified, and transactions shared between the nodes are not changed based on the rules of the blockchain. Accordingly, when a transaction occurs within the swarm including the plurality of mobile industrial robots, the probability of a transaction occurring against the generated transaction is very low, and thus the swarm including the plurality of mobile industrial robots may effectively complete the task while avoiding a redundant task.

According to an embodiment, an ACO approach method in the swarm may be applied to a scheduling permutation problem described above called a single machine total weighted tardiness problem (SMTWTP). Such aspects may be arranged in a component list that configures an ACO algorithm as below. For example, the list configuring the ACO algorithm may provide SMTWTP problems about SMTWTP 'n' jobs in which pheromone information A (for example, pheromone encoding) and a construction solution B (for example, pheromone evaluation and adaptation heuristics) are to be scheduled to a single machine.

All jobs j∈[1:n] may include a due date 'dj', a processing time 'pj', and a weight 'wj'. When Cj denotes a completion time of a job j in a schedule, Lj=Cj−dj defines may lateness and Tj=max(0,Lj) may define delay state (for example, tardiness).

A goal is to find a schedule that minimizes total weighted tardiness of all jobs 'nj=1 wjTj' (indicates that it is desirable to assign an item j to an i in a permutation. Here, a pheromone matrix is a matrix in a form of a place by item and in SMTWTP, an ant may determine which job is at a next place after determining which schedule is the first in the schedule.

The pheromone evaluation of the ACO algorithm is about how pheromone information is used by ants for determination of the ants. A local evaluation of a pheromone value may be possible for SMTWTP. An ant that needs to determine which job is at a next place i of the permutation may consider all values τij, j∈ S indicating how well a selectable job is performed at the place. However, the highest pheromone value of some selectable jobs j∈ S may be τij.

$$p_{ij} = \frac{\sum_{l=1}^{i} \tau_{ij}^{\alpha} \cdot \eta_{ij}^{\beta}}{\sum_{z \in S}\sum_{l=1}^{i} \tau_{ij}^{\alpha} \cdot \eta_{ij}^{\beta}} \forall_j \in S \quad \text{[Equation 7]}$$

All ACO algorithms may use only a local evaluation. In a pheromone evaluation method and ACO, an effect of a change in a pheromone value may indicate an instance result of a very simple SMTWTP test. The instance result of the simple SMTWTP test may include 50 jobs, i.e., i∈[1:50], having a processing time pi=1, a due date di=i, and a weight wi=1.

Clearly, a job i at the i-th place is the only optimal solution with zero cost, wherein i is 1-n. In adaptation heuristics, there is priority heuristics that may be used to determine which job is next during scheduling with respect to a plurality of (scheduling) problems. Un-weighted type SMTWTP may be a modified due data (MDD) rule.

$$\eta_{ij} \cong \frac{1}{\max\{\tau + p_j, d_j\}} \quad \text{[Equation 8]}$$

Here, T is a total processing time of all already-scheduled jobs. As such, it may be determined that a job with a neardue date is preferable from among all jobs that are due before a next scheduled due date via heuristics. Also, all jobs will end before their due dates. Care should be taken when using standard priority heuristics to schedule problems in the ACO algorithm. This is because a heuristic value may not suitably reflect an effect on determination of an ant. To avoid such an effect, adaptation heuristics need to be used.

$$\eta_{ij} = \frac{1}{\max\{\tau + p_j, d_j\} - \tau} \quad \text{[Equation 9]}$$

Here, T is a total processing time of all already-scheduled jobs, $p_j$ denotes a processing time, and $d_j$ denotes a due date. A result shows that using the adaptation heuristics or global pheromone evaluation improves a result considerably and using both is the best.

For example, in case of smart meters (SMs) installed in smart homes or smart city, security of an IoT environment may be important because each SM may be an IoT device and wirelessly connected to other SMs. In the smart city, securing a smart meter infrastructure (AMI) is a key component of securing a smart city infrastructure, and main issues of AMI security may be securing a smart energy manager and detecting an attack on such SMs. According to an embodiment, the swarm intelligence does not require a centralized server and may detect local attackers by using anomaly detection algorithm.

SMs following the simple rules are considered as IoT nodes and anomalies may be detected based on distance measurement algorithms in which the nodes follow the simple rules.

For example, energy consumption units of the SM (for example, its energy meter value) may consider raw values or a function of raw values as transactions. Such transactions are shared between the nodes and calculation may be performed in a node level. Swarm rules may be adapted or changed according to a change in behavior of the swarm to self-obtain a desired behavior. When an operation is not desirable, the swarm rules may be evolved and updated, based on a current state, behavior, and property of the swarm. Also, consensus of the nodes for detecting an anomaly in the swarm may be based on runtime rules. Such runtime rules may be further adaptively generated to reflect the current state of the swarm and such rules may be validated.

Figure 14:
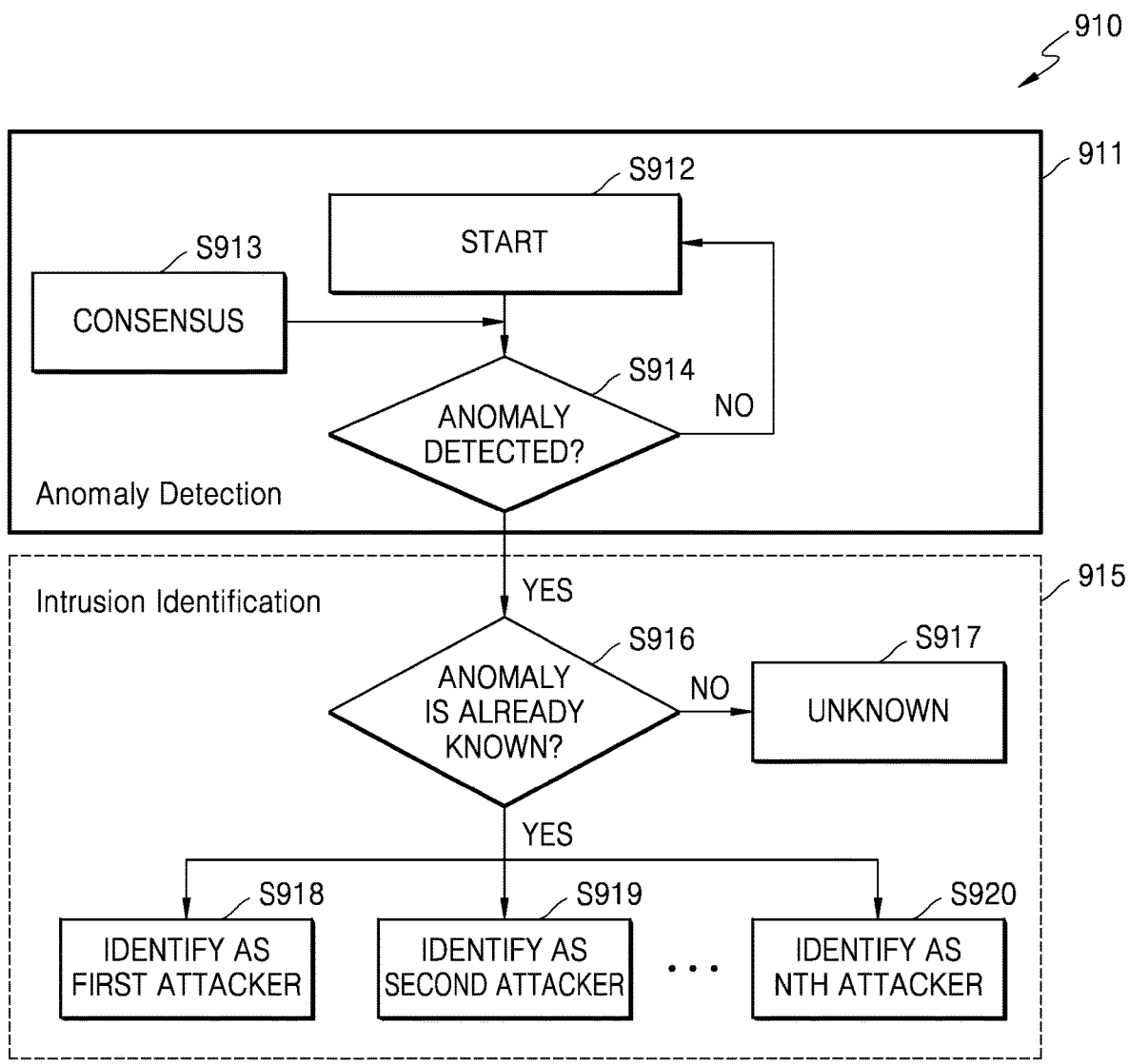
FIG. 14 is a diagram for describing processes of anomaly detection and intrusion identification, according to an embodiment.

FIG. 14 is a diagram for describing processes of anomaly detection and intrusion identification, according to an embodiment.

A target of an attacker on a swarm is to compromise a node (for example, an SM) included in the swarm and transmit malicious data to a dispatch center to attempt to intrude into an infrastructure of the node. An intrusion technique of the attacker may be largely classified into three categories, such as physical attacks, cyber attacks, and data attacks. Also, the intrusion technique may be more broadly classified into disclosure that is an unauthorized access to information, deception regarding acceptance of wrong false data, disruption regarding interruption or prevention of correct information, and usurpation about controlling a part of a system without permission.

Referring to FIG. 14, in operation S912, a swarm-based system may start a process of anomaly detection. In operation S913, the swarm-based system may generate, modify, and update consensus rules in a blockchain and in operation S914, the swarm-based system may detect an anomaly node in the swarm, based on the generated, modified, and updated consensus rules. According to an embodiment, when an anomaly is not detected in the swarm, the swarm-based system may re-start the process of anomaly detection of operation S912.

In operation S916, the swarm-based system may determine whether a detected anomaly is already known. For example, the swarm-based system may store a history of anomalies detected in the past in a memory and determine whether a currently detected anomaly is an already known anomaly based on the stored history of anomalies detected in the past.

In operations S918 through S920, the swarm-based system may identify a first attacker (operation S918), a second attacker (operation S919), or an nth attacker (operation S920) when the detected anomaly is identified as an anomaly already known to the swarm-based system. However, in operation S917, when the anomaly is not already known (for example, determined as unknown), the swarm-based system may store information about the detected anomaly in the memory.

Figure 15A:
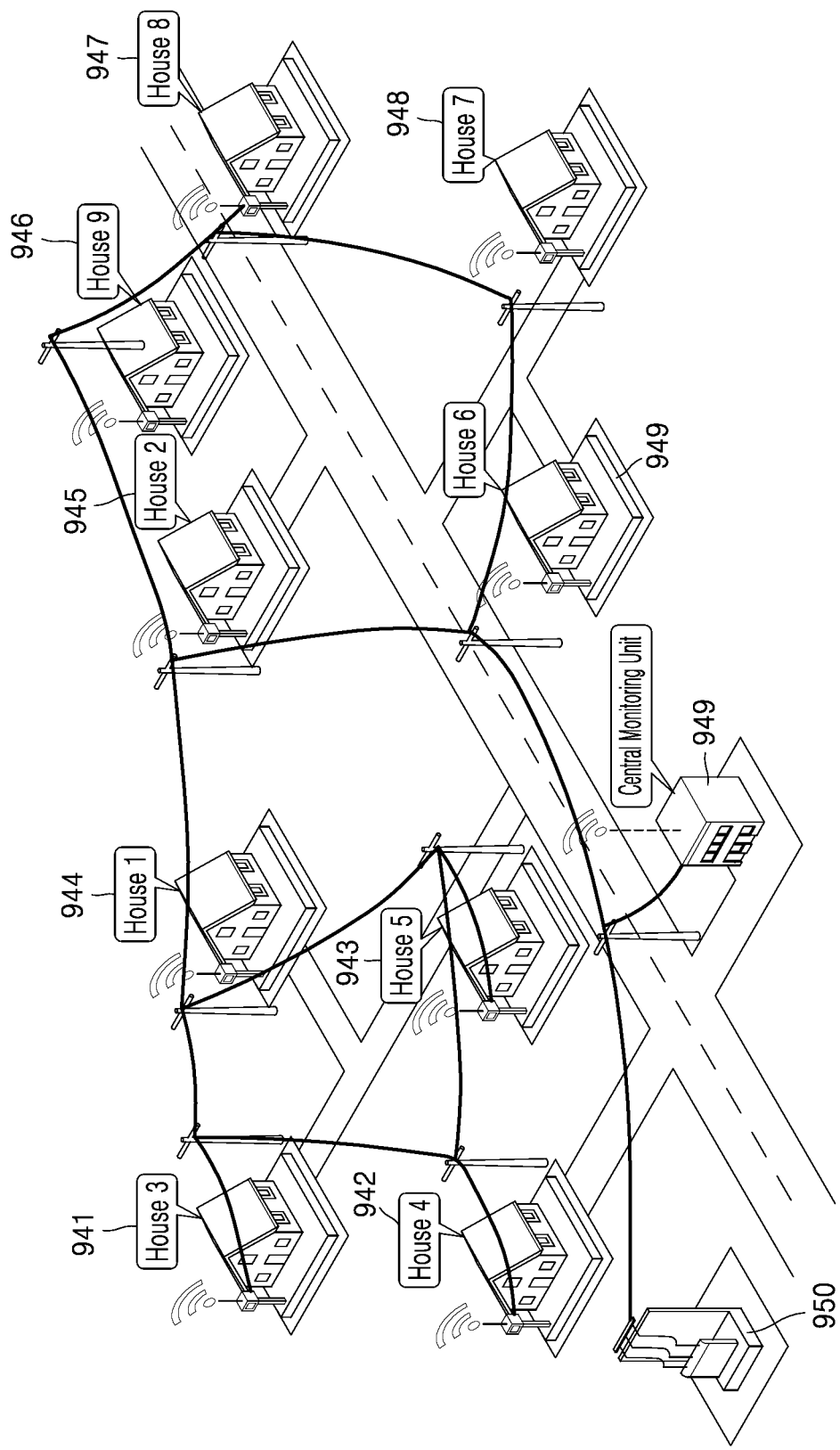
FIG. 15A is a diagram for describing a process of attacking a smart home where a smart meter is installed, according to an embodiment.

FIG. 15A is a diagram for describing of a process of attacking a smart home where an SM is installed, according to an embodiment.

An example of a swarm of SMs according to an embodiment of the present disclosure will be described with reference to FIG. 15A. Each SM is an IoT device, includes an advanced metering infrastructure (AMI), and denote a node in the swarm. Also, all nodes in the swarm includes a Wi-Fi function and may communicate with each other. The nodes in the swarm may be connected to neighboring nodes by using a wireless link (for example, Wi-Fi or Bluetooth). The nodes themselves are 'dumb', but together, they may detect an attack. Thus, a set of such nodes may be connected wirelessly to form the swarm.

A plurality of SMs may identify neighboring nodes (for example, SM devices), based on a received signal strength indicator (RSSI) and timing information. Here, parameter values that are exchanged are moving average values and may be used to form rules of a blockchain.

First, processes, performed by a swarm control apparatus, of swarm formation between SMs will be described. M initiating nodes (for example, SMs) may be randomly identified based on internal clocks of the SMs. Here, the internal clocks of SMs may be asynchronized and may independently operate.

Each initiating node may transmit, to one of randomly selected neighboring nodes, a blank fixed-length ledger having a size N. A node (specific SM) that received the ledger may identify whether its name is already included in the ledger. When the name is not included in the ledger, the node that received the ledger may register its name in the ledger and again transmit the modified ledger randomly to its neighboring nodes. Such processes may continue until all M circulating ledgers are full or a time limit expires. Entries in the ledger may determine members of a swarm related to the ledger. By defining rules, a certain number of nodes that may overlap in each swarm may be determined.

According to an embodiment of the present disclosure, the SMs in the swarm may share a blockchain in which pieces of data of the SMs are recorded as transactions. For example, each swarm may include M nodes and include a blockchain. Each initiating node may randomly select a value r and add the value r to its energy meter value $e_1$. Here, the random value r added to its energy meter value is only known to the initiating node. The initiating node may transmit, to one of randomly selected adjacent nodes, a sum $v_1$ of its energy meter value $e_1$ and the random value r.

Also, a second node in the swarm, which received the value $v_1$, may again transmit, to its randomly selected adjacent nodes, a value $v_2$ obtained by adding its energy meter value $e_2$ to the value $v_1$. Accordingly, a node that received an i-th value in the swarm may receive a value $v_{i-1}$, and transmit, to one of randomly selected neighboring nodes, a value $v_i$ obtained by adding its energy meter value $e_i$ to the value $v_{i-1}$. Such processes may continue until all nodes in the swarm added their energy meter values and the total of all energy meter values is returned to the initiating node. The initiating node may subtract the random value r that was initially added and obtain an average energy meter value $v_s = v_1 + v_2 + \ldots v_i$ for the swarm.

The energy meter values of the nodes in the swarm are privacy-preserved, and the nodes are unable to know an energy meter value of which node is a specific energy meter value. The moving average values may be circulated in all nodes in the swarm together with a date/time stamp. Processes in which the moving average values are circulated in all nodes in the swarm together with the date/time stamp may be stored in all nodes as transactions.

When $T_s$ denotes a time stamp, a block of the blockchain may be indicated as a function of $\{v_s, T_s\}$. The transactions in each block in the swarm may be all hashed and batches of encoded valid transactions may be maintained. Each block may include an encoded hash of a previous block in the blockchain and the blocks may be linked. The linked blocks may form the blockchain for a specific swarm.

As described above, processes in which the initiating node adds the random value r to its energy meter value $e_1$, transmits the value $v_1$ obtained by adding the value r and its energy meter value $e_1$ to one of neighboring nodes, and obtains the average energy meter value $v_s$ by using the sum of all energy meter values excluding the random value r added initially may be periodically repeated for each time period TP, according to an application program.

For example, with respect to attacker (for example, energy thief) detection, period Tr=1 hour typically and after the time period TP, other transactions are performed and a next block in the blockchain may be formed. All nodes in the swarm-based system may include a copy of the blockchain. According to an embodiment, because separate blocks are not simultaneously generated, there is no concern for a temporary pork. Also, a block time may denote an average time taken to generate one additional block by a network in the blockchain.

When $T_t$ denotes a time required to transmit an intermediate value $v_i$ and $T_c$ denotes a calculated time, according to an embodiment of the present disclosure, the block time may be $T_B = M(T_t + T_c)$. According to an embodiment of the present disclosure, the block time $T_B$ may be smaller than the time period $T_P$. According to an embodiment, in an example of moving average, the calculated time $T_c$ may be a time required to add two floating point numbers.

By storing data in all nodes in the swarm, the blockchain may remove a risk that may occur when storing data in a centralized manner. At the same time, information (privacy) of each node may be preserved. According to an embodiment of the present disclosure, because the blockchain used by the swarm-based system uses a time stamp shared by the initiating node as a time stamping scheme, the blockchain may not depend on POW or POS. Thus, the swarm-based system according to an embodiment of the present disclosure may be further efficient in terms of calculation or design, and may be more helpful in real-time application.

Figure 15B:
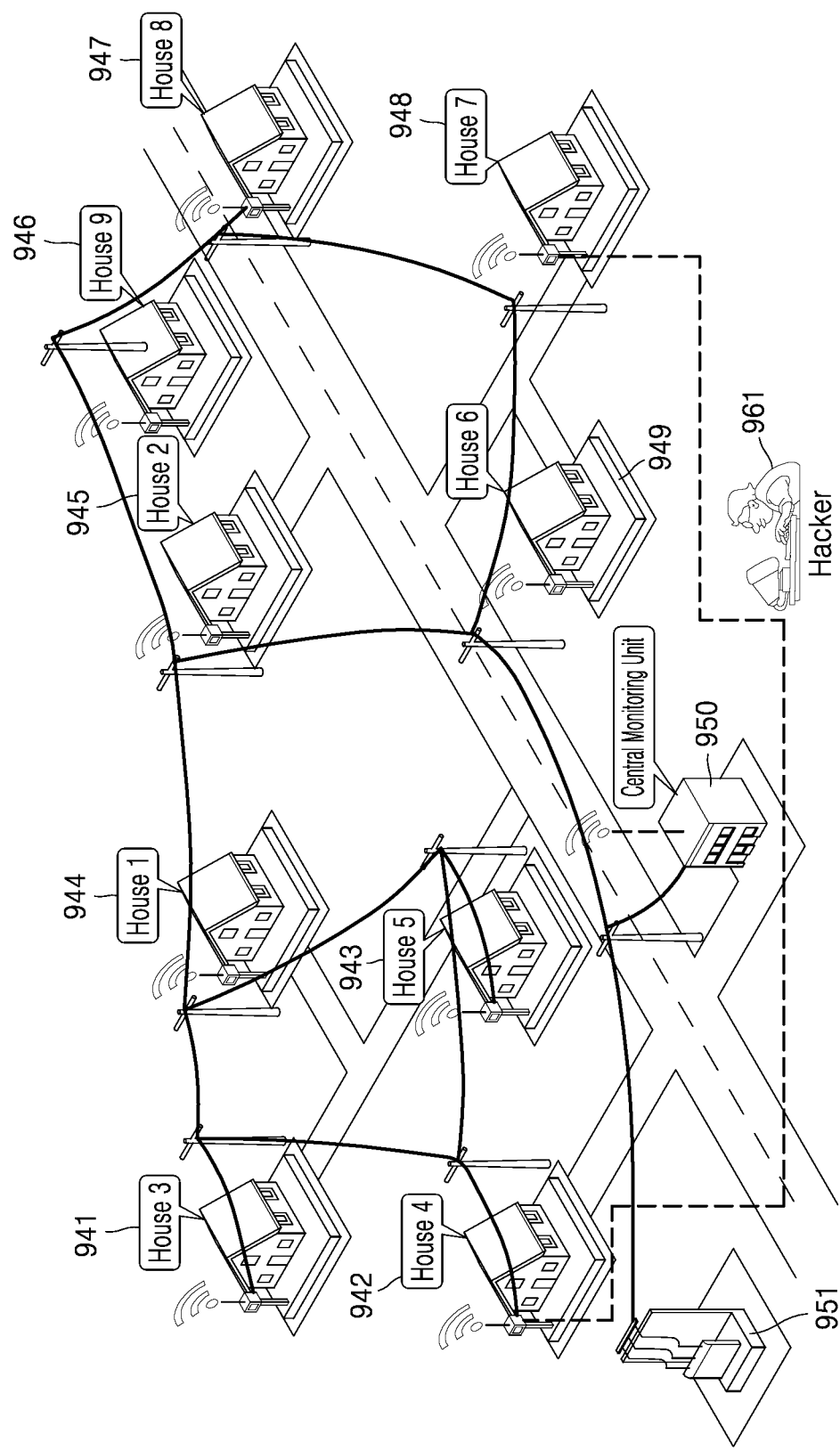
FIG. 15B is a diagram for describing a process of attacking a smart home where a smart meter is installed, according to an embodiment.

FIG. 15B is a diagram for describing of a process of attacking a smart home where an SM is installed, according to an embodiment.

Referring to FIG. 15B, a process of anomaly detection in a swarm will be described. The process of anomaly detection may vary depending on a type of an application. For example, in an energy attacker detection example of FIG. 15B, when an allowable deviation level of moving average is Δd and Δd satisfies Equation 10 below, it may be considered that a corresponding SM is compromised.

$$\Delta d < |v_s(T_s) - v_m(T_s)| \qquad \text{[Equation 10]}$$

Here, $v_m(T_s)$ denotes a sample value of an mth MS at a time $T_s$ and $v_sT_s$ denotes a sample value of a sth MS at the time $T_s$. Accordingly, tampering or anomaly may be detected by using an immutable attribute (tamper-proof) of the blockchain itself. An IoT device that is to modify its energy meter value may be considered to be flagged and thus may detect an anomaly. When a malicious or compromised node is to perform a malicious behavior, because data has been already shared with other people and thus costs of data forgery are high, the data is impossible to be modified again later.

According to an embodiment of the present disclosure, an anomaly may be detected by using moving average values of different blockchains (for different swarms) together. A function of the moving average values of different blockchains (for different swarms) may also be used. In summary, a swarm-based system may set a simple series of rule sets to achieve a desirable behavior required by a system user. When the desirable behavior is not achieved, swarm rules may be further adaptively generated based on feedback indicating changes in a current state, property, and attribute of nodes in the swarm. Such adaptive rules may be inputs for runtime rules of a consensus manager of a blockchain and immutable attributes of the blockchain guarantee new rules to be complied and consensus to be reached. In other words, the above-described features may be used to detect an anomaly and threat in an environment of IoT devices.

Figure 16:
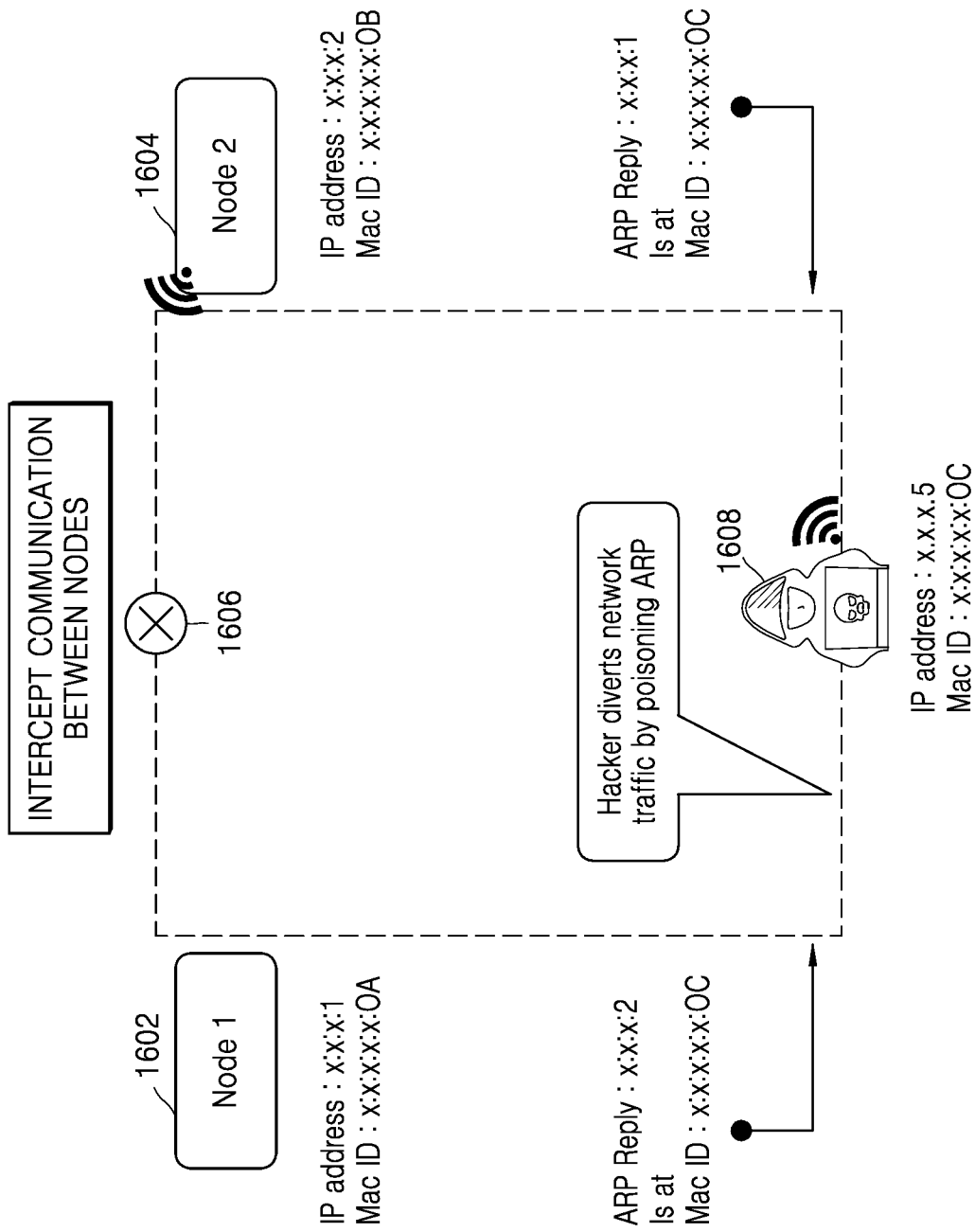
FIG. 16 is a diagram for describing a man-in-the-middle attack technique in which a data packet of a counterpart in a local area network is intercepted using an address resolution protocol.

According to an embodiment of the present disclosure, the swarm may include various devices, such as a refrigerator, a washing machine, a TV, and a toaster. Such various devices have different types of consumption profiles and properties, and when the various devices become parts of a swarm, individual properties of the devices may be used to modify rules of the swarm to solve changes in the nodes in the swarm. FIG. 16 is a diagram for describing a man-in-the-middle attack technique in which a data packet of a counterpart in a local area network is intercepted using an address resolution protocol.

Address resolution protocol (ARP) poisoning is a technique of intercepting data of a counterpart in a local area network by using an ARP for media access control (MAC) address matching against an Internet protocol (IP) address. In other words, in a swarm including a plurality of SMs, an attacker 1608 may periodically transmit an ARP reply packet to an attack target node to intercept data transmitted and received between two nodes 1602 and 1604 (for example, two adjacent SMs) that are attack targets.

However, it is very difficult for an attacker in a swarm controlled by the swarm control apparatus according to an embodiment of the present disclosure to manipulate specific data in a node. Pieces of data of all nodes in the swarm according to the present disclosure are stored in a block as transactions, the stored blocks are shared by all nodes in a form of a blockchain, and the shared blockchains may match content of the transactions based on decentralized consensus rules of the blockchain. Accordingly, to modify specific data, the attacker needs to modify the data by intercepting packets between all nodes in the swarm, but because costs are practically high, an attack of the attacker 1608 on the swarm is highly likely to fail.

Figure 17:
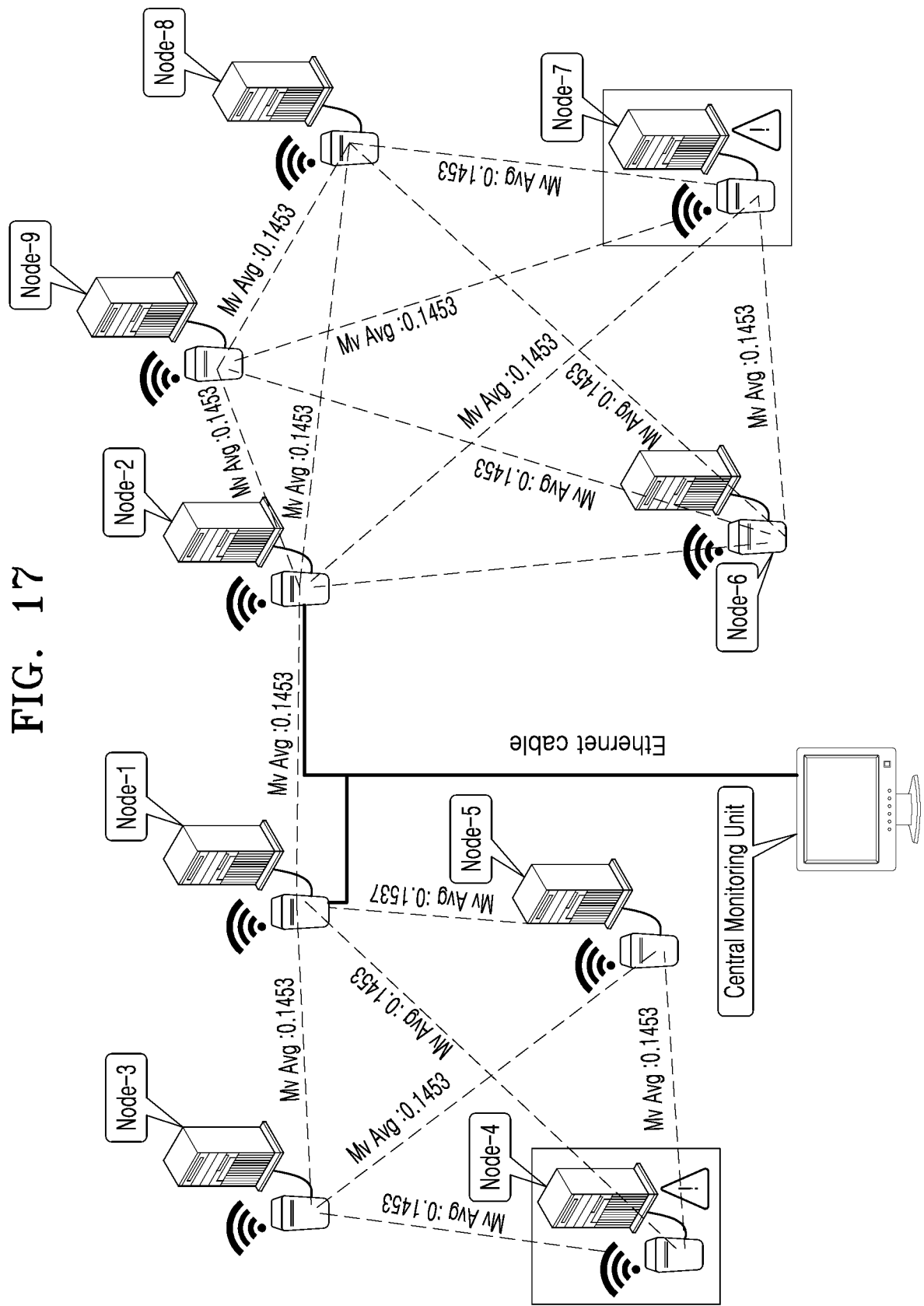
FIG. 17 is a diagram for describing a process of detecting an anomaly in a swarm, according to an embodiment.

FIG. 17 is a diagram for describing a process of detecting an anomaly in a swarm, according to an embodiment.

According to an embodiment, a swarm control apparatus may calculate entropy of a valid reading during a specific period of each node in a swarm. An entropy value (a measurement value of a degree of disorder) Hi of a node i may be periodically transmitted to closest neighboring nodes. A function ΔHi may be used to collectively determine a location of an attacker. Calculations of each node need to be stored as transactions and are used to validate rules of the blockchain 602, and a malicious node may be identified based on consensus.

In other words, a swarm control apparatus according to an embodiment of the present disclosure may record, in a block, entropy values of the nodes controlled by the swarm control apparatus as transactions and detect an anomaly node in the swarm based on the recorded entropy values. The concept for identifying an anomaly or malicious node in the swarm described above may be applied to an expanded swarm including swarms. According to another embodiment, a swarm-based system may use a method other than entropy to identify a malicious node and a method for identifying a malicious is not limited to entropy.

Figure 18:
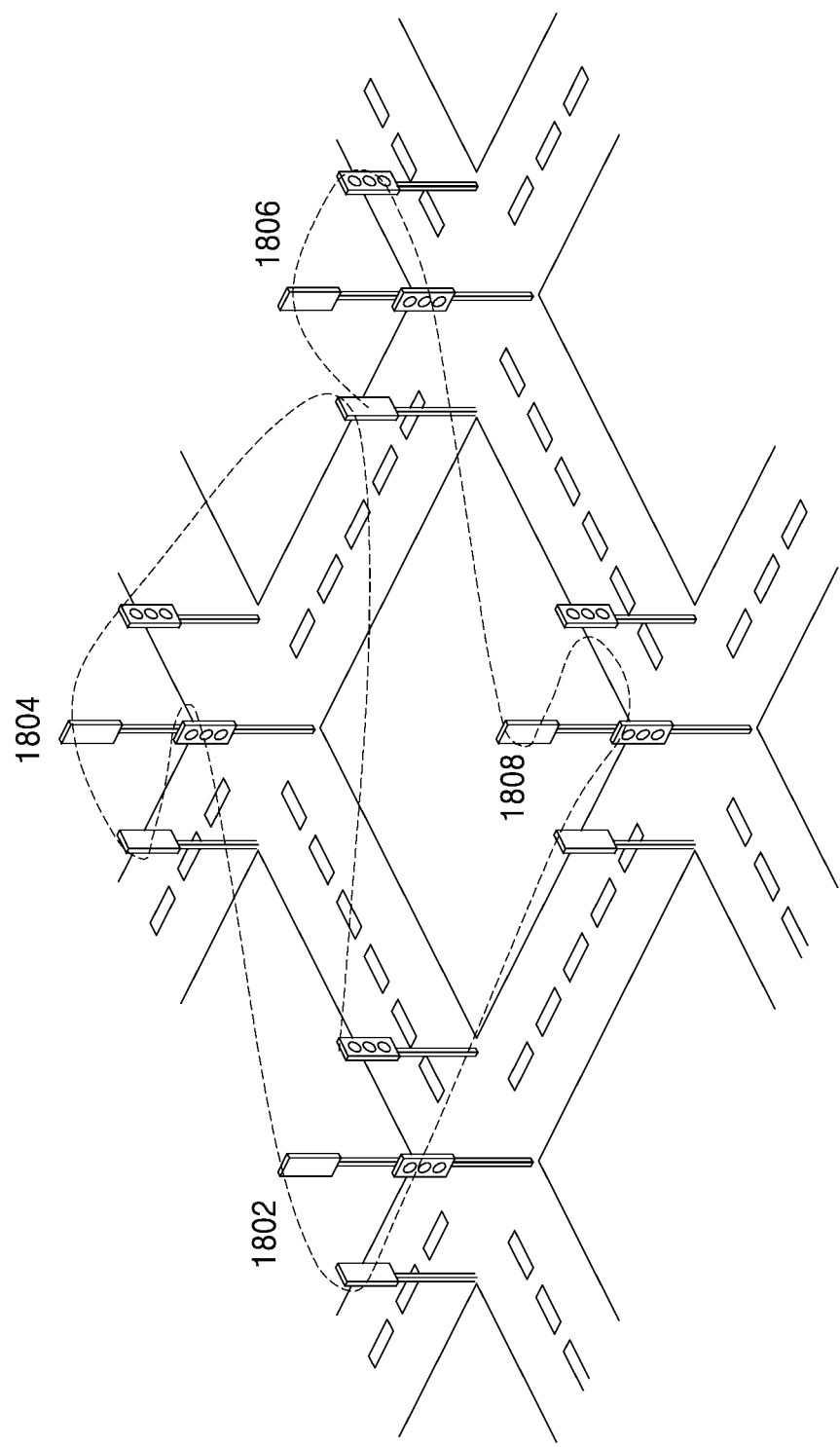
FIG. 18 is a diagram for describing a swarm-based system used for traffic management, according to an embodiment.

FIG. 18 is a diagram for describing a swarm-based system used for traffic management, according to an embodiment of the present disclosure.

A swarm control apparatus according to the present disclosure may be used in a traffic management system of a smart city. For example, a traffic signal management system of the smart city is managed based on mutual data interactions of traffic signals and the like, and swarm intelligence according to the present disclosure may be used for traffic management and path selection in the smart city. The traffic management system in the smart city may provide traffic management, but when one of sensor nodes is compromised, the traffic management may fail.

However, when the swarm control apparatus according to the present disclosure is applied to the traffic management system in the smart city, a compromised node of the traffic management system may be detected to easily solve a problem. Also, pieces of traffic data (for example, traffic values related to parameters such as sensors and traffic signals in the smart city, and past performance and state of each node) of the traffic management system in the smart city may be shared as transactions in a blockchain form of each node corresponding to a traffic management control apparatus, and thus by using the swarm control apparatus, traffic data of traffic management control apparatuses may maintain integrity based on rules of the blockchain.

By applying the swarm control apparatus according to the present disclosure to the traffic management of the smart city, reliability of data of each sensor and traffic signal may be guaranteed and by applying the swarm control apparatus to various situations in the smart city, malfunction and damage to an arbitrary apparatus may be detected. Also, the swarm control apparatus may detect a malfunctioning node and report the malfunctioning node to a traffic management authority, and the swarm control apparatus according to the present disclosure may be used in an environment capable of using various pieces of intelligence information.

Figure 19A:
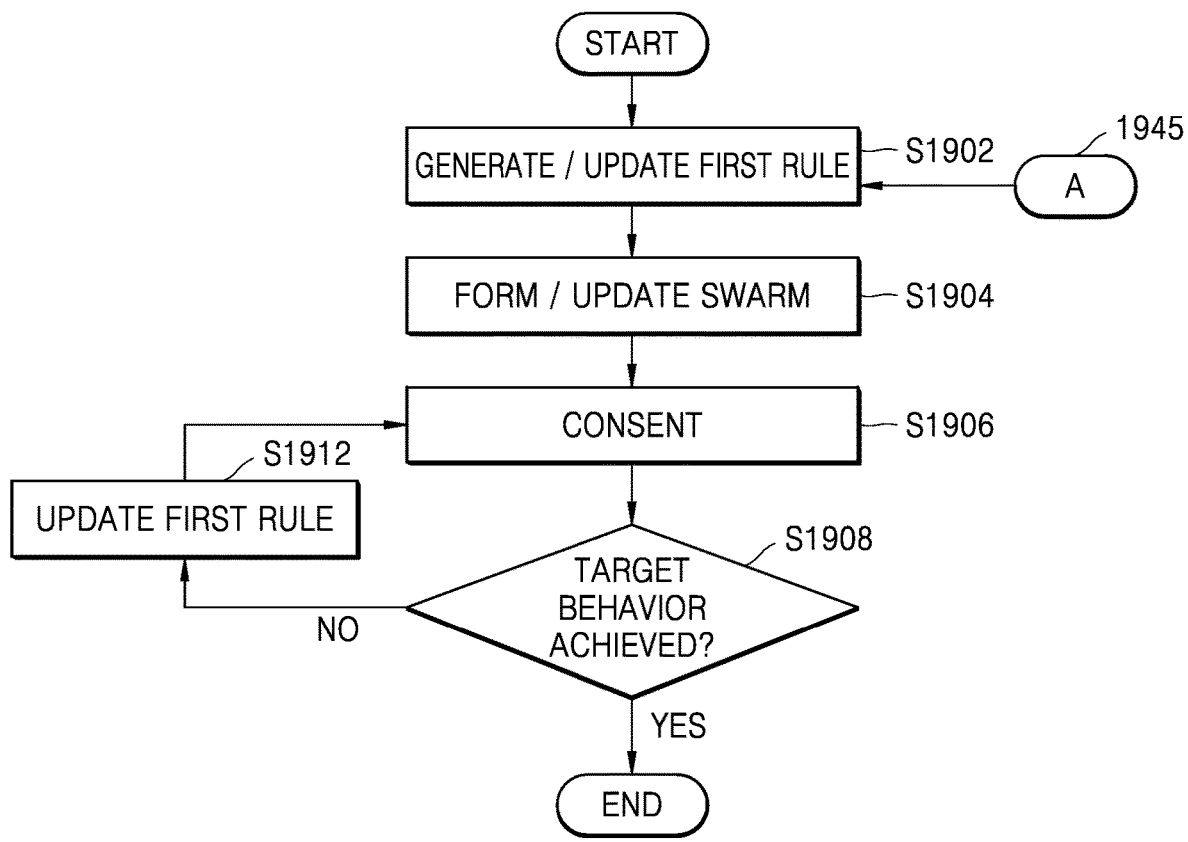
FIG. 19A is a diagram for describing a swarm forming method according to an embodiment.

FIG. 19A is a diagram for describing a swarm forming method according to an embodiment.

Referring to FIG. 19A, IoT devices may collectively form a swarm, share raw data or a function of raw data of devices with neighbors, and when transactions occur between the devices, share the occurred transactions. The devices may transmit the transactions by communicating with all other IoT devices in the swarm. According to an embodiment of the present disclosure, a homogeneous swarm may include the same types of devices in the swarm and data exchanged between the devices in the homogeneous swarm may be same raw data or same function of raw data. Different types of IoT devices in a heterogeneous swarm may transmit and receive different types of data with other IoT devices in the swarm.

For homogeneous nodes, rules of the swarm may be changed based on activity results regarding better results and the activity results may be input to a rules unit of a swarm-based system to change, update, and modify rules. For example, a behavior of the swarm may dynamically change to adapt to a change in an environment based on the changed, updated, and modified rules.

The swarm is formed based on rules in the rules unit and may be a plurality of swarms or a swarm including a plurality of swarms. The swarms may be formed via various methods. The rules generated by the rules unit is a major component for reaching consensus with respect to validating transactions of a blockchain. The rules generated by the rules unit may be adaptively generated and may be updated based on feedback received with respect to an activity based on the rules. At the same time, the rules in all blockchains may be maintained such that data in the blockchain is not compromised based on integrity.

Generation, formation, and evolution of the swarm may be based on a set of a series of simple rules, swarm state parameters, and a property of the swarm. An expectation of a system user may be represented by a desired behavior of the swarm including a plurality of nodes. Such nodes may follow simple rules defined in the rules unit when starting to operate. The simple rules may be dynamically used to make the rules adaptive to obtain the desired behavior.

When the desired behavior is not obtained, the swarm may set a series of simple rules to obtain the desired behavior. The swarm rules may be adaptively generated based on feedback of the nodes, a current state of the swarm, and a change in the property of the swarm. The swarm-based system according to the present disclosure may correspond to a swarm control apparatus.

For example, in operation S1902, the swarm control apparatus may generate a first rule about the swarm based on activities 1945 of the nodes in the swarm. Also, the swarm control apparatus may update an already-generated first rule, based on the activities 1945 of the nodes in the swarm.

The nodes according to the present disclosure may follow the simple rules to form the swarm. In the heterogeneous swarm, the rules need to be adapted or changed to process demands of the swarm, due to diversity of behaviors and properties of the nodes. At the same time, the rules of the swarm need to maintain integrity of the swarm.

As the rules in the swarm according to the present disclosure are changed or updated, the swarm control apparatus may form or update the swarm based on the changed or updated rules in the swarm, in operation S1904.

In operation S1906, the swarm control apparatus may broadcast the generated, changed, or updated rules to all nodes in the swarm as transactions, and the transactions broadcasted to all nodes may be recorded on a block and connected to a blockchain of each node. Also, when the transactions are transmitted to all nodes, the swarm control apparatus may elect a leader from among the nodes, generate the block where the transaction is recorded by the elected leader node, and broadcast the generated block again to the all nodes to perform a block validation process by each node. Rules for electing the leader node from among the plurality of nodes in the swarm and validation rules by each node on the block generated by the leader node, according to an embodiment of the present disclosure, may be included in consensus rules in a broad meaning.

In operation S1908, the swarm control apparatus may determine whether a behavior of the entire swarm is a target behavior, based on local interactions of the nodes in the swarm. For example, the swarm control apparatus may end the swarm control method when the behavior of the entire swarm is the target behavior. In operation S1912, when the behavior of the entire swarm is not the target behavior, the swarm control apparatus may update the first rule for defining the current swarm, based on changes in the devices in the current swarm.

Figure 19B:
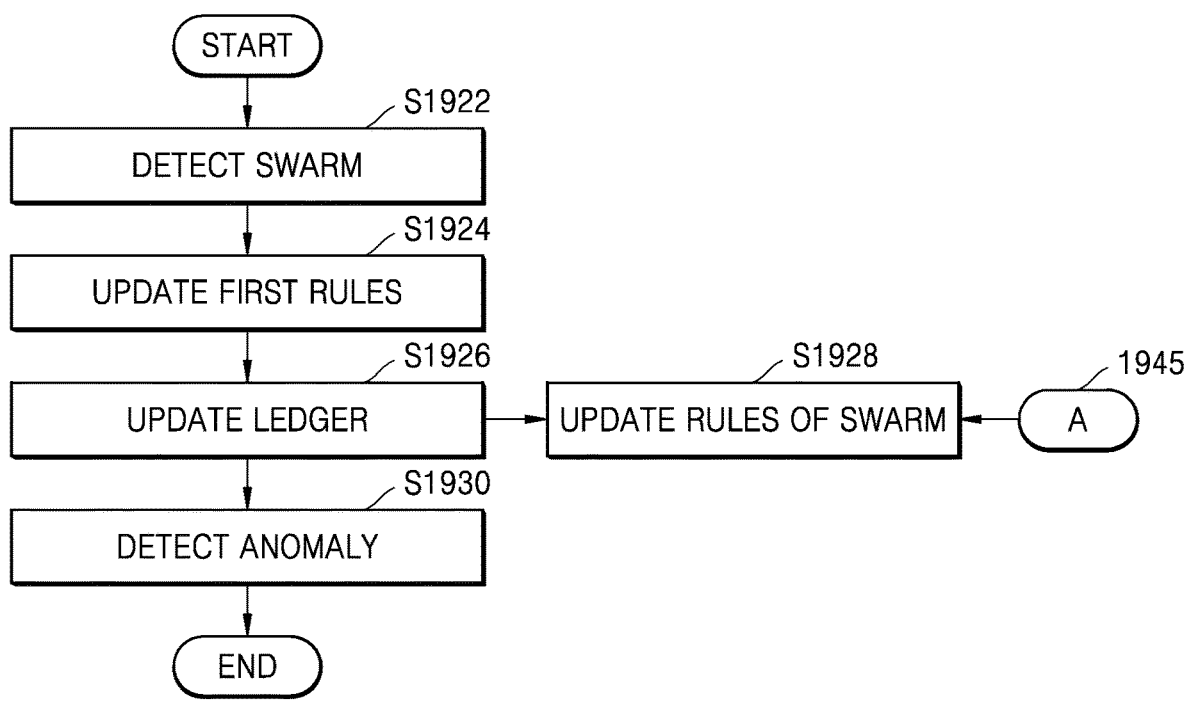
FIG. 19B is a diagram for describing a method of detecting an anomaly in a swarm, according to an embodiment.

FIG. 19B is a diagram for describing a method of detecting anomaly in a swarm, according to an embodiment.

The blockchain 602 of the swarm facilitates peer-to-peer (P2P) online transactions 603 and may include a distributed ledger. According to an embodiment, the transactions 603 of the blockchain 602 may be based on exchange of raw data (for example, a moving average or entropy) or a function of raw data of IoT devices, and here, a state of the blockchain 602 may be data (value) of IoT devices.

In a homogeneous swarm, because types of data values (raw data or a function of raw data) are the same, the blockchain 602 may derive the rules based on such values and the blockchain rules may be updated, changed, and evolved according to the update, change, and evolution of the swarm. According to an embodiment, when the types of nodes are homogeneous, the rules may also evolve as homogeneous rules.

However, in a heterogeneous swarm, because the types of data (raw data or a function of raw data) exchanged between nodes in the heterogeneous swarm are different, the blockchain 602 may derive rules for calculation based on heterogeneous data and such rules of the blockchain 602 may evolve as the swarm evolves. Because the types of data shared by devices in the swarm are heterogeneous, the rules may evolve to heterogeneous rules.

Because the blockchain 602 is immutable (tamper proof), a property of such blockchain 602 may be used to detect tampering (anomaly) and an anomaly detection process may be determined based on raw values or a function of raw values. A behavior of the swarm may help setting of rules in the blockchain to detect an anomaly in the swarm and generate the blockchain 602 storing raw data or a function of raw data as a transaction.

The anomaly detection process according to an embodiment of the present disclosure may be derived with respect to a current state and behavior of the swarm. Hash values of transactions in the swarm according to the present disclosure may be compressed to one hash value in a Merkle tree form. The compressed one hash value may be encoded in an asymmetric encoding manner and broadcasted to each node. An uppermost hash value of a Merkle tree may be changed even when only one hash value on a Merkle tree root is changed from among the hash values of the transactions stored in the Merkle tree form. Accordingly, even when only one transaction in the block is changed, a block where the corresponding transaction is recorded is unable to pass validation.

The node according to the present disclosure may generate an electronic signature by encoding, with a private key, one hash value generated by compressing the hash values of all transactions in a Merkle tree form, and then transmit the electronic signature and a public key to another node. Accordingly, the node participating in a blockchain system may easily detect whether a transaction of a received block is changed, perform a validation process on a newly generated block based on whether the transaction is changed, and easily detect whether IoT devices are flagged (anomaly detection) and detect anomalies of IoT devices in the swarm. A swarm control apparatus according to the present disclosure may detect an anomaly, record the detected anomaly in a block as a transaction, and share the block with entire nodes.

In operation S1922, the swarm control apparatus according to the present disclosure may detect a swarm including at least one node from among a plurality of nodes, based on a first rule. In operation S1924, the swarm control apparatus may update the first rule based on a change in the detected swarm. According to an embodiment, processes by which the swarm control apparatus updates the first rule may include a process of modifying the first rule to generate a second rule, and the generated second rule may correspond to the updated first rule.

In operation S1926, the swarm control apparatus may broadcast a block where the updated first rule is recorded to each node to connect the block where the updated first rule is recorded to an existing blockchain. In other words, each blockchain may be updated by each node. For example, the block where the first rule is recorded may be validated by each node based on the first rule. According to an embodiment, a ledger may correspond to the blockchain shared by the nodes.

In operation S1928, the swarm control apparatus may update rules of the swarm based on an updated ledger. Also, the swarm control apparatus may derive a global behavior in the swarm based on the updated rules of the swarm. In operation S1930, the swarm control apparatus may detect an anomaly in the swarm by using the updated blockchain. For example, the ledger is updated based on the anomaly detected by the swarm control apparatus, and accordingly, when a malicious node performs a malicious behavior, high costs for forging data are consumed because data is already shared between devices, and thus the behavior of the malicious node is unable to affect data or behavior of another node.

Figure 20:
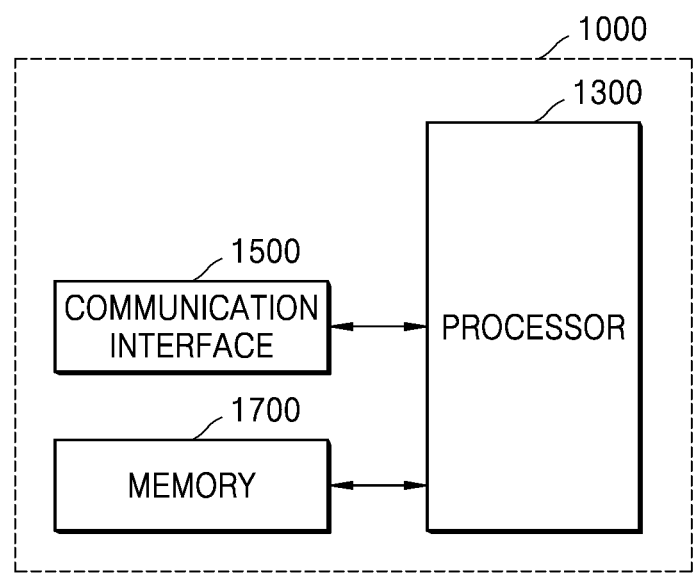
FIG. 20 is a block diagram of a swarm control apparatus according to an embodiment.

According to an embodiment, the swarm control apparatus may make the rules adaptive by generating, updating, modifying, and changing the rules of the swarm followed by the nodes sharing the blockchain, and the adaptively changed rules may correspond to dynamic rules of the blockchain. In other words, the rules of the swarm may be changed based on a swarm state, property, behavior, runtime consensus rules in the blockchain, and may dynamically evolve, may become adaptive, and may be updated. The behavior of the swarm may be determined based on raw values and a function of raw values shared between the devices in the swarm. Each node (for example, device) may include a ledger for recording a related parameter value and past performance and state of each updated node with respect to each node. The behavior of the swarm may be helpful in setting rules in the blockchain used to detect anomalies FIG. 20 is a block diagram of a swarm control apparatus according to an embodiment.

A swarm control apparatus 1000 according to an embodiment may include a processor 1300, a communication interface 1500, and a memory 1700.

The processor 1300 may execute one or more instructions stored in the memory 1700. For example, the processor 1300 may execute the one or more instructions in the memory to control the communication interface and the memory and perform a swarm control method. In other words, the processor 1300 according to the present disclosure may generate a first rule about a swarm based on attributes of at least one node included in the swarm, share the generated first rule with the at least one node, form the swarm including the at least one node based on the shared first rule, detect a change in the at least one node in the swarm, and change the first rule to a second rule based on the detected change.

Also, the processor 1300 may execute the one or more instructions stored in the memory to share the second rule with the at least one node and detect a change in the at least one node in the swarm, based on the shared second rule. According to an embodiment, the processor 1300 may execute the one or more instructions to detect an anomaly node in the swarm, which indicates an operation not corresponding to the second rule, based on the change detected based on the second rule. Also, the processor 1300 according to the present disclosure may perform all operations performed to detect an anomaly as the swarm-based system described with reference to FIGS. 1 through 19 controls the swarm.

According to an embodiment, the processor 1300 may execute the one or more instructions to generate the first rule based on data about an attribute, a property, and a current state of the at least one node and a kernel function using the data about the attribute, the property, and the current state as an input.

According to an embodiment, the processor 1300 may broadcast the generated first rule to a randomly selected peer node of a node that generated the first rule, when the first rule is broadcasted to all nodes in the swarm, cause at least one node in the swarm elected based on the first rule to generate a block where the first rule is recorded, cause the node that generated the block to broadcast the generated block to randomly selected at least one peer node, validate the broadcasted block based on the first rule, and connect the validated block to the blockchain.

Also, the processor may execute the one or more instructions to detect changes in an attribute, a property, and a current state of the at least one node in the swarm, based on the first rule, and detect a change in the swarm, based on the changes in the attribute, the property, and the current state of the at least one node in the swarm.

According to an embodiment, the processor may update the first rule based on the detected change, modify the first rule based on the detected change, reset a boundary condition of the first rule based on the detected change, and generate the second rule by using at least one of the updated first rule, the modified first rule, and the first rule including the reset boundary condition.

The communication interface 1500 may include one or more components enabling communication with an external apparatus, and for example, may include at least one of a short-range wireless communication module, a wired communication module, and a wireless communication module. The short-range wireless communication module of the present disclosure may include a Bluetooth communication module, a Bluetooth low energy (BLE) communication module, a near field communication module, a wireless local area network (WLAN) (Wi-Fi) communication module, a Zigbee communication module, an infrared data association (IrDA) communication module, a Wi-Fi direct (WFD) communication module, an ultra-wideband (UWB) communication module, and an Ant+ communication module, but is not limited thereto. In other words, the communication interface 1500 may enable not only communication between the nodes in the swarm, but also communication in units of swarms. Also, the communication interface 1500 may perform transmission and reception of transactions between the swarm and a server.

The memory 1700 may store one or more instructions. For example, the instruction stored in the memory 1700 may be a set of instructions executable by a computer to perform a swarm control method performed by a swarm-based system or swarm control apparatus. According to an embodiment, the memory 1700 may include an internal memory or an external memory.

For example, the internal memory may include at least one of a volatile memory (for example, a dynamic random access memory (DRAM), a static RAM (SRAM), or a synchronous DRAM (SDRAM)), a non-volatile memory (for example, a one-time programmable read-only memory (OTPROM), a programmable ROM (PROM), an erasable and programmable ROM (EPROM), an electrically erasable and programmable ROM (EEPROM), a mask ROM, or a flash ROM), a flash memory (for example, NAND flash or NOR flash memory), a hard drive, or a solid state drive (SSD).

The external memory may include a flash drive, for example, a compact flash (CF) drive, a secure digital (SD) drive, a micro-SD drive, a mini-SD drive, an extreme digital (xD) drive, a multi-media card (MMC), or a memory stick. The external memory may be functionally and/or physically connected to a network control apparatus via various interfaces. The swarm control apparatus according to the present disclosure may control the nodes in the swarm by being located outside the nodes in the swarm, or may derive swarm formation of nodes by being included in each of the nodes in the swarm.

Figure 21:
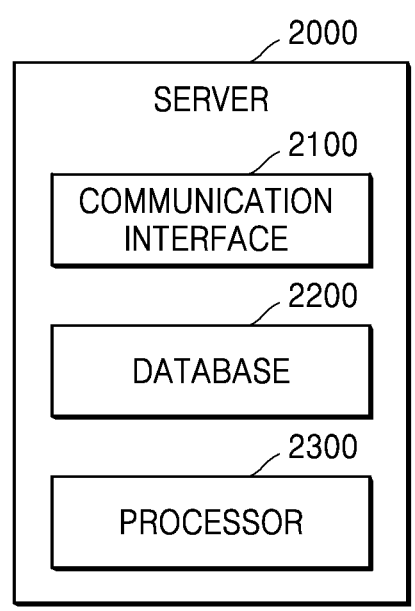
FIG. 21 is a block diagram of a server performing a swarm control method, according to an embodiment.

FIG. 21 is a block diagram of a server performing a swarm control method, according to an embodiment.

According to an embodiment, the swarm control method performed by the swarm control apparatus 1000 may be performed by a server 2000 connected to and communicable with devices in a swarm. For example, the server 2000 according to an embodiment of the present disclosure may include a communication interface 2100, a database 2200, and a processor 2300.

For example, the communication interface 2100 in the server 2000 according to the present disclosure may correspond to the communication interface of the swarm control apparatus of FIG. 20 and the database 2200 of the server 2000 may correspond to the memory 1700 of the swarm control apparatus of FIG. 20. Also, the processor 2300 of the server 2000 may perform an algorithm for the swarm control method performed by the swarm control apparatus or swarm-based system described with reference to FIGS. 1 through 20.

Methods according to embodiments of the present disclosure may be recorded on a computer-readable recording medium by being implemented in a form of program commands executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level languages executable by a computer by using an interpreter.

Some embodiment may also be realized in a form of a recording medium including instructions executable by a computer, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable instruction, a data structure, a program module, other data of a modulated data signal, or another transmission mechanism, and an example thereof includes an arbitrary information transmission medium. In addition, some embodiments may be implemented as a computer program product or a computer program including computer-executable instructions, such as a computer-executable computer program.

While the embodiments of the present disclosure have been particularly shown and described in detail, it will be understood by one of ordinary skill in the art that various changes in form and details may be made therein without departing from the spirit and scope of the present disclosure as defined by the following claims.

The invention claimed is:

1. A method, performed by a swarm control apparatus using a blockchain, of controlling a swarm, the method comprising:
generating a first rule for defining swarms based on an attribute of at least one node from among a plurality of nodes, wherein each of the plurality of nodes is an electronic device and the attribute corresponds to a property of the electronic device;
sharing the generated first rule with the at least one node;
forming a first swarm including the at least one node and a second swarm including at least one other node from among the plurality of nodes, based on the shared first rule;
detecting a change in the at least one node in the first swarm by detecting a change in the attribute of the at least one node; and
changing the first rule to a second rule for defining swarms, based on the detected change in the at least one node,
wherein the generating of the first rule comprises generating the first rule based on data about the attribute, the property, and a current state of the at least one node and a kernel function, the kernel function using the data about the attribute, the property, and the current state as an input,
wherein the attribute is at least one of a temperature, network capability, altitude, coverage area and flight speed, and
wherein transactions to be shared in the first swarm occurs in response to the change in the at least one node, and the blockchain in which at least one block where the transactions are recorded is connected in a chain form.

2. The method of claim 1, further comprising:
sharing the second rule with the at least one node; and
detecting the change in the at least one node in the first swarm, based on the shared second rule.

3. The method of claim 2, further comprising detecting an anomaly node in the first swarm, which indicates an operation not corresponding to the second rule, based on the change detected based on the second rule.

4. The method of claim 1, wherein the sharing of the generated first rule comprises:
broadcasting the generated first rule to at least one randomly selected peer node of a node that generated the first rule;
when the first rule is broadcasted to all nodes in the first swarm, generating, by at least one node in the first swarm selected based on the first rule, a block where the first rule is recorded;
broadcasting, by the node that generated the block, the generated block to the at least one randomly selected peer node;
validating the broadcasted block, based on the first rule; and
connecting the validated block to the blockchain.

5. The method of claim 1, wherein the detecting of the change comprises:
detecting changes in an attribute, the property, and the current state of the at least one node in the first swarm, based on the first rule; and
detecting a change in the first swarm, based on the changes in the attribute, the property, and the current state of the at least one node in the first swarm.

6. The method of claim 1, wherein the changing of the first rule to the second rule comprises:
updating the first rule, based on the detected change in the at least one node;
modifying the first rule, based on the detected change in the at least one node;
resetting a boundary condition of the first rule, based on the detected change in the at least one node; and
generating the second rule by using at least one of the updated first rule, the modified first rule, and the first rule including the reset boundary condition,
wherein the boundary condition indicates an endpoint value of a property that all nodes in the first swarm have.

7. The method of claim 1, wherein the first swarm comprises at least one of a homogeneous or a heterogeneous node and operates based on at least one of the first rule and the second rule.

8. The method of claim 1, wherein the first rule and the second rule comprise a rule regarding at least one of formation of the first swarm, selection of a node for generating a block, validation of the block, and consensus of the blockchain.

9. A swarm control apparatus using a blockchain, the swarm control apparatus comprising:
a communication interface for communicating with at least one node in a swarm;
a memory storing one or more instructions; and
a processor configured to execute the one or more instructions to:
generate a first rule for defining swarms based on an attribute of at least one node from among a plurality of nodes, wherein each of the plurality of nodes is an electronic device and the attribute corresponds to a property of the electronic device;
share the generated first rule with the at least one node;
form a first the swarm including the at least one node and a second swarm including at least one other node from among the plurality of nodes, based on the shared first rule;
detect a change in the at least one node in the first swarm by detecting a change in the attribute of the at least one node; and
change the first rule to a second rule for defining swarms, based on the detected change in the at least one node,
wherein generating the first rule further comprises generating the first rule based on data about the attribute, the property, and a current state of the at least one node and a kernel function, the kernel function using the data about the attribute, the property, and the current state as an input,
wherein the attribute is at least one of a temperature, network capability, altitude, coverage area and flight speed, and
wherein transactions to be shared in the first swarm occurs in response to the change in the at least one node, and the blockchain in which at least one block where the transactions are recorded is connected in a chain form.

10. The swarm control apparatus of claim 9, wherein the processor is further configured to execute the one or more instructions to:
share the second rule with the at least one node; and
detect the change in the at least one node in the first swarm, based on the shared second rule.

11. The swarm control apparatus of claim 10, wherein the processor is further configured to execute the one or more instructions to detect an anomaly node in the first swarm, which indicates an operation not corresponding to the second rule, based on the change detected based on the second rule.

12. The swarm control apparatus of claim 9, wherein the first swarm comprises at least one of a homogeneous or a heterogeneous node and operates based on at least one of the first rule and the second rule.

13. A non-transitory computer-readable recording medium having recorded thereon a program for executing swarm control, the program configured to cause one or more computer processors to:
generate a first rule for defining swarms based on an attribute of at least one node from among a plurality of nodes, wherein each of the plurality of nodes is an electronic device and the attribute corresponds to a property of the electronic device;
share the generated first rule with the at least one node;
form a first swarm including the at least one node and a second swarm including at least one other node from among the plurality of nodes, based on the shared first rule;
detect a change in the at least one node in the first swarm by detecting a change in the attribute of the at least one node; and
change the first rule to a second rule for defining swarms, based on the detected change in the at least one node,
wherein generating the first rule further comprises generating the first rule based on data about the attribute, the property, and a current state of the at least one node and a kernel function, the kernel function using the data about the attribute, the property, and the current state as an input,
wherein the attribute is at least one of a temperature, network capability, altitude, coverage area and flight speed, and
wherein transactions to be shared in the first swarm occurs in response to the change in the at least one node, and the blockchain in which at least one block where the transactions are recorded is connected in a chain form.

* * * * *